(12) United States Patent
Watanabe et al.

(10) Patent No.: US 10,607,779 B2
(45) Date of Patent: Mar. 31, 2020

(54) CHIP CAPACITOR HAVING CAPACITOR REGION DIRECTLY BELOW EXTERNAL ELECTRODE

(71) Applicant: ROHM CO., LTD., Kyoto (JP)

(72) Inventors: Keishi Watanabe, Kyoto (JP); Yasuhiro Kondo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/492,109

(22) Filed: Apr. 20, 2017

(65) Prior Publication Data
US 2017/0309404 A1 Oct. 26, 2017

(30) Foreign Application Priority Data

Apr. 22, 2016 (JP) .................. 2016-085897
Apr. 22, 2016 (JP) .................. 2016-085899

(51) Int. Cl.
| | |
|---|---|
| *H01G 4/30* | (2006.01) |
| *H01G 4/33* | (2006.01) |
| *H01G 2/06* | (2006.01) |
| *H01G 4/012* | (2006.01) |
| *H01G 4/232* | (2006.01) |

(52) U.S. Cl.
CPC ............... *H01G 4/30* (2013.01); *H01G 2/06* (2013.01); *H01G 4/012* (2013.01); *H01G 4/232* (2013.01); *H01G 4/33* (2013.01)

(58) Field of Classification Search
CPC ........... H01G 4/012; H01G 4/30; H01G 4/228
See application file for complete search history.

(56) References Cited

U.S. PATENT DOCUMENTS

| | | | | |
|---|---|---|---|---|
| 5,796,572 A | * | 8/1998 | Kawai ............... | H01G 4/08 |
| | | | | 257/295 |
| 6,226,170 B1 | * | 5/2001 | Nellissen ........... | H01G 4/08 |
| | | | | 361/302 |
| 9,583,238 B2 | * | 2/2017 | Kondo | |
| 9,859,061 B2 | * | 1/2018 | Okada ............... | H01G 5/011 |
| 2001/0015884 A1 | * | 8/2001 | Takeshima ........ | H01G 4/306 |
| | | | | 361/306.3 |

(Continued)

FOREIGN PATENT DOCUMENTS

| | | | |
|---|---|---|---|
| JP | 05283282 A | * | 10/1993 |
| JP | H0653408 A | | 2/1994 |

(Continued)

*Primary Examiner* — David M Sinclair
(74) *Attorney, Agent, or Firm* — Rabin & Berdo, P.C.

(57) ABSTRACT

A chip capacitor includes a substrate having a main surface, a first conductive film including a first connecting region and a first capacitor forming region and formed on the main surface of the substrate, a dielectric film covering the first capacitor forming region of the first conductive film, a second conductive film including a second connecting region facing to the first capacitor forming region of the first conductive film across the dielectric film, and a second capacitor forming region facing to the first capacitor forming region of the first conductive film across the dielectric film, a first external electrode electrically connected to the first connecting region of the first conductive film, and a second external electrode electrically connected to the second connecting region of the second conductive film.

29 Claims, 44 Drawing Sheets

(56) References Cited

U.S. PATENT DOCUMENTS

| | | | |
|---|---|---|---|
| 2004/0002188 A1* | 1/2004 | Chung | H01L 28/60 438/240 |
| 2006/0011961 A1* | 1/2006 | Taki | H01G 7/06 257/299 |
| 2007/0097596 A1* | 5/2007 | Kuwajima | H01G 4/01 361/311 |
| 2008/0248596 A1* | 10/2008 | Das | H01G 4/206 438/3 |
| 2009/0141426 A1* | 6/2009 | Hwang | H01G 4/012 361/321.2 |
| 2012/0119328 A1* | 5/2012 | Nakaiso | H01G 4/12 257/532 |
| 2013/0038981 A1* | 2/2013 | Imanaka | H01G 4/1227 361/301.4 |
| 2013/0083454 A1* | 4/2013 | Masuda | H01G 4/06 361/503 |
| 2013/0258545 A1* | 10/2013 | Yano | H01G 4/306 361/301.4 |
| 2015/0022938 A1* | 1/2015 | Okada | H01G 4/33 361/278 |
| 2015/0103465 A1* | 4/2015 | Kang | H01G 4/1227 361/301.4 |
| 2015/0305159 A1* | 10/2015 | Yamamoto | H01G 4/40 361/767 |
| 2015/0332842 A1 | 11/2015 | Shimoichi et al. | |

FOREIGN PATENT DOCUMENTS

| | | | | |
|---|---|---|---|---|
| JP | H11147273 | A | 6/1999 | |
| JP | 2001284485 | A | 10/2001 | |
| JP | 2001345232 | A | 12/2001 | |
| JP | 2006-347782 | A | 12/2006 | |
| JP | 2009021514 | A * | 1/2009 | |
| JP | 2013168633 | A * | 8/2013 | H01G 4/33 |
| JP | 2014072242 | A * | 4/2014 | H01C 1/012 |
| WO | 2002089161 | A1 | 11/2002 | |
| WO | 2013073357 | A1 | 5/2013 | |

* cited by examiner

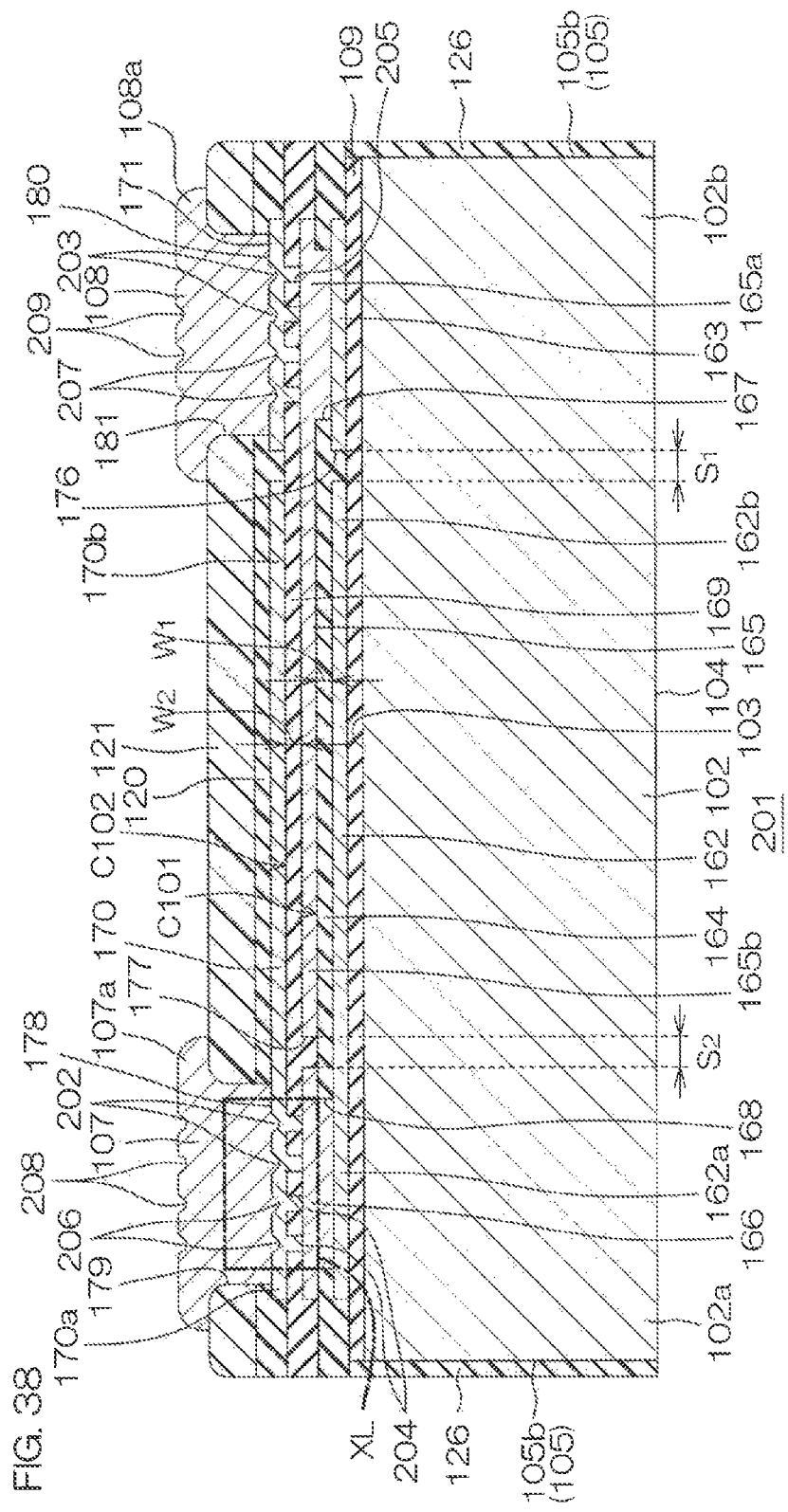

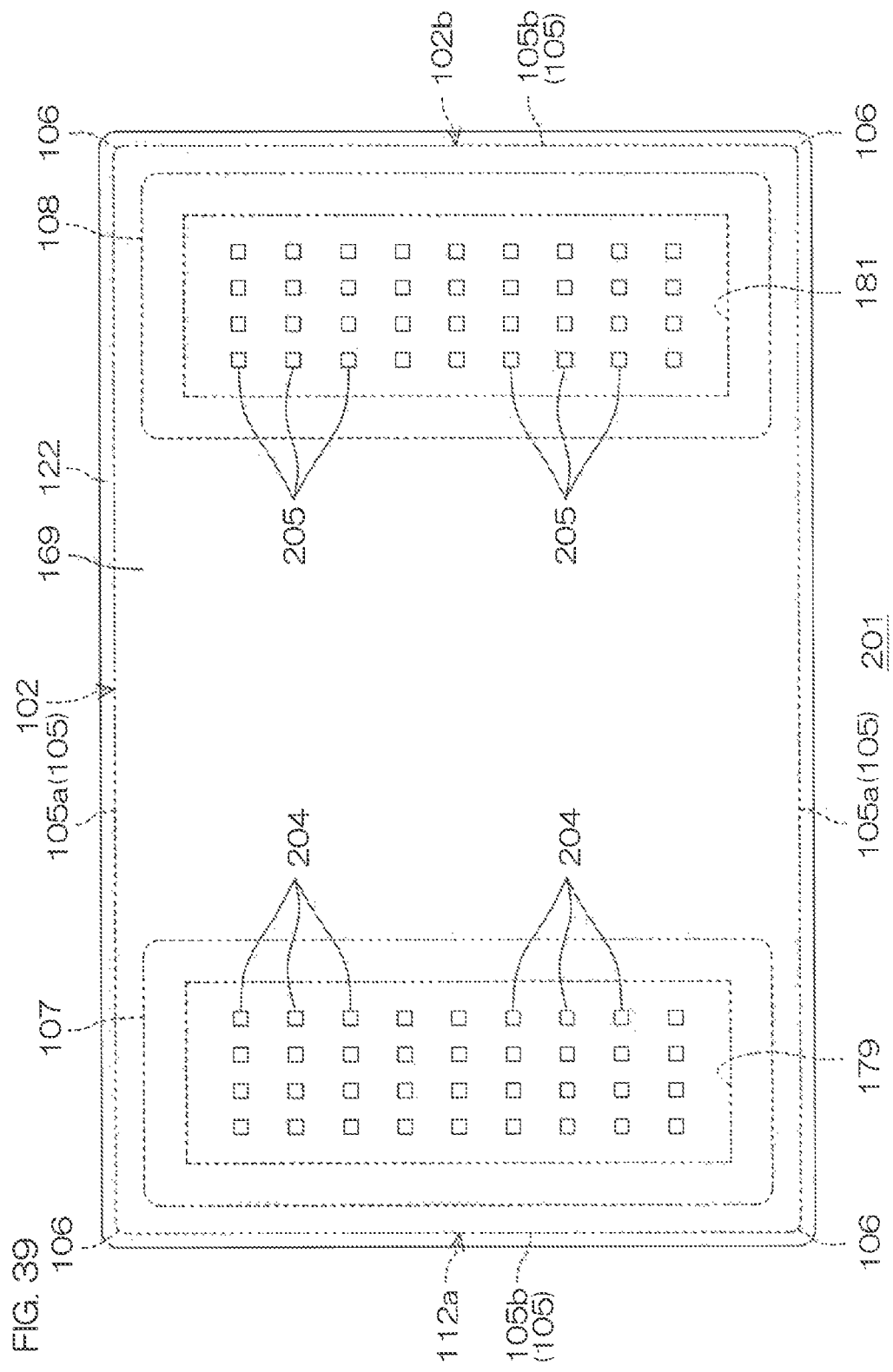

CHIP CAPACITOR HAVING CAPACITOR REGION DIRECTLY BELOW EXTERNAL ELECTRODE

BACKGROUND OF THE INVENTION

1. Field of the Invention

The present invention relates to a chip capacitor.

2. Description of the Related Art

JP 2006-347782 discloses a multilayer ceramic capacitor. This multilayer ceramic capacitor includes a first internal electrode, a second internal electrode facing to the first internal electrode across a dielectric ceramic layer, a first external electrode electrically connected to the first internal electrode, and a second external electrode electrically connected to the second internal electrode.

SUMMARY OF THE INVENTION

One preferred embodiment of the present invention provides a chip capacitor including a substrate having a main surface, a first conductive film including a first connecting region and a first capacitor forming region and formed on the main surface of the substrate, a dielectric film covering the first capacitor forming region of the first conductive film, a second conductive film including a second connecting region facing to the first capacitor forming region of the first conductive film across the dielectric film, and a second capacitor forming region facing to the first capacitor forming region of the first conductive film across the dielectric film, a first external electrode electrically connected to the first connecting region of the first conductive film, and a second external electrode electrically connected to the second connecting region of the second conductive film.

Another preferred embodiment of the present invention further provides a chip capacitor including a substrate having a main surface, a first conductive film including a first connecting region and a first capacitor forming region and formed on the main surface of the substrate, a first dielectric film covering the first capacitor forming region of the first conductive film, a second conductive film including a second connecting region arranged at the main surface of the substrate, and a second capacitor forming region facing to the first capacitor forming region of the first conductive film across the first dielectric film, a second dielectric film covering the second capacitor forming region of the second conductive film, a third conductive film including a third connecting region electrically connected to the first connecting region of the first conductive film, and a third capacitor forming region facing to the second capacitor forming region of the second conductive film across the second dielectric film, a first external electrode electrically connected to the third connecting region of the third conductive film, and a second external electrode electrically connected to the second connecting region of the second conductive film.

The above-described objects, features, and the advantages and/or other objects, features, and the advantages according to the present invention will be made apparent from the following description of preferred embodiments taken in conjunction with the accompanying drawings.

BRIEF DESCRIPTION OF THE DRAWINGS

FIG. 38 is a sectional view taken along line XXXVIII-XXXVIII shown in FIG. 37.

FIG. 39 is a plan view of the chip capacitor shown in FIG. 38, in which structures above a second dielectric film are removed.

DETAILED DESCRIPTION OF THE PREFERRED EMBODIMENTS

Figure 1:
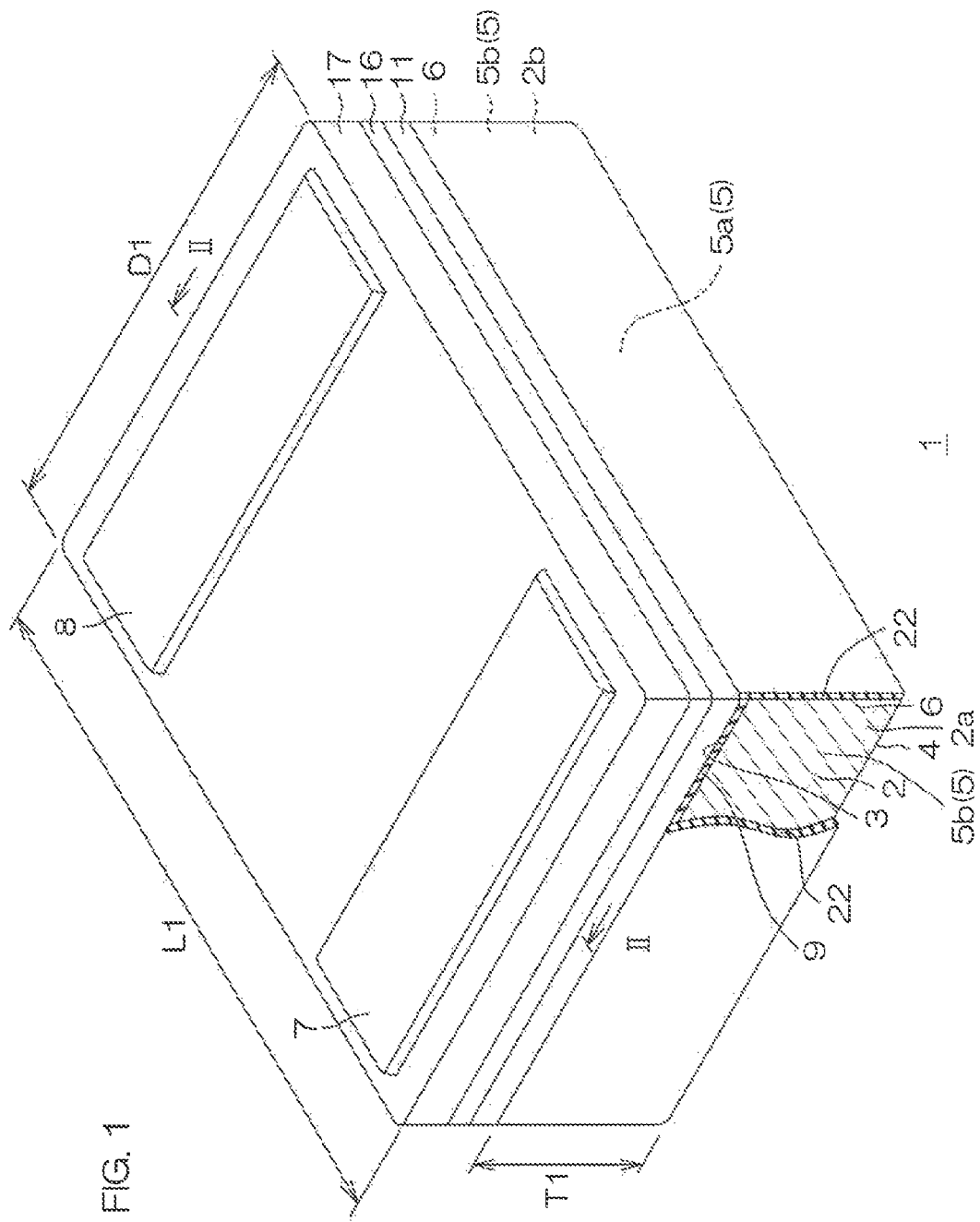
FIG. 1 is a partially cutaway perspective view of a chip capacitor according to a first preferred embodiment of the present invention.

A preferred embodiment according to the present invention provide a chip capacitor capable of realizing enlargement of capacity and miniaturization.

A chip capacitor according to one preferred embodiment including a substrate having a main surface, a first conductive film including a first connecting region and a first capacitor forming region and formed on the main surface of the substrate, a dielectric film covering the first capacitor forming region of the first conductive film, a second conductive film including a second connecting region facing to the first capacitor forming region of the first conductive film across the dielectric film, and a second capacitor forming region facing to the first capacitor forming region of the first conductive film across the dielectric film, a first external electrode electrically connected to the first connecting region of the first conductive film, and a second external electrode electrically connected to the second connecting region of the second conductive film.

According to the chip capacitor, the laminated film including the first conductive film, the dielectric film and the second conductive film is formed in a region below the second external electrode, in addition to a region outside the region below the second external electrode. A capacitor region can thereby be formed in the region below the second external electrode so that the capacity can be increased without increasing the size of the substrate. The chip capacitor capable of realizing enlargement of capacity and miniaturization can thus be provided.

A chip capacitor according to another preferred embodiment including, a chip capacitor including a substrate having a main surface, a first conductive film including a first connecting region and a first capacitor forming region and formed on the main surface of the substrate, a first dielectric film covering the first capacitor forming region of the first conductive film, a second conductive film including a second connecting region arranged at the main surface of the substrate, and a second capacitor forming region facing to the first capacitor forming region of the first conductive film across the first dielectric film, a second dielectric film covering the second capacitor forming region of the second conductive film, a third conductive film including a third connecting region electrically connected to the first connecting region of the first conductive film, and a third capacitor forming region facing to the second capacitor forming region of the second conductive film across the second dielectric film, a first external electrode electrically connected to the third connecting region of the third conductive film, and a second external electrode electrically connected to the second connecting region of the second conductive film.

According to the chip capacitor, a multilayer laminated structure where the conductor film and the dielectric film are alternately laminated is formed. A plurality of capacitor regions can thereby be formed along a normal direction of the first main surface of the substrate. The chip capacitor capable of realizing enlargement of capacity and miniaturization can thus be provided.

Hereinafter, a plurality of preferred embodiments according to the present invention is described in detail with reference to the accompanying drawings.

FIG. 1 is a partially cutaway perspective view of a chip capacitor 1 according to a first preferred embodiment of the present invention.

The chip capacitor 1 is a minute chip part called 0603 (0.6 mm×0.3 mm) chip, 0402 (0.4 mm×0.2 mm) chip, 03015 (0.3 mm×0.15 mm) chip, etc.

Referring to FIG. 1, the chip capacitor 1 includes a substrate 2. The substrate 2 is formed in a parallelepiped shape. The substrate 2 includes a first main surface 3, the second main surface 4 located on an opposite side of the first main surface 3, and the lateral surface 5 connecting the first main surface 3 and the second main surface 4. The first main surface 3 and the second main surface 4 are formed in a rectangular shape in a plan view as viewed from their normal direction (hereinafter referred to as "plan view").

Hereinafter, a pair of the lateral surfaces 5 extending along a longitudinal direction of the substrate 2 among the lateral surfaces 5 is called lengthwise lateral surface 5a, and a pair of the lateral surfaces 5 extending along a width direction is called widthwise lateral surface 5b.

A length L1 of the lengthwise lateral surface 5a of the substrate 2 is, for example, equal to or greater than 0.3 mm and equal to or smaller than 0.6 mm A length D1 of the widthwise lateral surface 5b of the substrate 2 is, for example, equal to or greater than 0.15 mm and equal to or smaller than 0.3. A thickness T1 of the substrate 2 is, for example, equal to or greater than 0.1 mm and equal to or smaller than 0.2 mm.

Each corner portions 6 of the substrate 2 may be a round shape chamfered in plan view. According to the corner portions 6 having the round shape, external forces can be dispersed along the outer surfaces thereof. The occurrence of crack on the corner portions 6 can thus be suppressed.

A first external electrode 7 and a second external electrode 8 are formed on the first main surface 3 of the substrate 2.

The first external electrode 7 is formed at one end portion 2a side of the substrate 2. The first external electrode 7 is formed in a rectangular shape extending along the width direction of the substrate 2 in plan view.

The second external electrode 8 is formed at the other end portion 2b side of the substrate 2. The second external electrode 8 is formed in a rectangular shape extending along the width direction of the substrate 2 in plan view.

Figure 2:
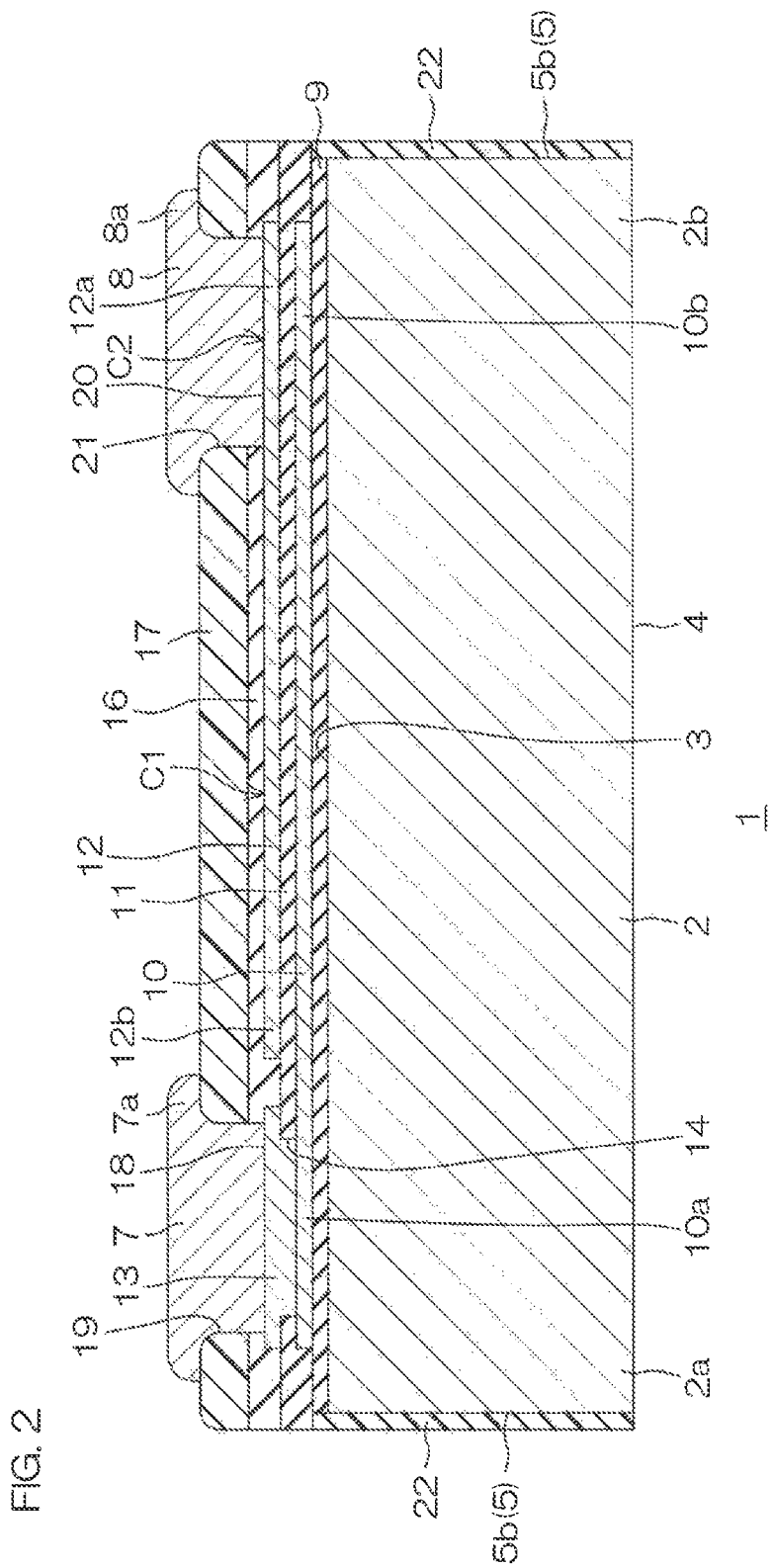
FIG. 2 is a sectional view taken along line II-II shown in FIG. 1.
Figure 3:
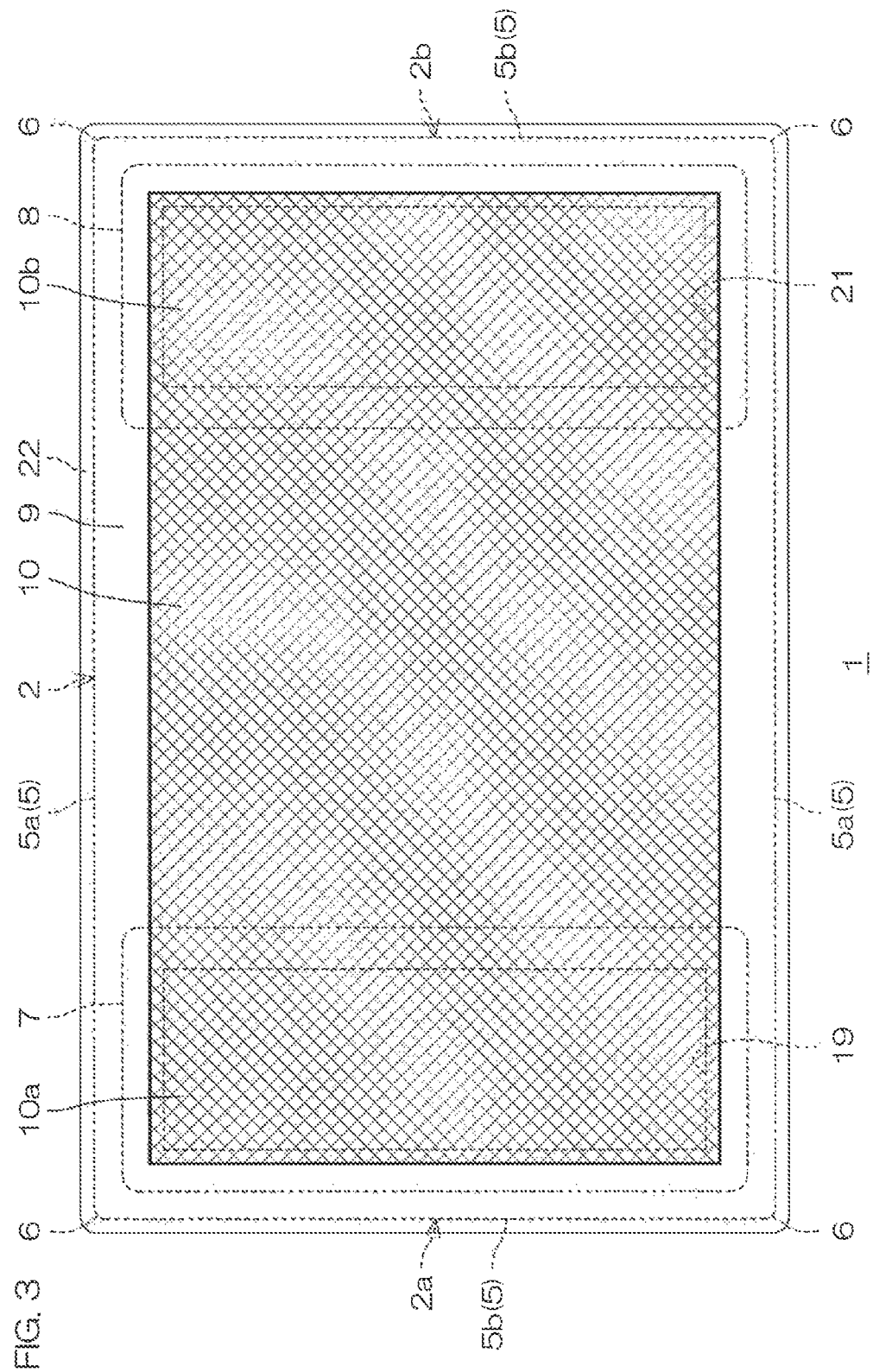
FIG. 3 is a plan view of the chip capacitor shown in FIG. 1, in which structures above a first conductive film are removed.
Figure 4:
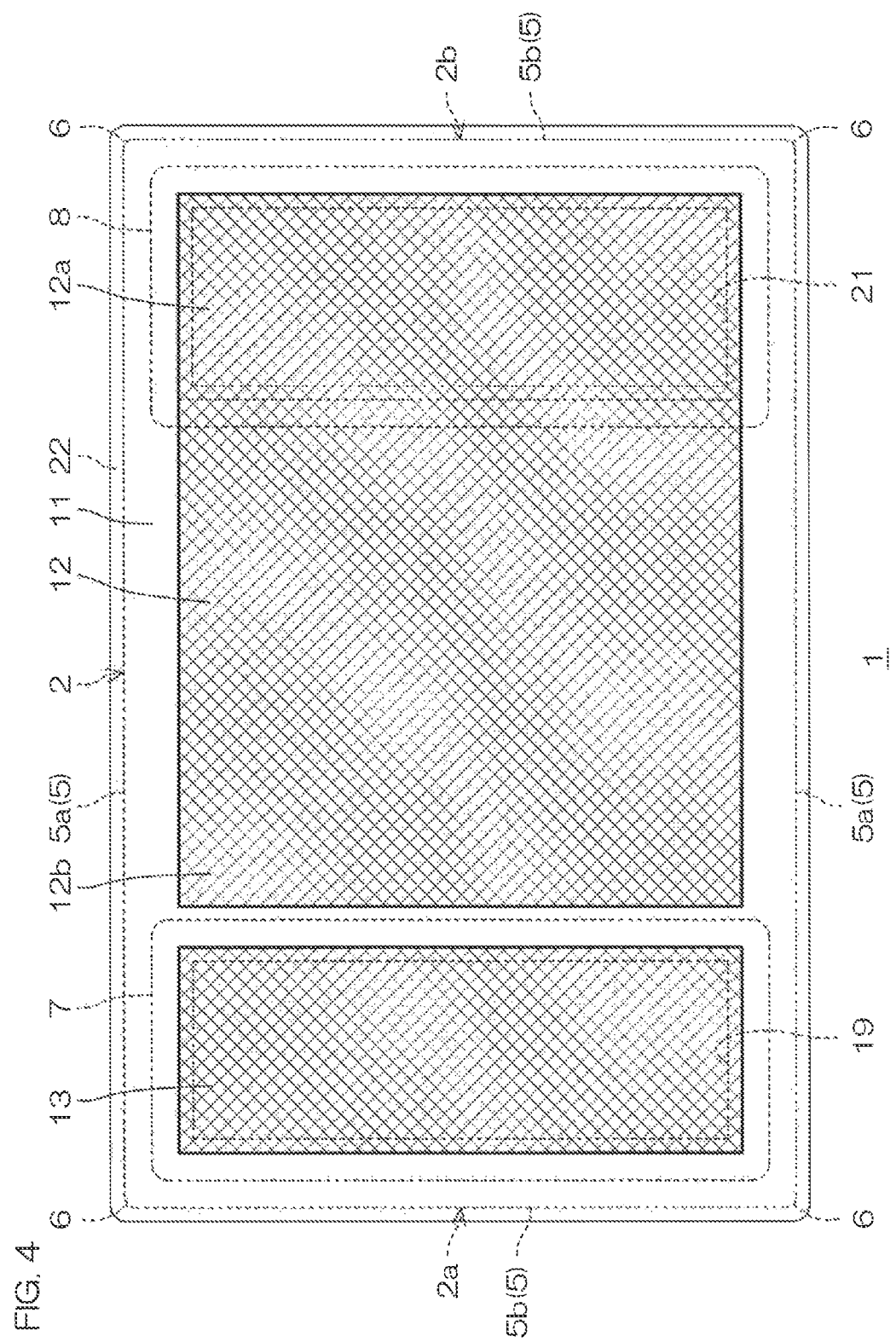
FIG. 4 is a plan view of the chip capacitor shown in FIG. 1, in which structures above a second conductive film are removed.

FIG. 2 is a sectional view taken along line II-II shown in FIG. 1. FIG. 3 is a plan view of the chip capacitor 1 shown in FIG. 1, in which structures above a first conductive film 10 (to be described below) are removed. FIG. 4 is a plan view of the chip capacitor shown in FIG. 1, in which structures above a second conductive film 12 (to be described below) are removed.

An insulating film 9 is formed on the first main surface 3 of the substrate 2. The insulating film 9 covers a substantially whole region of the first main surface 3 of the substrate 2. The insulating film 9 may include an $SiO_2$ film or an SiN film.

Referring to FIGS. 2 to 4, a laminated film including a first conductive film 10, a dielectric film 11 and a second conductive film 12 is formed on the insulating film 9. The first conductive film 10 is shown by crosshatching for the sake of clarity in FIG. 3. Similarly, the second conductive film 12 is shown by crosshatching for the sake of clarity in FIG. 4.

Referring to FIGS. 2 and 3, the first conductive film 10 is formed in a rectangular shape extending from the one end portion 2a side to the other end portion 2b side of the substrate 2 in plan view. The first conductive film 10 may include at least one of Cu, Al, AlSi or AlCu. The first conductive film 10 integrally includes a first connecting region 10a and a first capacitor forming region 10b.

The first connecting region 10a is formed at the one end portion 2a side of the substrate 2. The first connecting region 10a is formed in a region immediately below the first external electrode 7. The first connecting region 10a is formed in a rectangular shape extending along the width direction of the substrate 2 in plan view.

The first capacitor forming region 10b is formed at the other end portion 2b side of the substrate 2 with respect to the first connecting region 10a. The first capacitor forming region 10b is led out from the first connecting region 10a toward the other end portion 2b side of the substrate 2.

The first capacitor forming region 10b covers a region between the first external electrode 7 and the second external electrode 8 in the insulating film 9. The first capacitor forming region 10b further covers a region immediately below the second external electrode 8 in the insulating film 9.

Referring to FIG. 2, the dielectric film 11 covers a substantially whole region of the first conductive film 10. The dielectric film 11 may include an $SiO_2$ film or an SiN film. The dielectric film 11 may include an ONO film including an oxide film ($SiO_2$ film)/a nitride film (SiN film)/an oxide film ($SiO_2$ film) formed in this order from the substrate 2 side.

Referring to FIGS. 2 and 4, The second conductive film 12 is formed in a rectangular shape extending from the other end portion 2b side to the one end portion 2a side of the substrate 2 in plan view. The second conductive film 12 may include at least one of Cu, Al, AlSi or AlCu. The second conductive film 12 integrally includes a second connecting region 12a and a second capacitor forming region 12b.

The second connecting region 12a is formed at the other end portion 2b side of the substrate 2. The second connecting region 12a is formed in a rectangular shape extending along the width direction of the substrate 2 in plan view. The second connecting region 12a is formed in a region immediately below the second external electrode 8. The second connecting region 12a faces to the first capacitor forming region 10b of the first conductive film 10 across the dielectric film 11 in the region immediately below the second external electrode 8.

The second capacitor forming region 12b is formed at the one end portion 2a side of the substrate 2 with respect to the second connecting region 12a. The second capacitor forming region 12b is led out from the second connecting region 12a toward the one end portion 2a side of the substrate 2. The second capacitor forming region 12b covers a region between the first external electrode 7 and the second external electrode 8. The second capacitor forming region 12b faces to the first capacitor forming region 10b across the dielectric film 11. The second capacitor forming region 12b exposes the region immediately below the first external electrode 7 in the insulating film 9.

An end portion located at the one end portion 2a side of the substrate 2 in the second capacitor forming region 12b exposes a region immediately below the first external electrode 7 in the dielectric film 11. The end portion located at the one end portion 2a side of the substrate 2 in the second capacitor forming region 12b may be formed in the region where the dielectric film 11 faces to the first external electrode 7.

Referring to FIG. 4, a pad conductive film 13 is formed on the dielectric film 11. The pad conductive film 13 is shown by crosshatching for the sake of clarity in FIG. 4. The pad conductive film 13 is formed at the one end portion 2a side of the substrate 2 with respect to the first conductive film 10. The pad conductive film 13 is formed apart from the second conductive film 12 along a facing direction where the first external electrode 7 and the second external electrode 8 face each other.

The pad conductive film 13 is formed in the region immediately below the first external electrode 7. The pad conductive film 13 is formed in a rectangular shape extending along the width direction of the substrate 2 in plan view. A thickness of the pad conductive film 13 is substantially equal to a thickness of the second conductive film 12. The pad conductive film 13 may include at least one of Cu, Al, AlSi, or AlCu.

A via hole 14 selectively exposing the first connecting region 10a of the first conductive film 10 is formed in the dielectric film 11. The pad conductive film 13 is electrically connected to the first connecting region 10a through the via hole 14.

Referring to FIG. 2, the laminated film including the first conductive film 10, the dielectric film 11 and the second conductive film 12 is formed in a region below the second external electrode 8, in addition to a region between the first external electrode 7 and the second external electrode 8.

A first capacitor region C1 and a second capacitor region C2 are thereby formed by the laminated film. The first capacitor region C1 is formed in the region between the first external electrode 7 and the second external electrode 8. The second capacitor region C2 is formed in the region below the second external electrode 8. The second capacitor region C2 allows the capacity of the chip capacitor 1 to be increased in the limited area of the first main surface 3 of the substrate 2.

Referring to FIG. 2, a first passivation film 16 and a resin film 17 are formed in this order on the dielectric film 11. The first passivation film 16 covers the second conductive film 12 and the pad conductive film 13. The resin film 17 covers the first passivation film 16. The first passivation film 16 may include $SiO_2$ or SiN. The resin film 17 may include a polyimide.

A first pad opening 19 and a second pad opening 21 are formed in the first passivation film 16 and the resin film 17.

The first pad opening 19 selectively exposes a region excluding an edge portion of the pad conductive film 13 as a first pad region 18. The second pad opening 21 selectively exposes a region excluding an edge portion of the second connecting region 12a of the second conductive film 12 as a second pad region 20.

The first external electrode 7 is formed in the first pad opening 19. The first external electrode 7 protrudes from the resin film 17. The first external electrode 7 has a covering portion 7a covering the resin film 17.

The first external electrode 7 is electrically connected to the first pad region 18 inside the first pad opening 19. The first external electrode 7 is thus electrically connected to the first conductive film 10. The first external electrode 7 may include a Ni/Pd/Au laminated film including a Ni film, a Pd film and an Au film laminated in this order from the pad conductive film 13 side.

The second external electrode 8 is formed in the second pad opening 21. The second external electrode 8 protrudes from the resin film 17. The second external electrode 8 has a covering portion 8a covering the resin film 17.

The second external electrode 8 is electrically connected to the second pad region 20 inside the second pad opening 21. The second external electrode 8 is thus electrically connected to the second conductive film 12. The second external electrode 8 may include a Ni/Pd/Au laminated film including a Ni film, a Pd film and an Au film laminated in this order from the second conductive film 12 side.

Referring to FIGS. 2 to 4, a second passivation film 22 is formed on the lateral surface 5 of the substrate 2. The second passivation film 22 covers a substantially whole region of the lateral surface 5 of the substrate 2. The second passivation film 22 may include $SiO_2$ or SiN.

As described above, according to the chip capacitor 1, the first capacitor region C1 is formed in the region between the first external electrode 7 and the second external electrode 8. Additionally, the second capacitor region C2 is formed in the region immediately below the second external electrode 8.

The chip capacitor 1 thereby has a structure in which the second capacitor region C2 is expanded from the first capacitor region C1 to the region immediately below the second external electrode 8. The chip capacitor 1 capable of realizing enlargement of capacity and miniaturization can thus be provided.

Further, according to the chip capacitor 1, the pad conductive film 13 is interposed in a region between the first connecting region 10a of the first conductive film 10 and the second external electrode 8. The pad conductive film 13 is formed in a same layer as a layer where the second conductive film 12 is formed.

The height variations occurring between the second external electrode 8 connected to the second connecting region 12a of the second conductive film 12 and the first external electrode 7 connected to the pad conductive film 13 can thus be suppressed. The mounting failure caused by the height variations between the first external electrode 7 and the second external electrode 8 can thereby be reduced, in a case where the chip capacitor 1 is mounted onto a connecting object such as a mounting board, etc.

Figure 5:
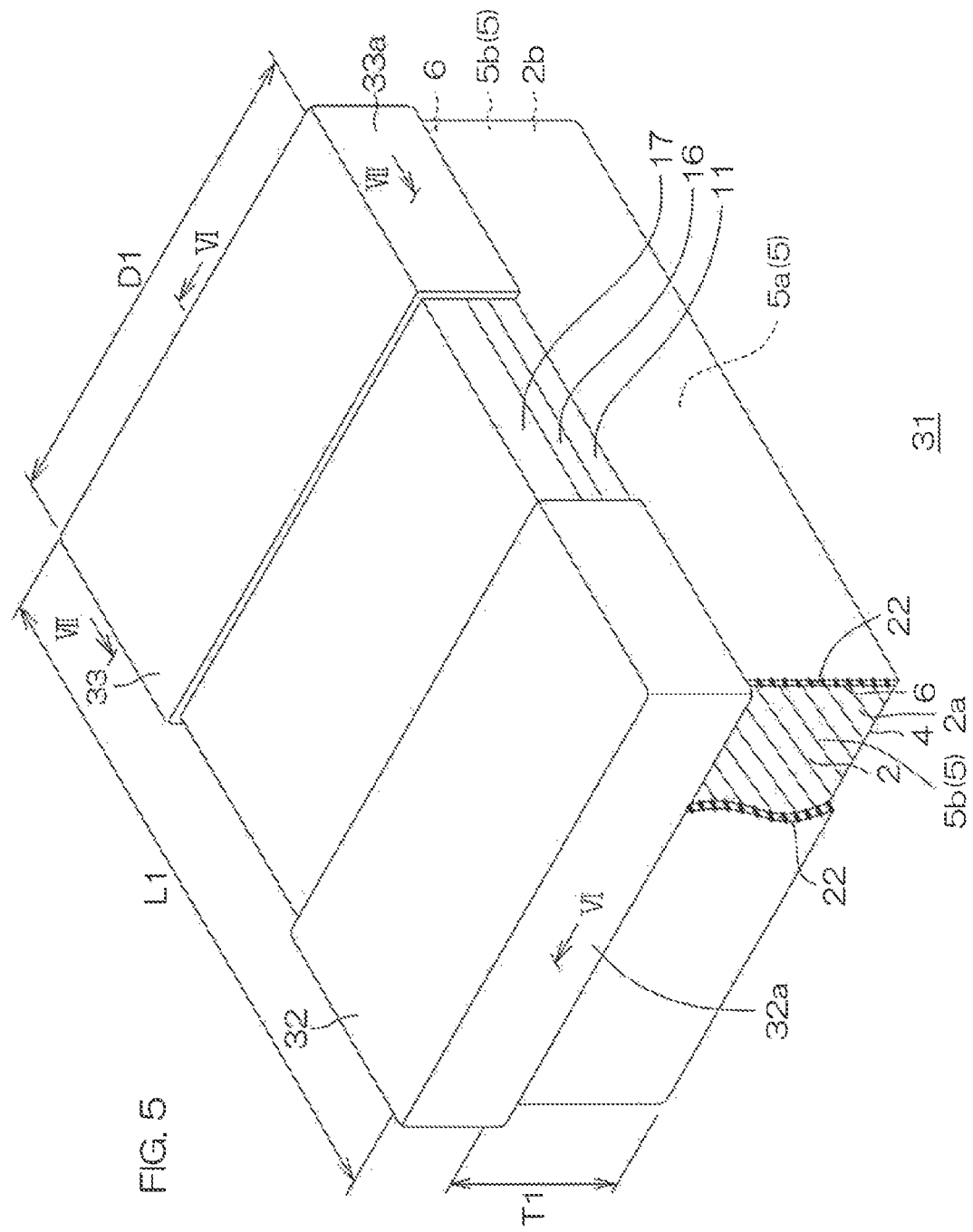
FIG. 5 is a partially cutaway perspective view of a chip capacitor according to a second preferred embodiment of the present invention.
Figure 6:
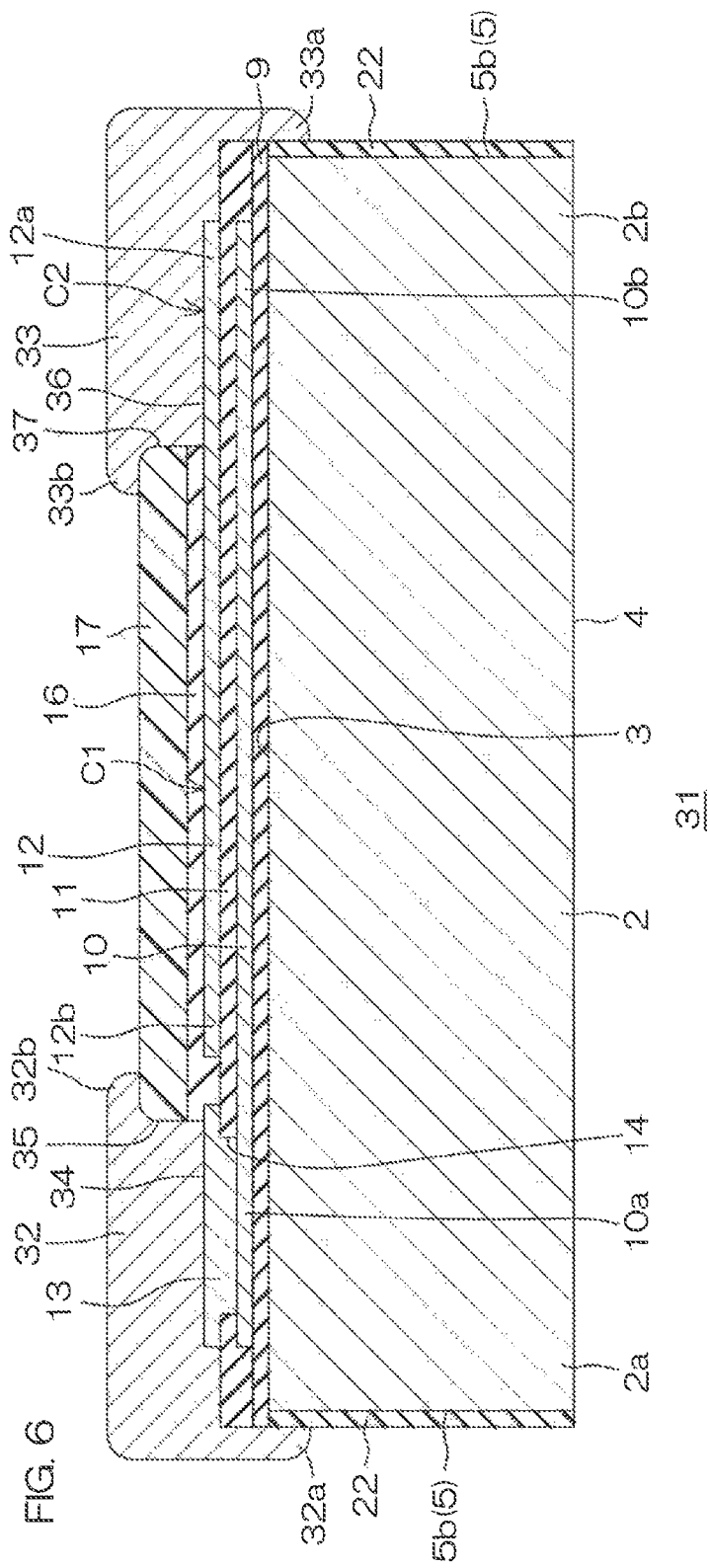
FIG. 6 is a sectional view taken along line VI-VI shown in FIG. 5.

FIG. 5 is a partially cutaway perspective view of a chip capacitor 31 according to a second preferred embodiment of the present invention. FIG. 6 is a sectional view taken along line VI-VI shown in FIG. 5.

In this preferred embodiment, the same reference numerals are applied to the same structures as those described in the first preferred embodiment, and the description thereof is omitted.

Referring to FIG. 5, a first external electrode 32 and a second external electrode 33 are formed, instead of the first external electrode 7 and the second external electrode 8, in the present preferred embodiment.

The first external electrode 32 is formed in a rectangular shape extending along the width direction of the substrate 2 in plan view. The first external electrode 32 is formed so as to wrap around from the first main surface 3 of the substrate 2 to the lateral surface 5 of the substrate 2. The first external electrode 32 has a side covering portion 32a covering the lengthwise lateral surface 5a and the widthwise lateral surface 5b from three directions.

The second external electrode 33 is formed in a rectangular shape extending along the width direction of the substrate 2 in plan view. The second external electrode 33 is formed so as to wrap around from the first main surface 3 of the substrate 2 to the lateral surface 5 of the substrate 2. The second external electrode 33 has a side covering portion 33a covering the lengthwise, lateral surface 5a and the widthwise lateral surface 5b from three directions.

Figure 7:
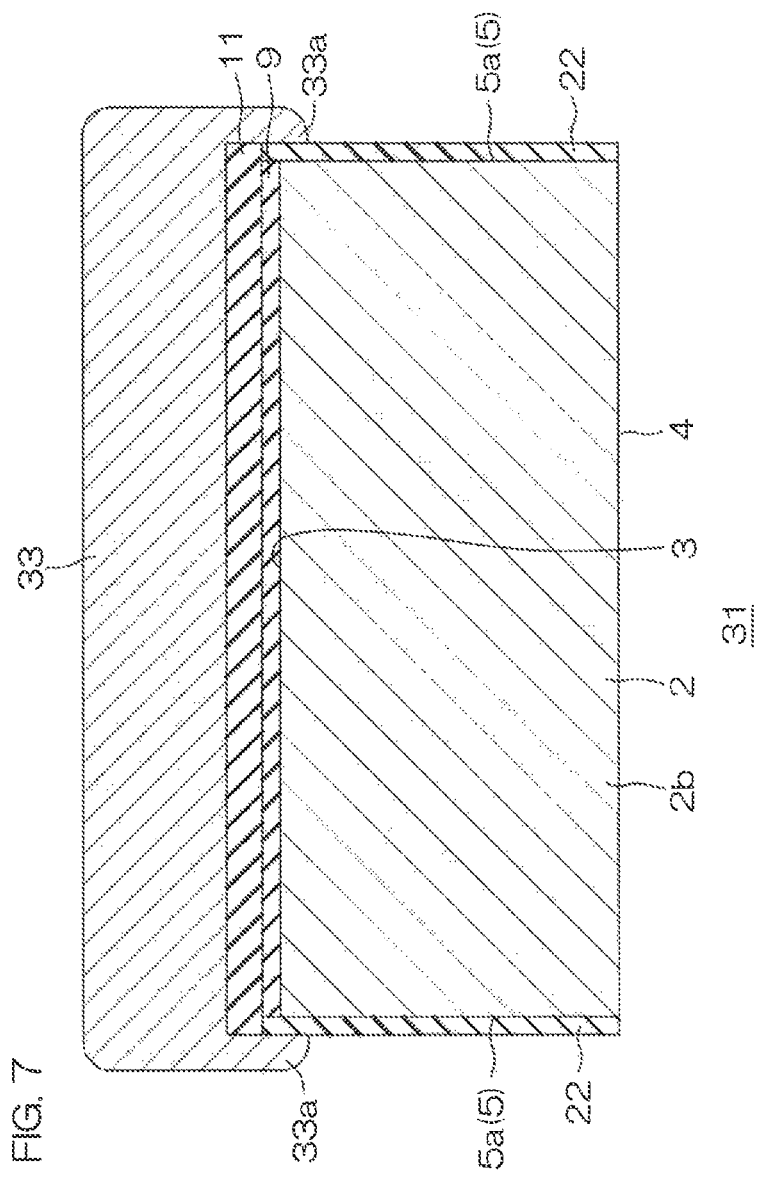
FIG. 7 is a sectional view taken along line VII-VII shown in FIG. 5.

Referring to FIGS. 6 and 7, a first notched portion 35 and a second notched portion 37 are formed in the first passivation film 16 and the resin film 17 instead of the first pad opening 19 and the second pad opening 21.

The first notched portion 35 selectively exposes the pad conductive film 13 as a first pad region 34. The first notched portion 35 selectively exposes a region excluding an edge portion of the second external electrode 33 side in the pad conductive film 13, in the present preferred embodiment.

The second notched portion 37 selectively exposes the second connecting region 12a of the second conductive film 12 as a second pad region 36.

The first external electrode 32 is formed on the first pad region 34 of the pad conductive film 13 exposed from the first notched portion 35. The first external electrode 32 is thus electrically connected to the first conductive film 10.

The first external electrode 32 protrudes from the resin film 17. The first external electrode 32 has a covering portion 32b covering the resin film 17. The first external electrode 32 may include a Ni/Pd/Au laminated film including a Ni film, a Pd film and an Au film laminated in this order from the pad conductive film 13 side.

The second external electrode 33 is formed on the second pad region 36 of the second connecting region 12a exposed from the first notched portion 35. The second external electrode 33 is thus electrically connected to the second conductive film 12.

The second external electrode 33 protrudes from the resin film 17. The second external electrode 33 has a covering portion 33b covering the resin film 17. The second external electrode 33 may include a Ni/Pd/Au laminated film including a Ni film, a Pd film and an Au film laminated in this order from the second conductive film 12 side.

As described above, according to the chip capacitor 31, the substantially same effect as the chip capacitor 1 according to the first embodiment can be achieved. Also, according to the chip capacitor 31, the first external electrode 32 is formed so as to wrap around the lateral surface 5 of the substrate 2. Similarly, the second external electrode 33 is formed so as to wrap around the lateral surface 5 of the substrate 2.

An adhesive area of the first external electrode 32 with respect to a conductive bonding material (for example, solder) can thus be increased. Similarly, an adhesive area of the second external electrode 33 with respect to a conductive bonding material (for example, solder) can thus be increased.

The connection strength of the chip capacitor 31 with respect to a connecting object can thereby be enhanced, in a case where the chip capacitor 31 is mounted onto the connecting object such as a mounting board, etc.

Specifically, according to the chip capacitor 31, the first external electrode 32 covers the lateral surface 5 of the substrate 2 from three directions at the one end portion 2a side of the substrate 2. Similarly, the second external electrode 33 covers the lateral surface 5 of the substrate 2 from three directions at the other end portion 2b side of the substrate 2. The connection strength of the chip capacitor 31 with respect to the connecting object can thus be further enhanced.

Figure 8:
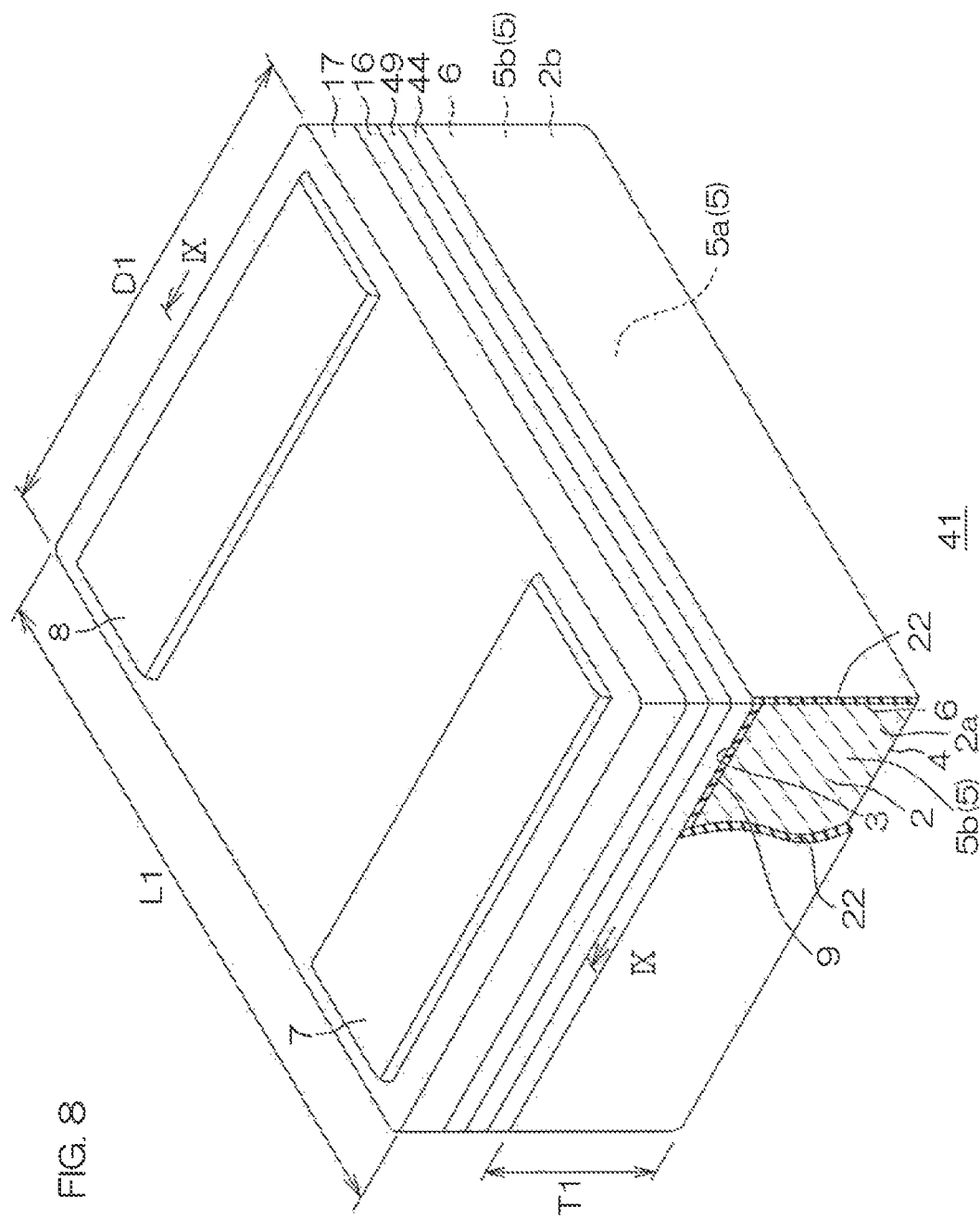
FIG. 8 is a partially cutaway perspective view of a chip capacitor according to a third preferred embodiment of the present invention.
Figure 9:
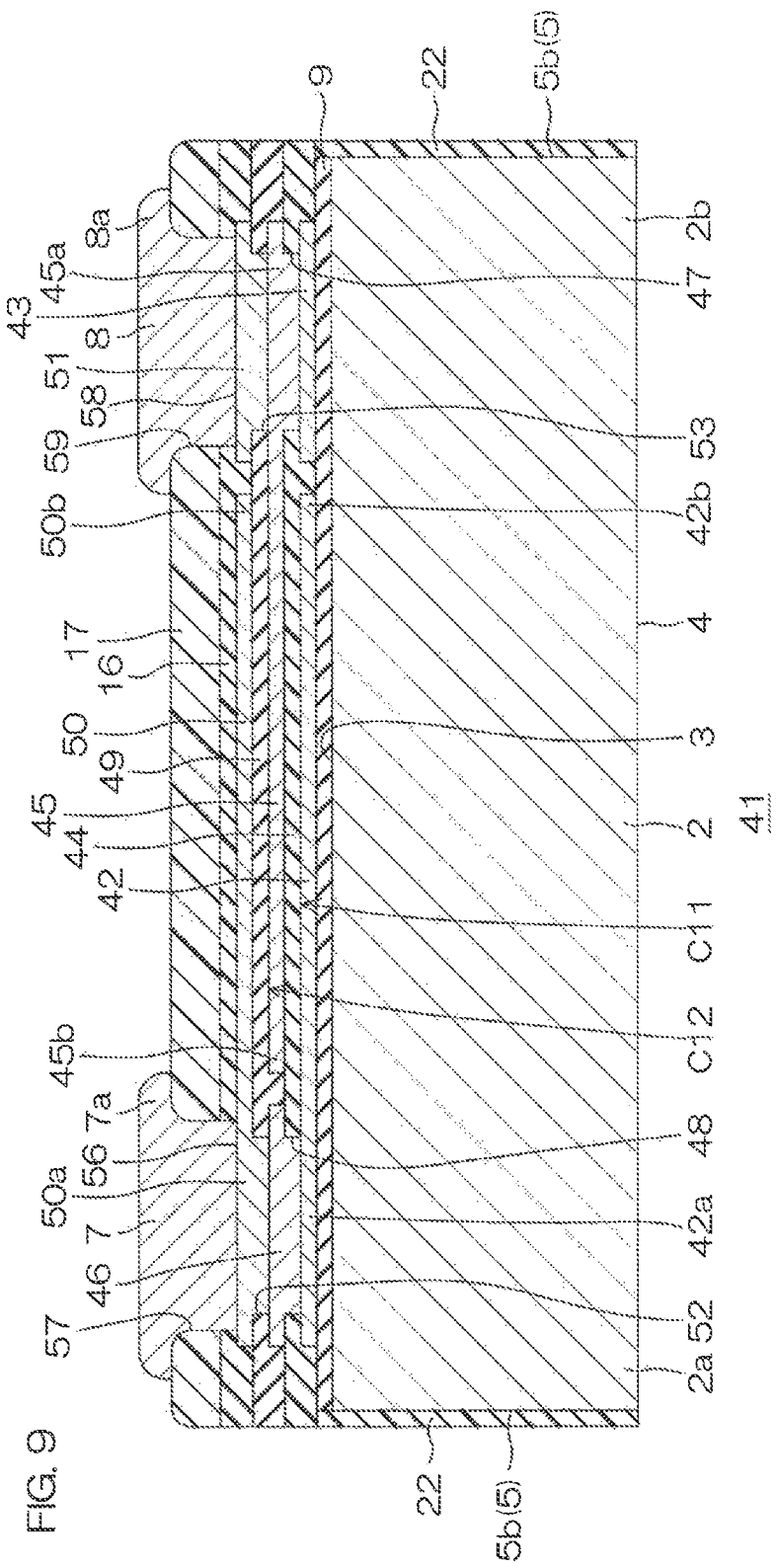
FIG. 9 is a sectional view taken along line IX-IX shown in FIG. 8.

FIG. 8 is a partially cutaway perspective view of a chip capacitor 41 according to a third preferred embodiment of the present invention. FIG. 9 is a sectional view taken along line IX-IX shown in FIG. 8.

Figure 10:
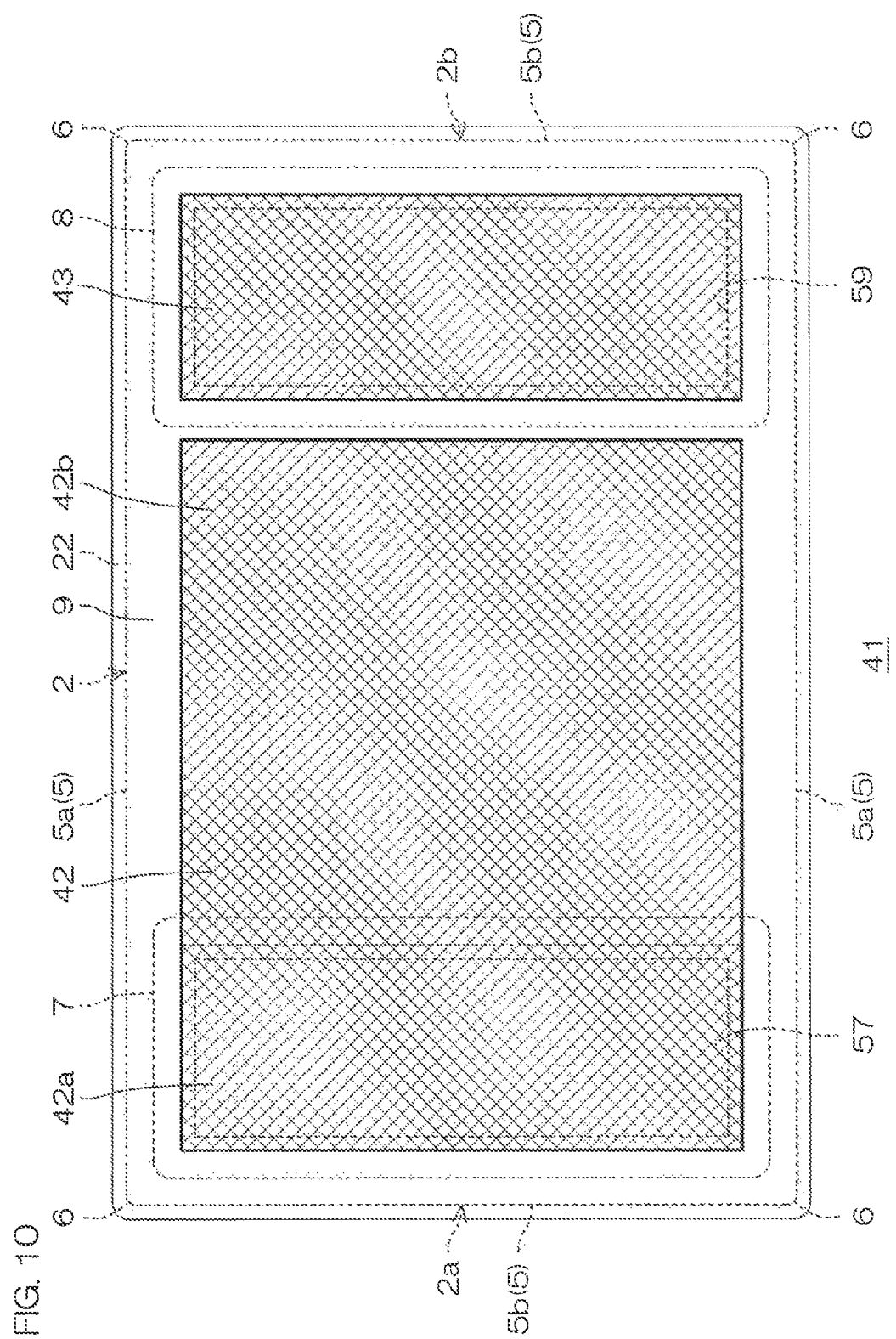
FIG. 10 is a plan view of the chip capacitor shown in FIG. 8, in which structures above a first conductive film are removed.
Figure 11:
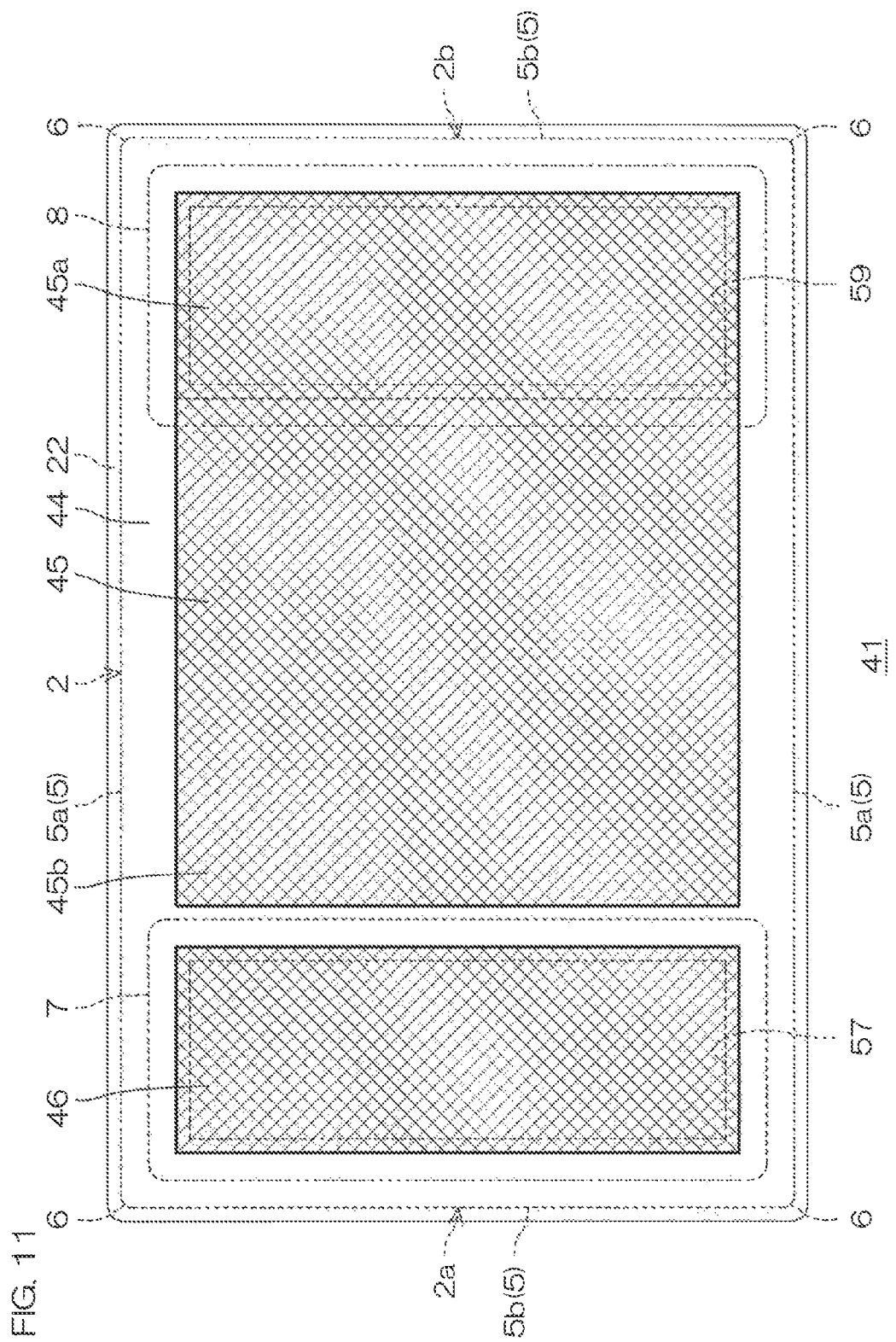
FIG. 11 is a plan view of the chip capacitor shown in FIG. 8, in which structures above a second conductive film are removed.
Figure 12:
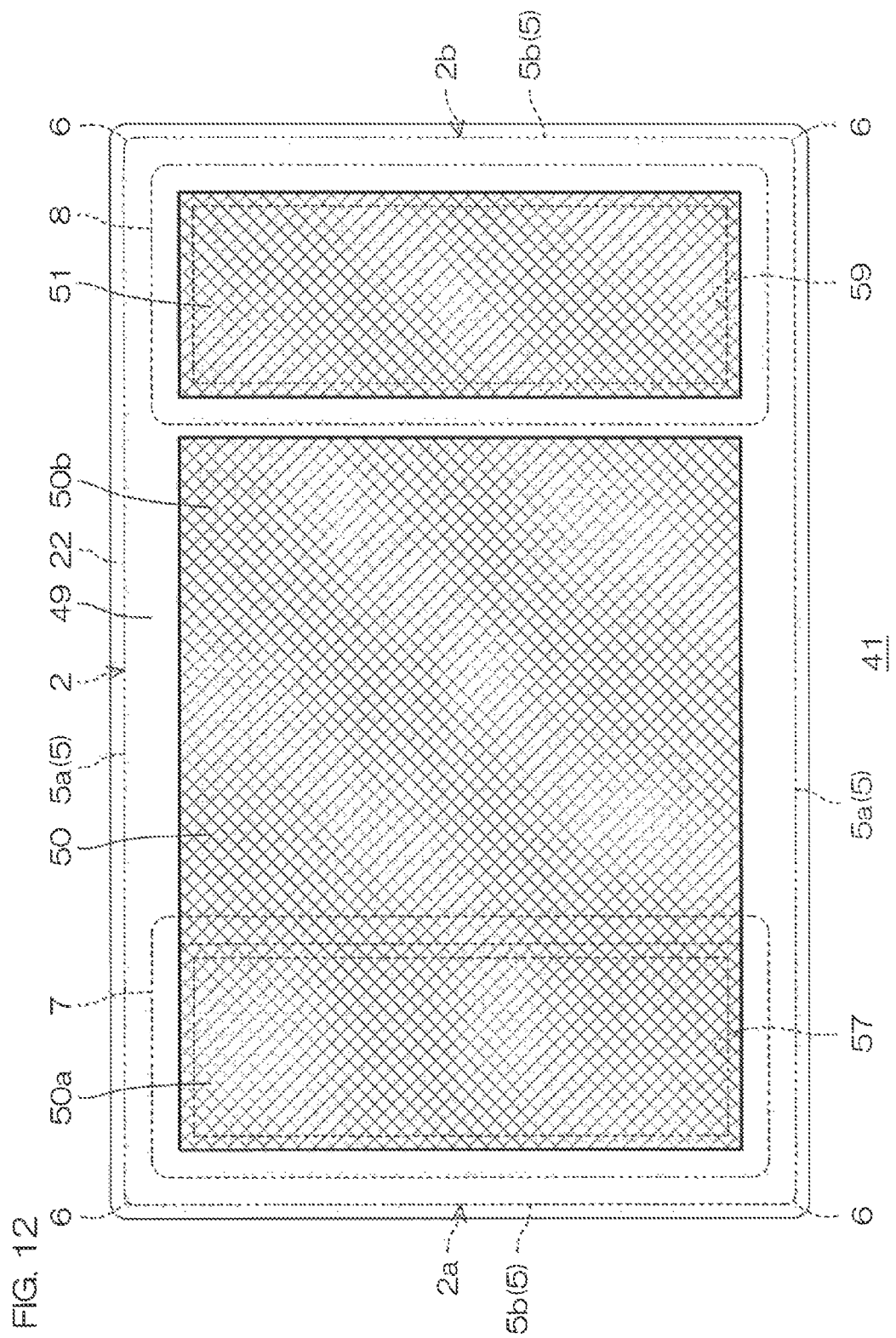
FIG. 12 is a plan view of the chip capacitor shown in FIG. 8, in which structures above a third conductive film are removed.

FIG. 10 is a plan view of the chip capacitor 41 shown in FIG. 8, in which structures above a first conductive film 42 (to be described below) are removed. FIG. 11 is a plan view of the chip capacitor 41 shown in FIG. 8, in which structures above a second conductive film 45 (to be described below) are removed. FIG. 12 is a plan view of the chip capacitor 41 shown in FIG. 8, in which structures above a third conductive film 50 (to be described below) are removed.

In this preferred embodiment, the same reference numerals are applied to the same structures as those described in the first preferred embodiment, and the description thereof is omitted.

Referring to FIGS. 8 and 9, the chip capacitor 41 has a multilayer laminated structure where a plurality of conductor films and a plurality of dielectric films are alternately laminated along the normal direction of the first main surface 3 of the substrate 2.

Referring to FIGS. 9 and 10, a first conductive film 42 and a first pad conductive film 43 are formed on the insulating film 9. The first conductive film 42 and the first pad conductive film 43 are shown by crosshatching for the sake of clarity in FIG. 10.

The first conductive film 42 is formed in a rectangular shape extending from the one end portion 2a side to the other end portion 2b side of the substrate 2 in plan view. The first conductive film 42 may include at least one of Cu, Al, AlSi or AlCu. The first conductive film 42 integrally includes a first connecting region 42a and a first capacitor forming region 42b.

The first connecting region 42a is formed at the one end portion 2a side of the substrate 2. The first connecting region 42a is formed in a region immediately below the first external electrode 7. The first connecting region 42a is formed in a rectangular shape extending along the width direction of the substrate 2 in plan view.

The first capacitor forming region 42b is formed at the other end portion 2b side of the substrate 2 with respect to the first connecting region 42a. The first capacitor forming region 42b is led out from the first connecting region 42a toward the other end portion 2b side of the substrate 2. The first capacitor forming region 42b covers a region between the first external electrode 7 and the second external electrode 8. The first capacitor forming region 42b exposes the region immediately below the second external electrode 8 in the insulating film 9.

An end portion located at the other end portion 2b side of the substrate 2 in the first capacitor forming region 42b may be formed in a region where the insulating film 9 does not face to the second external electrode 8. The end portion located at the other end portion 2b side of the substrate 2 in the first capacitor forming region 42b may be formed in a region where the insulating film 9 faces to the second external electrode 8.

The first pad conductive film 43 is formed at the other end portion 2b side of the substrate 2 with respect to the first conductive film 42. The first pad conductive film 43 is formed apart from the first conductive film 42 along the facing direction where the first external electrode 7 and the second external electrode 8 face each other. The first pad conductive film 43 is formed in a region immediately below the second external electrode 8. The first pad conductive film 43 is formed in a rectangular shape extending along the width direction of the substrate 2 in plan view.

A thickness of the first pad conductive film 43 is substantially equal to a thickness of the first conductive film 42. The pad conductive film 43 may include at least one of Cu, Al, AlSi, or AlCu.

Referring to FIG. 9, a first dielectric film 44 is formed on the insulating film 9. The first dielectric film 44 collectively covers the first conductive film 42 and the first pad conductive film 43. The first dielectric film 44 may include an SiO$_2$ film or an SiN film. The first dielectric film 44 may include an ONO film including an oxide film (SiO$_2$ film)/a nitride film (SiN film)/an oxide film (SiO$_2$ film) formed in this order from the substrate 2 side.

Referring to FIGS. 9 and 11, a second conductive film 45 and a second pad conductive film 46 are formed on the first dielectric film 44. The second conductive film 45 and the second pad conductive film 46 are shown by crosshatching for the sake of clarity in FIG. 11.

The second conductive film 45 is formed in a rectangular shape extending from the other end portion 2b side to the one end portion 2a side of the substrate 2 in plan view. The second conductive film 45 may include at least one of Cu, Al, AlSi or AlCu. The second conductive film 45 integrally includes a second connecting region 45a and a second capacitor forming region 45b.

The second connecting region 45a is formed at the other end portion 2b side of the substrate 2. The second connecting region 45a is formed in the region immediately below the second external electrode 8. The second connecting region 45a is formed in a rectangular shape extending along the width direction of the substrate 2 in plan view.

A first via film 47 selectively exposing the first pad conductive film 43 is formed in the first dielectric film 44. The second connecting region 45a is electrically connected to the first pad conductive film 43 through the first via film 47.

The first dielectric film 44 without the first via hole 47 may be adopted. In this case, the second connecting region 45a of the second conductive film 45 faces to the first pad conductive film 43 across the first dielectric film 44.

The second capacitor forming region 45b is formed at the one end portion 2a side of the substrate 2 with respect to the second connecting region 45a. The second capacitor forming region 45b is led out from the second connecting region 45a of the second conductive film 45 toward the one end portion 2a side of the substrate 2.

The second capacitor forming region 45b covers a region between the first external electrode 7 and the second external electrode 8. The second capacitor forming region 45b faces to the first capacitor forming region 42b across the first dielectric film 44. The second capacitor forming region 45b exposes the region immediately below the first external electrode 7.

An end portion located at the one end portion 2a side of the substrate 2 in the second capacitor forming region 45b may be formed in a region where the insulating film 9 does not face to the first external electrode 7. The end portion located at the one end portion 2a side of the substrate 2 in the second capacitor forming region 45b may be formed in a region where the insulating film 9 faces to the first external electrode 7.

The second pad conductive film 46 is formed at the one end portion 2a side of the substrate 2 with respect to the second conductive film 45. The second pad conductive film 46 is formed apart from the second conductive film 45 along the facing direction where the first external electrode 7 and the second external electrode 8 face each other. The second pad conductive film 46 is formed in the region immediately below the first external electrode 7. The second pad conductive film 46 formed in a rectangular shape extending along the width direction of the substrate 2 in plan view.

A thickness of the second pad conductive film 46 is substantially equal to a thickness of the second conductive film 45. The second pad conductive film 46 may include at least one of Cu, Al, AlSi, or AlCu.

A second via hole 48 selectively exposing the first connecting region 42a of the first conductive film 42 is formed in the first dielectric film 44. The second pad conductive film 46 is electrically connected to the first connecting region 42a through the second via hole 48.

Referring to FIG. 9, a second dielectric film 49 is formed on the first dielectric film 44. The second dielectric film 49 collectively covers the second conductive film 45 and the second pad conductive film 46. The second dielectric film 49 may include an $SiO_2$ film or an SiN film. The second dielectric film 49 may include an ONO film including an oxide film ($SiO_2$ film)/a nitride film (SiN film)/an oxide film ($SiO_2$ film) formed in this order from the substrate 2 side.

Referring to FIGS. 9 and 12, a third conductive film 50 and a third pad conductive film 51 are formed on the second dielectric film 49. The third conductive film 50 and the third pad conductive film 51 are shown by crosshatching for the sake of clarity in FIG. 12.

The third conductive film 50 is formed in a rectangular shape extending from the one end portion 2a side to the other end portion 2b side of the substrate 2 in plan view. The conductive film 50 may include at least one of Cu, Al, AlSi or AlCu. The third conductive film 50 integrally includes a third connecting region 50a and a third capacitor forming region 50b.

The third connecting region 50a is formed at the one end portion 2a side of the substrate 2. The third connecting region 50a is formed in the region immediately below the first external electrode 7. The third connecting region 50a is formed in a rectangular shape extending along the width direction of the substrate 2 in plan view.

A third via hole 52 selectively exposing the second pad conductive film 46 is formed in the second dielectric film 49. The third connecting region 50a is electrically connected to the second pad conductive film 46 through the third via hole 52.

The third capacitor forming region 50b is formed at the other end portion 2b side of the substrate 2 with respect to the third connecting region 50a. The third capacitor forming region 50b is led out form the third connecting region 50a of the third conductive film 50 toward the other end portion 2b side of the substrate 2

The third capacitor forming region 50b covers the region between the first external electrode 7 and the second external electrode 8. The third capacitor forming region 50b faces to the second capacitor forming region 45b across the second dielectric film 49. The third capacitor forming region 50b exposes the region immediately below the second external electrode 8 in the second dielectric film 49.

An end portion located at the other end portion 2b side of the substrate 2 in the third capacitor forming region 50b may be formed in a region where the insulating film 9 does not face to the second external electrode 8. The end portion located at the other end portion 2b side of the substrate 2 in the third capacitor forming region 50b may be formed in a region where the insulating film 9 faces to the second external electrode 8.

The third pad conductive film 51 is formed at the other end portion 2b side of the substrate 2 with respect to the third conductive film 50. The third pad conductive film 51 is formed apart from the third conductive film 50 along the facing direction where the first external electrode 7 and the second external electrode 8 face each other. The third pad conductive film 51 is formed in the region immediately below the second external electrode 8. The third pad conductive film 51 formed in a rectangular shape extending along the width direction of the substrate 2 in plan view.

A thickness of the third pad conductive film 51 is substantially equal to a thickness of the third conductive film 50. The third pad conductive film 51 may include at least one of Cu, Al, AlSi, or AlCu.

A forth via hole 53 selectively exposing the second connecting region 45a of the second conductive film 45 is formed in the second dielectric film 49. The third pad conductive film 51 is electrically connected to the second connecting region 45a through the forth via hole 53.

Referring to FIG. 9, a first capacitor region C11 and a second capacitor region C12 are formed on the first main surface 3 of the substrate 2. The first capacitor region C11 is formed by a laminated film including the first conductive film 42, the first dielectric film 44 and the second conductive film 45. The second capacitor region C12 is formed by a laminated film including the second conductive film 45, the second dielectric film 49 and the third conductive film 50.

The first capacitor region C11 and the second capacitor region C12 are laminated along the normal direction of the first main surface 3 of the substrate 2, in the present preferred embodiment. The laminated structure including the first capacitor region C11 and the second capacitor region C12 allows the capacity of the chip capacitor 41 to be increased.

Referring to FIG. 9, the first passivation film 16 and the resin film 17 are formed in this order on the second dielectric film 49. The first passivation film 16 covers the third conductive film 50 and the third pad conductive film 51. The resin film 17 covers the first passivation film 16.

A first pad opening 57 and a second pad opening 59 are formed in the first passivation film 16 and the resin film 17.

The first pad opening 57 selectively exposes a region excluding an edge portion of the third connecting region 50a of the third conductive film 50 as a first pad region 56. The second pad opening 59 selectively exposes a region excluding an edge portion of the third pad conductive film 51 as a second pad region 58.

The first external electrode 7 is formed in the first pad opening 57. The first external electrode 7 is connected to the first pad region 56 inside the first pad opening 57. The first external electrode 7 is thus electrically connected to the first conductive film 42 and the third conductive film 50.

The second external electrode 8 is formed in the second pad opening 59. The second external electrode 8 is connected to the second pad region 58 inside the second pad opening 59. The second external electrode 8 is thus electrically connected to the second conductive film 45.

As described above, according to the chip capacitor 41, the multilayer laminated structure including the first conductive film 42, the first dielectric film 44, the second conductive film 45, the second dielectric film 49 and the third conductive film 50 is formed on the first main surface 3 of the substrate 2.

The first capacitor region C11 and the second capacitor region C12 are thus formed along the normal direction of the first main surface 3 of the substrate 2. The chip capacitor 41 capable of realizing enlargement of capacity and miniaturization can thereby be provided.

Further, according to the chip capacitor 41, the first pad conductive film 43 is interposed in a region between the first main surface 3 of the substrate 2 and the second connecting region 45a of the second conductive film 45. Also, the second pad conductive film 46 is interposed in a region between the first connecting region 42a of the first conductive film 42 and the third connecting region 50a of the third conductive film 50. Furthermore, the third pad conductive film 51 is interposed in a region between the second connecting region 45a of the second conductive film 45 and the second external electrode 8.

Each flatness of the first conductive film 42, the first dielectric film 44, the second conductive film 45, the second dielectric film 49 and the third conductive film 50 can thus be enhanced.

Additionally, the height variations occurring between the second external electrode 8 connected to the third pad conductive film 51 and the first external electrode 7 connected to the third connecting region 50a of the third conductive film 50 can be suppressed. The mounting failure caused by the height variations between the first external electrode 7 and the second external electrode 8 can thereby be reduced, in a case where the chip capacitor 41 is mounted onto a connecting object such as a mounting board, etc.

In the present preferred embodiment, from the view point of laminated number of the conductive films, the first conductive film 42 is formed in a first layer, the second conductive film 45 is formed in a second layer, and the third conductive film 50 is formed in a third layer. However, a structure where a plurality of the second conductive film 45 and a plurality of the third conductive film 50 are alternately laminated on the first conductive film 42 across the second dielectric film 49 interposed therebetween may be adopted.

In this case, the second conductive film 45 is formed in a 2n layer (n is a natural number), and the third conductive film 50 is formed in a 2n+1 layer. The second conductive film 46 may be formed in the 2n layer. The third pad conductive film 51 may be formed in the 2n+1 layer.

Figure 13:
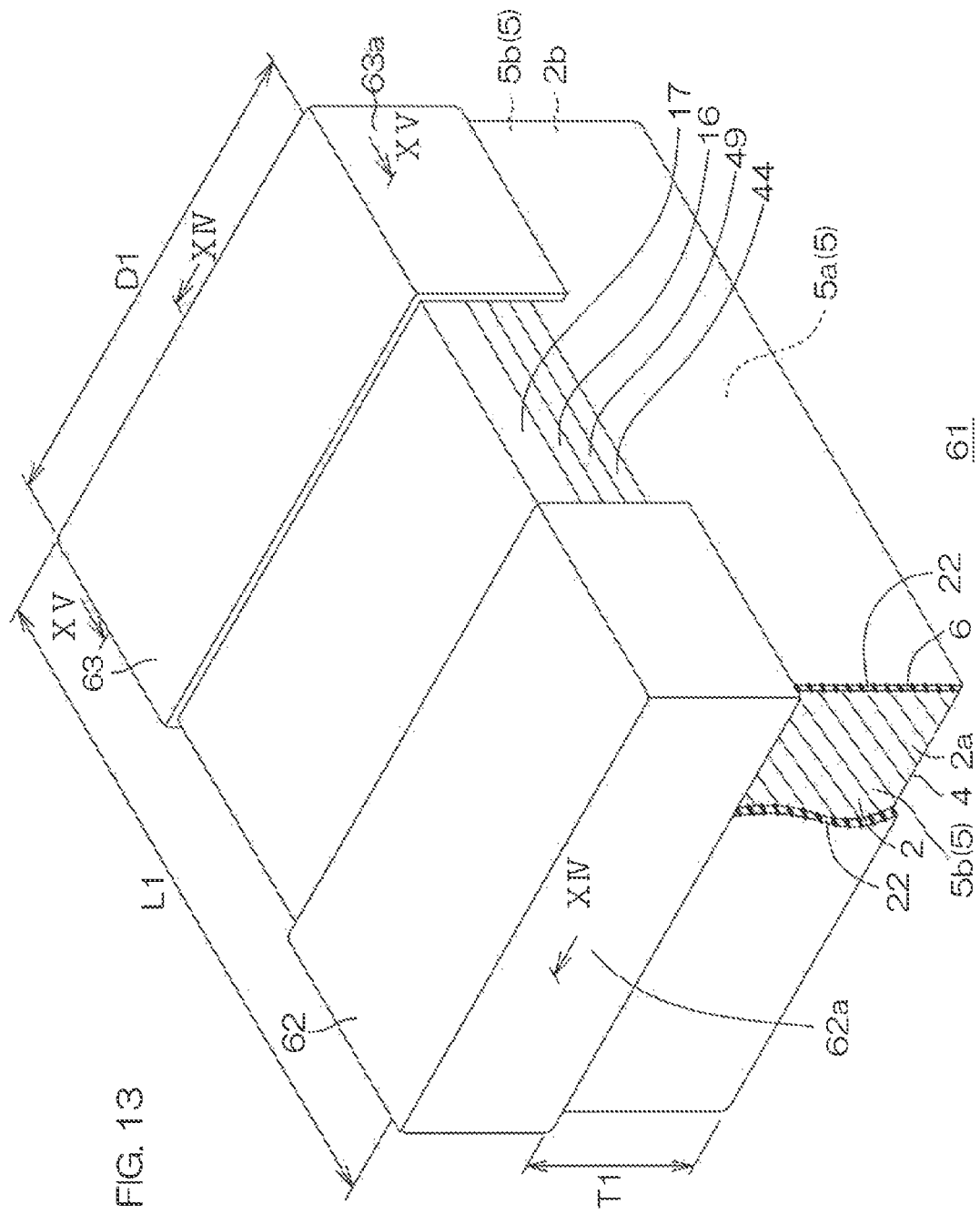
FIG. 13 is a partially cutaway perspective view of a chip capacitor according to a fourth preferred embodiment of the present invention.
Figure 14:
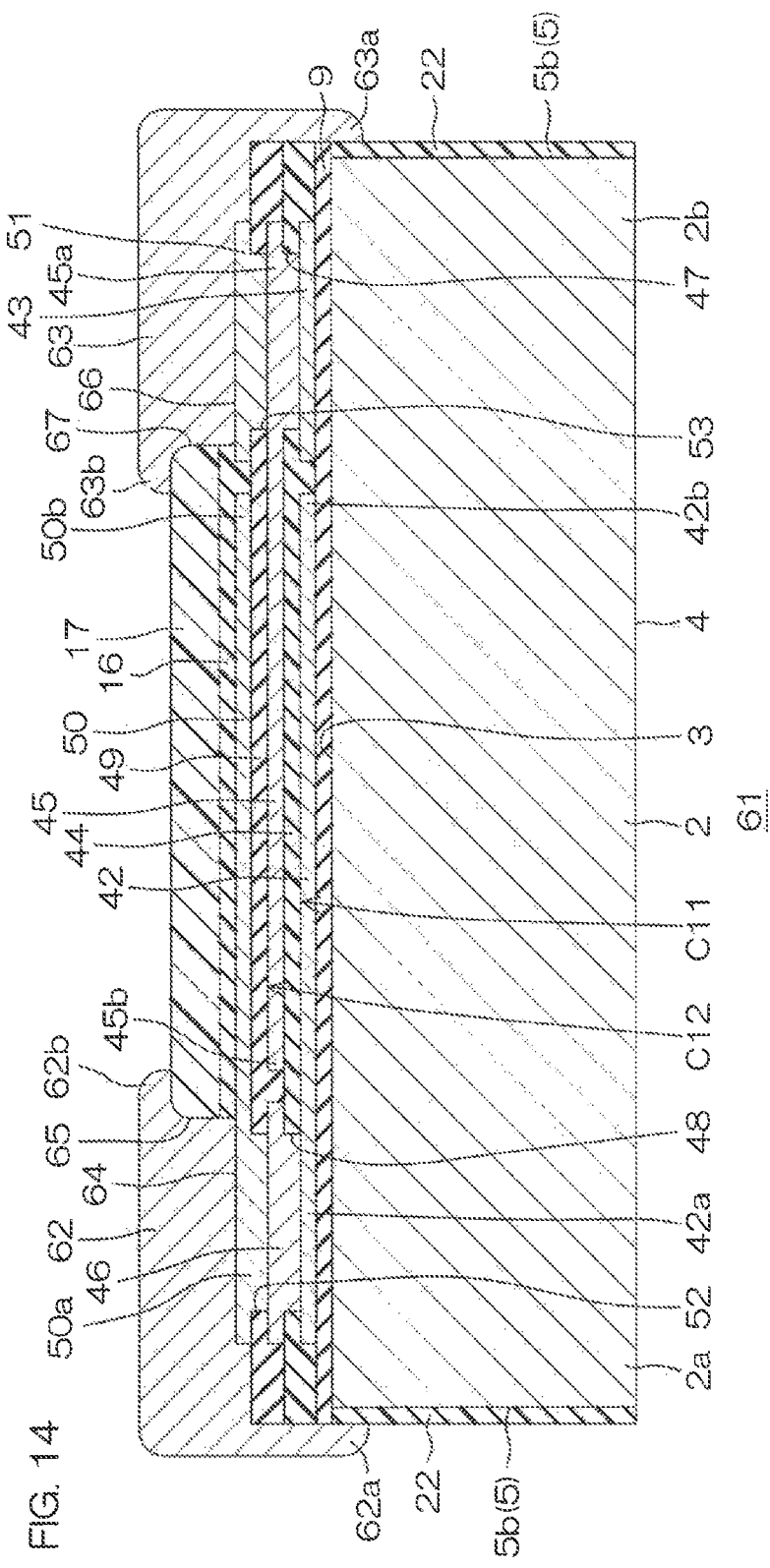
FIG. 14 is a sectional view taken along line XIV-XIV shown in FIG. 13.

FIG. 13 is a partially cutaway perspective view of a chip capacitor 61 according to a fourth preferred embodiment of the present invention. FIG. 14 is a sectional view taken along line XIV-XIV shown in FIG. 13.

In this preferred embodiment, the same reference numerals are applied to the same structures as those described in the first preferred embodiment, and the description thereof is omitted.

Figure 15:
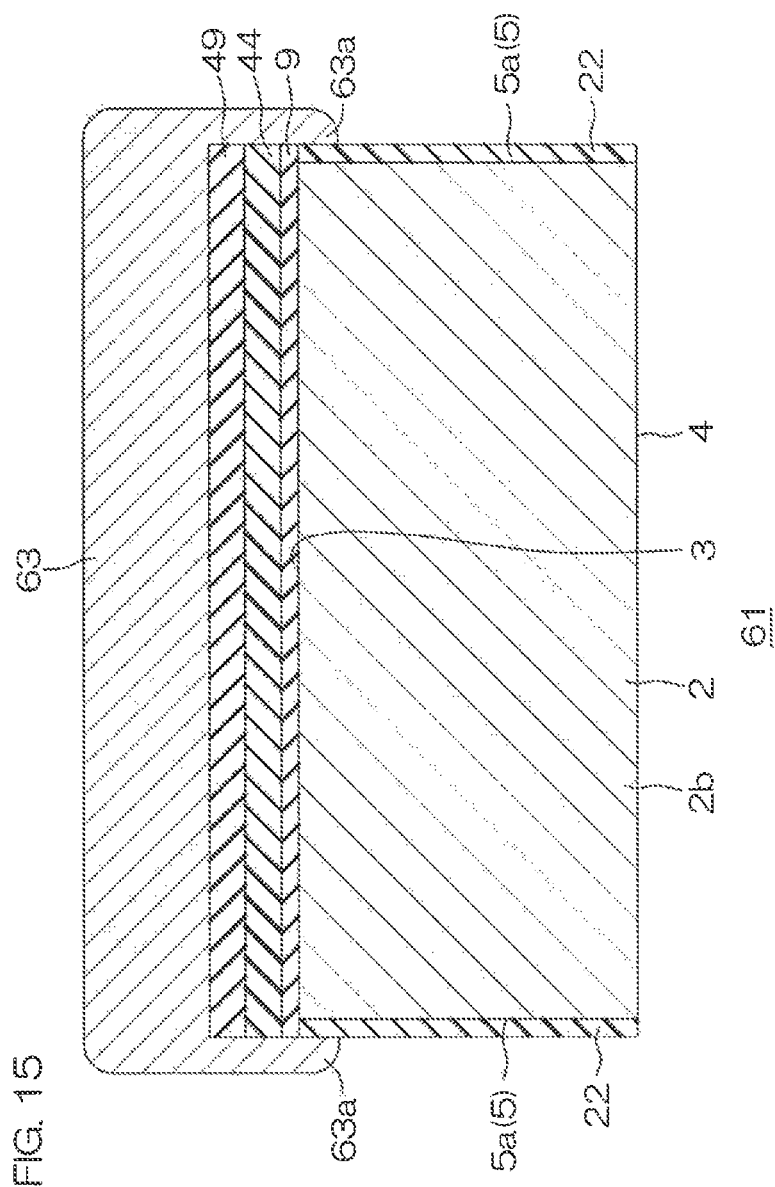
FIG. 15 is a sectional view taken along line XV-XV shown in FIG. 13.

Referring to FIGS. 13 to 15, a first external electrode 62 and a second external electrode 63 are formed, instead of the first external electrode 7 and the second external electrode 8, in the present preferred embodiment.

The first external electrode 62 is formed at the one end portion 2a side of the substrate 2 on the first main surface 3 of the substrate 2. The first external electrode 62 is formed in a rectangular shape extending along the width direction of the substrate 2 in plan view.

The first external electrode 62 is formed so as to wrap around from the first main surface 3 of the substrate 2 to the lateral surface 5 of the substrate 2. The first external electrode 62 has a side covering portion 62a covering the lengthwise lateral surface 5a and the widthwise lateral surface 5b from three directions.

The second external electrode 63 is formed at the other end portion 2b side of the substrate 2 on the first main surface 3 of the substrate 2. The second external electrode 63 is formed in a rectangular shape extending along the width direction of the substrate 2 in plan view.

The second external electrode 63 is formed so as to wrap around from the first main surface 3 of the substrate 2 to the lateral surface 5 of the substrate 2. The second external electrode 63 has a side covering portion 63a covering the lengthwise lateral surface 5a and the widthwise lateral surface 5b from three directions.

A first notched portion 65 and a second notched portion 67 are formed in the first passivation film 16 and the resin film 17 instead of the first pad opening 57 and the second pad opening 59.

The first notched portion 65 selectively exposes the third connecting region 50a of the third conductive film 50 as a first pad region 64. The second notched portion 67 selectively exposes the third pad conductive film 51 as a second pad region 66. The second notched portion 67 selectively exposes a region excluding an edge portion of the first external electrode 62 side in the third pad conductive film 51.

The first external electrode 62 is formed on the first pad region 64 exposed from the first notched portion 65. The first external electrode 62 is connected to the first pad region 64 at the first notched portion 65. The first external electrode 62 is thus electrically connected to the first conductive film 42 and the third conductive film 50.

The first external electrode 62 protrudes from the resin film 17. The first external electrode 62 has the covering portion 62b covering the resin film 17. The first external electrode 62 may include a Ni/Pd/Au laminated film including a Ni film, a Pd film and an Au film laminated in this order from the third conductive film 50 side.

The second external electrode 63 is formed on the second pad region 66 exposed from the second notched portion 67. The second external electrode 63 is connected to the second pad region 66 at the second notched portion 67. The second external electrode 63 is thus electrically connected to the second conductive film 45.

The second external electrode 63 protrudes from the resin film 17. The first external electrode 62 has the covering portion 63b covering the resin film 17. The second external electrode 63 may include a Ni/Pd/Au laminated film including a Ni film, a Pd film and an Au film laminated in this order from the third pad conductive film 51 side.

As described above, according to the chip capacitor 61, the substantially same effect as the chip capacitor 41 according to the third embodiment can be achieved.

Also, according to the chip capacitor 61, the first external electrode 62 is formed so as to wrap around the lateral surface 5 of the substrate 2. Similarly, the second external electrode 63 is formed so as to wrap around to the lateral surface 5 of the substrate 2.

An adhesive area of the first external electrode 62 with respect to a conductive bonding material (for example, solder) can thereby be increased. Similarly, an adhesive area of the conductive bonding material (for example, solder) with respect to the second external electrode 63 can thereby be increased.

The connection strength of the chip capacitor 61 with respect to a connecting object can thus be enhanced, in a case where the chip capacitor 61 is mounted onto the connecting object such as a mounting board, etc.

Specifically, according to the chip capacitor 61, the first external electrode 62 covers the lateral surface 5 of the substrate 2 from three directions at the one end portion 2a side of the substrate 2. Similarly, the second external electrode 63 covers the lateral surface 5 of the substrate 2 from three directions at the other end portion 2b side of the substrate 2. The connection strength of the chip capacitor 61 with respect to the connecting object can thus be further enhanced.

Figure 16:
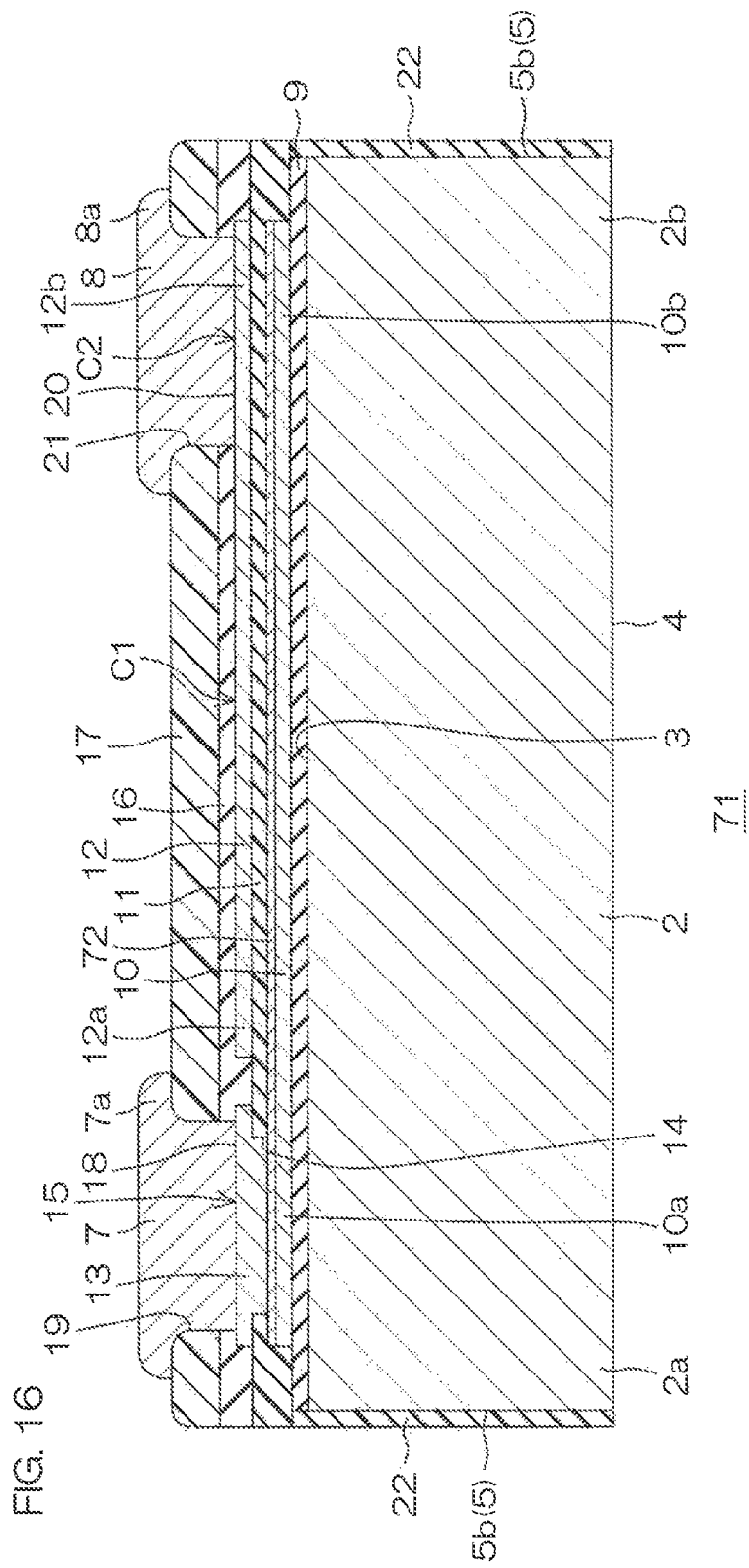
FIG. 16 is a sectional view of a chip capacitor according to a fifth preferred embodiment of the present invention.

FIG. 16 is a sectional view of a chip capacitor 71 according to a fifth preferred embodiment of the present invention. In the present preferred embodiment, the same reference numerals are applied to the same structures as those described in the first preferred embodiment, and the description thereof is omitted.

The chip capacitor 71 further includes a barrier conductive film 72 interposed in a region between the first conductive film 10 and the dielectric film 11.

The barrier conductive film 72 covers a substantially whole region of the first conductive film 10. The barrier conductive film 72 has a shape matching a shape of the first conductive film 10 in plan view. The film 72 may include at least one of Ti, TiN, W or TiW.

A thickness of the barrier conductive film 72 is smaller than a thickness of the first conductive film 10. The thickness of the barrier conductive film 72 is, for example, equal to or greater than 0.01 times and equal to or smaller than 0.1 times of the thickness of the first conductive film 10. The thickness of the barrier conductive film 72 is, for example, equal to or greater than 100 Å and equal to or smaller than 3000 Å. The thickness of the first conductive film 10 is, for example, equal to or greater than 1000 Å and equal to or smaller than 30000 Å.

A fine convexoconcave called hillock can be formed at a surface of the first conductive film 10. The barrier conductive film 72 fills the hillock formed at the surface of the first conductive film 10.

The entering of the dielectric film 11 into the hillock formed in the surface of the first conductive film 10 can thereby be suppressed. The local electric field concentration due to hillock can thus be suppressed. As a result, the breakdown voltage and ESD (Electro Static Discharge) damage resistance can be improved.

In addition, the barrier conductive film 72 has the flat surface. The flatness of the dielectric film 11 formed on the barrier conductive film 72 can thereby be enhanced. Also, the flatness of the second conductive film 12 formed on the dielectric film 11 can thereby be enhanced. From this view point, the local electric field concentration caused by hillock can be suppressed as well.

As described above, according to the present preferred embodiment, the chip capacitor 71 capable of improvement of the electric dielectric strength can thereby be provided. The structure where the barrier conductive film 72 is formed in the region between the conductive film and the dielectric film can be applied to the second to fourth preferred embodiments described above.

Although the first to fifth preferred embodiments of the present invention have been described above, the present invention may also be implemented in yet other modes.

In each of the first to fifth preferred embodiments, the substrate 2 may be a semiconductor substrate. The semiconductor substrate may be a silicon substrate.

In each of the first to fifth preferred embodiments, the substrate 2 may be an insulating substrate. The insulating substrate may be a glass substrate or a resin substrate. The glass may include an $SiO_2$. The resin may include an epoxy resin.

Figure 17:
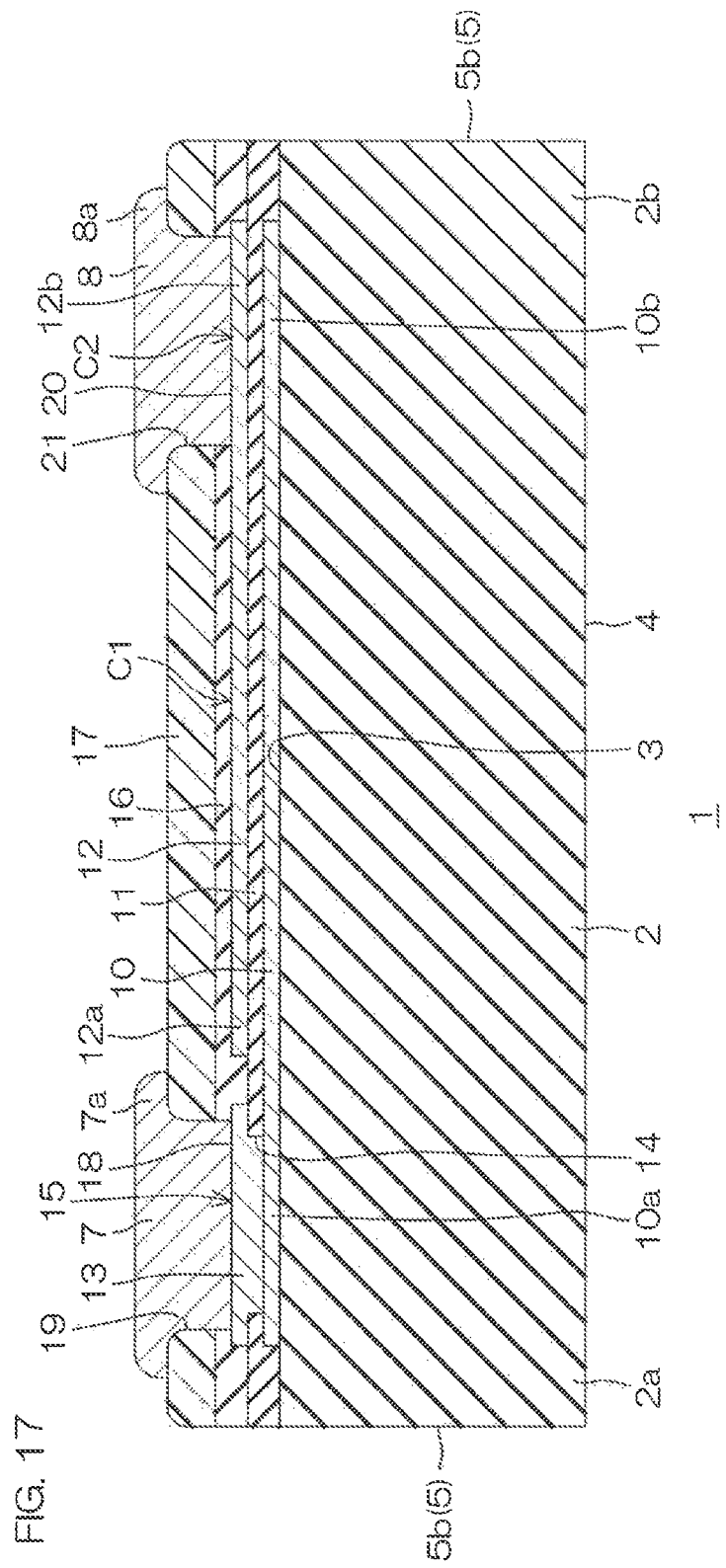
FIG. 17 is a sectional view showing a modified example of the chip capacitor shown in FIG. 1.

In a case where the substrate 2 includes the insulating substrate, a structure shown in FIG. 17 can be adopted. FIG. 17 is a sectional view showing a modified example of the chip capacitor 1 shown in FIG. 1. In FIG. 17, the same reference numerals are applied to the same structures as those described in the first preferred embodiment, and the description thereof is omitted.

As shown in FIG. 17, the first conductive film 10 may be in contact with the first main surface 3 of the substrate 2. This structure can also be applied to the second to fifth preferred embodiments.

The respective configurations of the first to fifth preferred embodiments may be arbitrarily combined therebetween.

The chip capacitor 1, 31, 41, 61, 71 according to the first to fifth embodiments can be incorporated into a mobile terminal such as a portable electronic device, etc., as a circuit element for a power supply circuit, a circuit element for a high frequency circuit, a circuit element for a digital circuit and the like.

Figure 18:
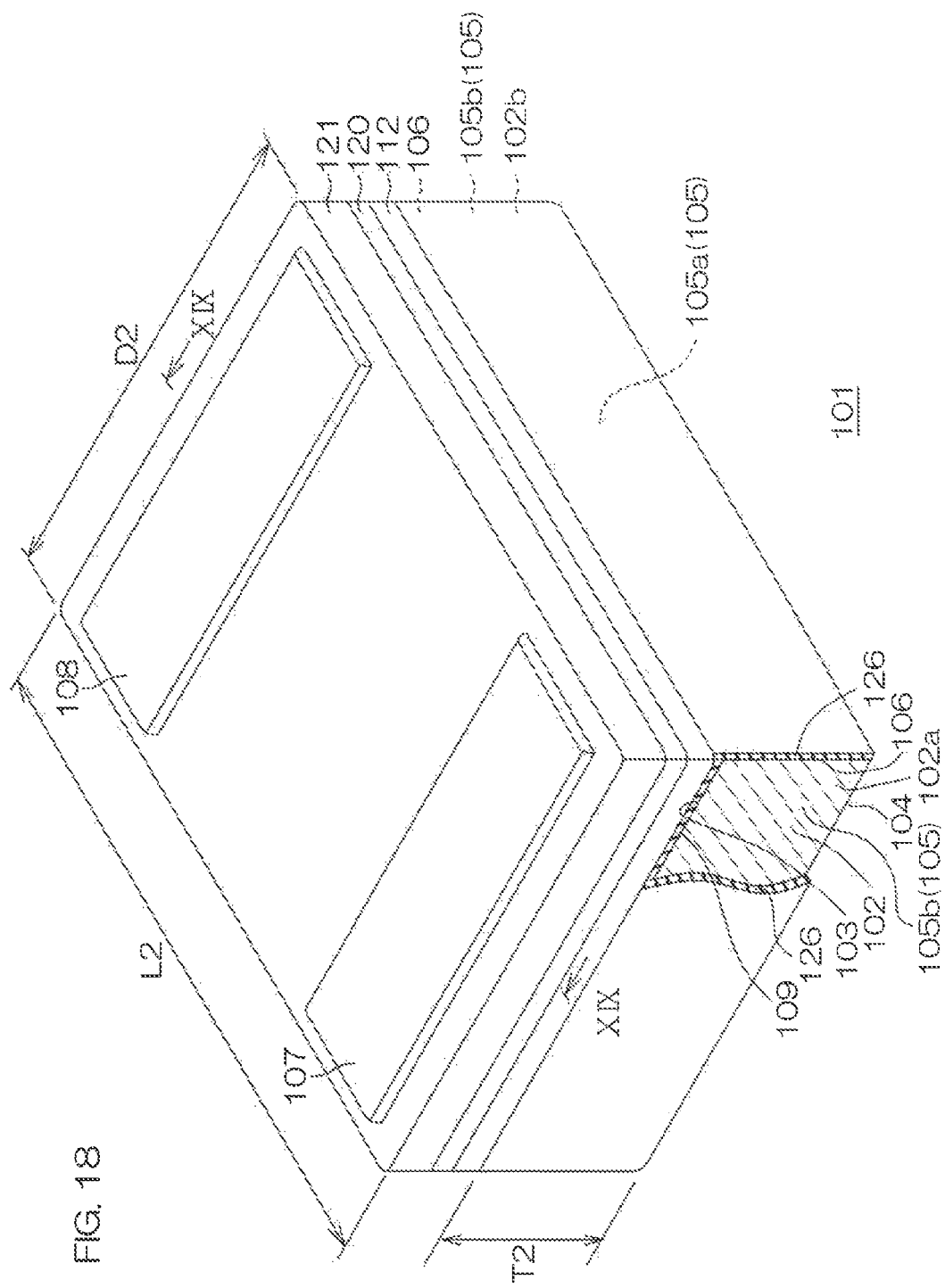
FIG. 18 is a partially cutaway perspective view of a chip capacitor according to a sixth preferred embodiment of the present invention.

FIG. 18 is a partially cutaway perspective view of a chip capacitor 101 according to a sixth preferred embodiment of the present invention.

The chip capacitor 101 is a minute chip part called 0603 (0.6 mm×0.3 mm) chip, 0402 (0.4 mm×0.2 mm) chip, 03015 (0.3 mm×0.15 mm) chip, etc.

Referring to FIG. 18, the chip capacitor 101 includes, a substrate 102. The substrate 102 is formed in a parallelepiped shape. The substrate 102 includes a first main surface 103, a second main surface 104 located on an opposite side of the first main surface 103, and a lateral surface 105 connecting the first main surface 103 and the second main surface 104. The first main surface 103 and the second main surface 104 are formed in a rectangular shape in a plan view as viewed from their normal direction (hereinafter referred to as "plan view").

Hereinafter, a pair of the lateral surfaces 105 extending along the longitudinal direction of the substrate 102 among the lateral surfaces 105 is called lengthwise lateral surface 105a, and a pair of the lateral surfaces 105 extending along the width direction is called widthwise lateral surface 105b.

A length L2 of the lengthwise lateral surface 105a of the substrate 102 is, for example, equal to or greater than 0.3 mm and equal to or smaller than 0.6 mm A length D2 of the widthwise lateral surface 105b of the substrate 102 is, for example, equal to or greater than 0.15 mm and equal to or smaller than 0.3. A thickness T2 of the substrate 102 is, for example, equal to or greater than 0.1 mm and equal to or smaller than 0.2 mm.

Each corner portions 106 of the substrate 102 may be a round shape chamfered in plan view. According to the corner portions 106 having the round shape, external forces can be dispersed along the outer surfaces thereof. The occurrence of crack on the corner portions 106 can thereby be suppressed.

A first external electrode 107 and a second external electrode 108 are formed on the first main surface 103 of the substrate 102.

The first external electrode 107 is formed at one end portion 102a side of the substrate 102. The first external electrode 107 is formed in a rectangular shape extending along the width direction of the substrate 102 in plan view.

the second external electrode 108 is formed at the other end portion 102b side of the substrate 102. The second external electrode 108 is formed in a rectangular shape extending along the width direction of the substrate 102 in plan view.

Figure 19:
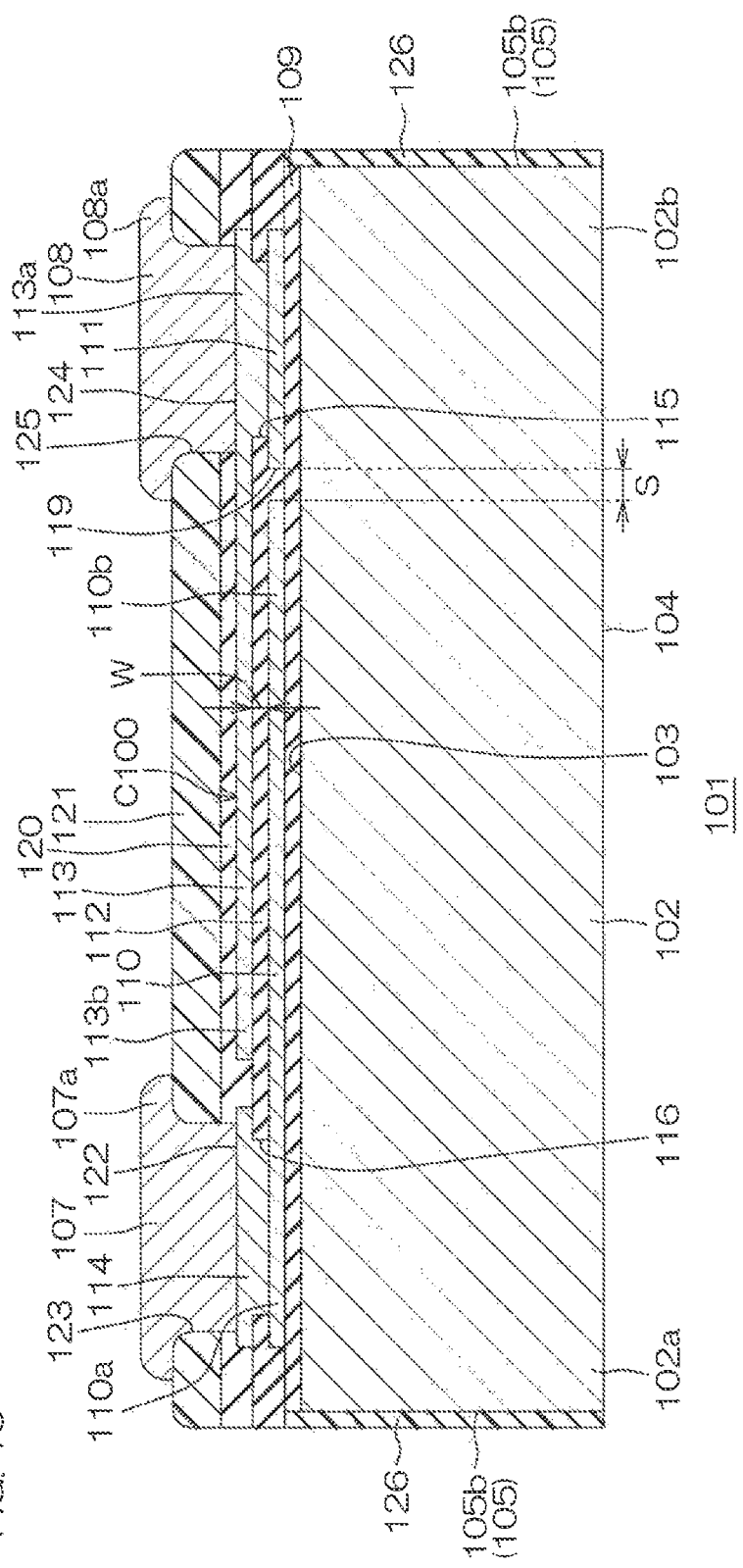
FIG. 19 is a sectional view taken along line XIX-XIX shown in FIG. 18.
Figure 20:
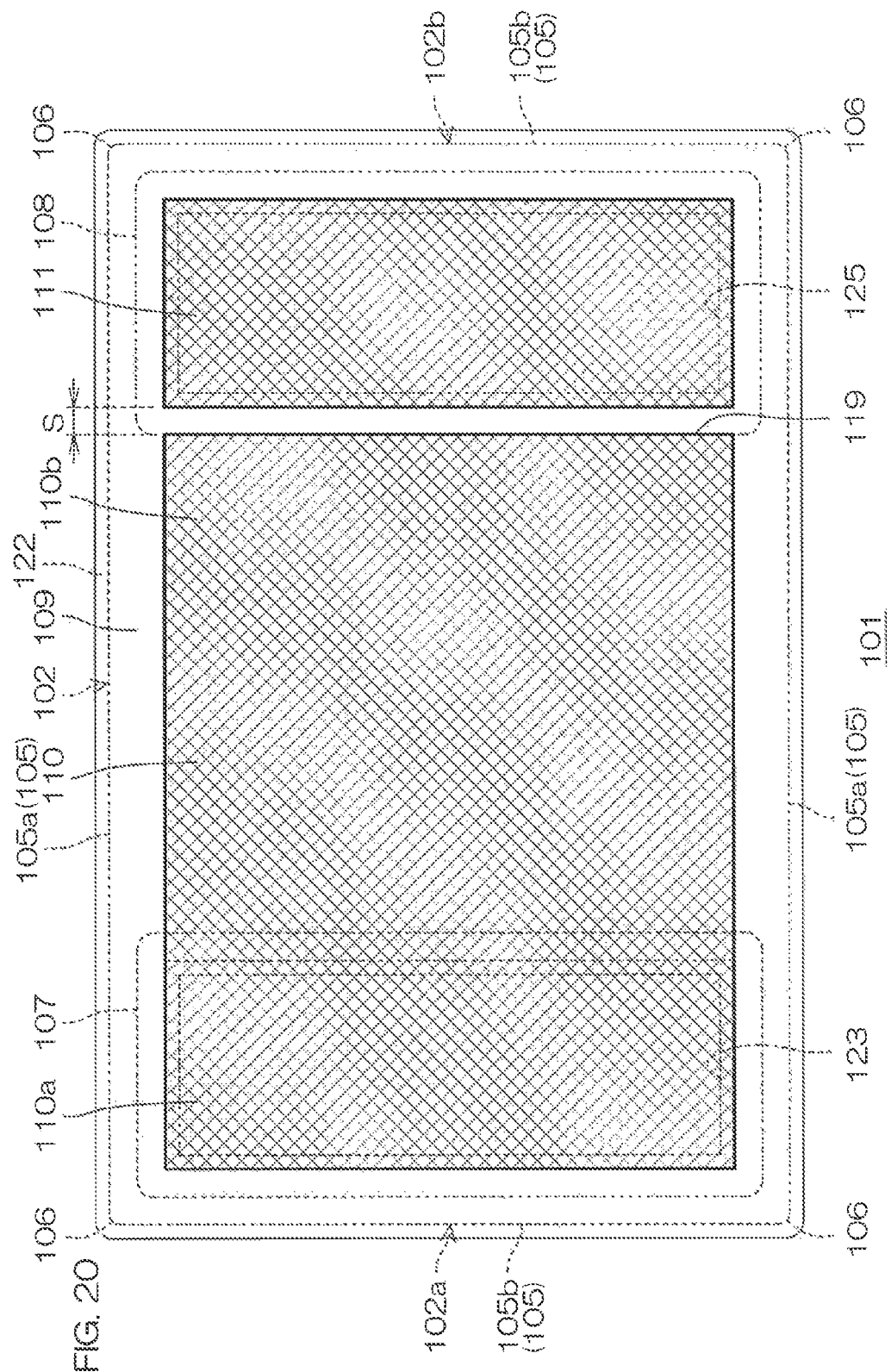
FIG. 20 is a plan view of the chip capacitor shown in FIG. 18, in which structures above a first conductive film are removed.
Figure 21:
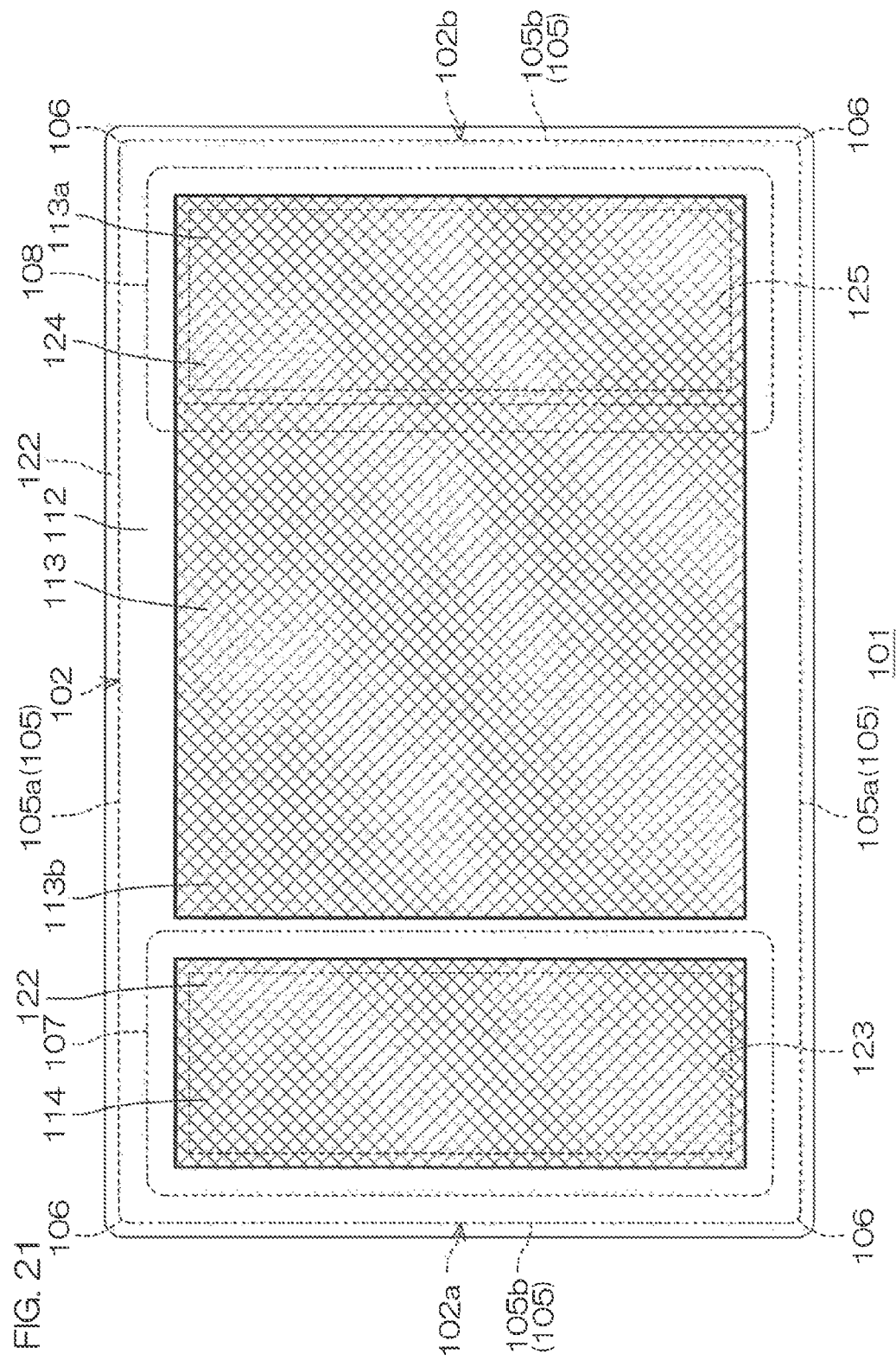
FIG. 21 is a plan view of the chip capacitor shown in FIG. 18, in which structures above a second conductive film are removed.

FIG. 19 is a sectional view taken along line XIX-XIX shown in FIG. 18. FIG. 20 is a plan view of the chip capacitor 101 shown in FIG. 18, in which structures above a first conductive film 110 (to be described below) are removed. FIG. 21 is a plan view of the chip capacitor 101 shown in FIG. 18, in which structures above a second conductive film 113 (to be described below) are removed.

Referring to FIG. 19, an insulating film 109 is formed on the first main surface 103 of the substrate 102. The insulating film 109 covers a substantially whole region of the first main surface 103 of the substrate 102. The insulating film 109 may include an $SiO_2$ film or an SiN film.

Referring to FIGS. 19 and 20, a first conductive film 110 and a first pad conductive film 111 are formed on the insulating film 109. The first conductive film 110 and the first pad conductive film 111 are shown by crosshatching for the sake of clarity in FIG. 20.

The first conductive film 110 is formed in the rectangular shape extending from the one end portion 102a side to the other end portion 102b side of the substrate 102 in plan view. The first conductive film 110 may include at least one of Cu, Al, AlSi or AlCu. The first conductive film 110 integrally includes a first connecting region 110a and a first capacitor forming region 110b.

The first connecting region 110a is formed at the one end portion 102a side of the substrate 102. The first connecting region 110a is formed in a region immediately below the first external electrode 107. The first connecting region 110a is formed in the rectangular shape extending along the width direction of the substrate 102 in plan view.

The first capacitor forming region 110b is formed at the other end portion 102b side of the substrate 102 with respect to the first connecting region 110a. The first capacitor forming region 110b is led out from the first connecting region 110a toward the other end portion 102b side of the substrate 102. The first capacitor forming region 110b covers a region between the first external electrode 107 and the second external electrode 108 in the insulating film 109. The first capacitor forming region 110b exposes the region immediately below the first external electrode 107 in the insulating film 109.

An end portion of the first external electrode 107 side in the first capacitor forming region 110b may be formed in a region where the insulating film 109 does not face to the first external electrode 107. The end portion of the first external electrode 107 side in the first capacitor forming region 110b may be formed in a region where the insulating film 109 faces to the first external electrode 107.

The first pad conductive film 111 is formed at the other end portion 102b side of the substrate 102 with respect to the first conductive film 110. The first pad conductive film 111 is formed apart from the first conductive film 110 along a facing direction where the first external electrode 107 and the second external electrode 108 face each other. The first pad conductive film 111 is formed in a region immediately below the second external electrode 108 in the insulating film 109. The first pad conductive film 111 is formed in a rectangular shape extending along the width direction of the substrate 102 in plan view.

A thickness of the first pad conductive film 111 is substantially equal to a thickness of the first conductive film 110. The first pad conductive film 111 may include at least one of Cu, Al, AlSi, or AlCu.

A slit 119 is formed in a region between the first conductive film 110 and the first pad conductive film 111. An inner wall surface of the slit 119 is formed by the insulating film 109, a lateral surface of the first conductive film 110, and a lateral surface of the first pad conductive film 111.

Referring to FIG. 19, a dielectric film 112 is formed on the insulating film 109. The dielectric film 112 enters the slit 119 and collectively covers the first conductive film 110 and the first pad conductive film 111.

The dielectric film 112 may include an $SiO_2$ film or an SiN film. The dielectric film 112 may include an ONO film including an oxide film ($SiO_2$ film)/a nitride film (SiN film)/an oxide film ($SiO_2$ film) formed in this order from the substrate 102 side.

Referring to FIGS. 19 and 21, a second conductive film 113 and a second pad conductive film 114 are formed on the dielectric film 112. The second conductive film 113 and the second pad conductive film 114 are shown by crosshatching for the sake of clarity in FIG. 21.

The second conductive film 113 is formed in a rectangular shape extending from the other end portion 102b side to the one end portion 102a side of the substrate 102 in plan view. The second conductive film 113 may include at least one of Cu, Al, AlSi, or AlCu. The second conductive film 113 integrally includes a second connecting region 113a and a second capacitor forming region 113b.

The second connecting region 113a is formed at the other end portion 102b side of the substrate 102. The second connecting region 113a is formed in the region immediately below the second external electrode 108. The second connecting region 113a is formed in a rectangular shape extending along the width direction of the substrate 102 in plan view.

A first via hole 115 selectively exposing the first pad conductive film 111 is formed in the dielectric film 112. The second connecting region 113a is connected to the first pad conductive film 111 through the first via hole 115.

The dielectric film 112 without the first via hole 115 may be adopted. In this case, the second connecting region 113a faces to the first pad conductive film 111 across the dielectric film 112.

The second capacitor forming region 113b is formed at the one end portion 102a side of the substrate 102 with respect to the second connecting region 113a. The second capacitor forming region 113b is led out from the second connecting region 113a toward the one end portion 102a side of the substrate 102. The second capacitor forming region 113b covers a region between the first external electrode 107 and the second external electrode 108. The second capacitor forming region 113b faces to the first capacitor forming region 110b across the dielectric film 112. The second capacitor forming region 113b exposes the region immediately below the first external electrode 107 in the dielectric film 112.

An end portion of the one end portion 102a side of the substrate 102 in the second capacitor forming region 113b may be formed in a region where the dielectric film 112 does not face to the first external electrode 107. The end portion of the one end portion 102a side of the substrate 102 in the second capacitor forming region 113b may be formed in a region where the dielectric film 112 faces to the first external electrode 107.

The second pad conductive film 114 is formed at the one end portion 102a side of the substrate 102 with respect to the second conductive film 113. The second pad conductive film 114 is formed apart from the second conductive film 113 along the facing direction where the first external electrode 107 and the second external electrode 108 face each other. The second pad conductive film 114 is formed in the region immediately below the first external electrode 107. The second pad conductive film 114 is formed in a rectangular shape extending along the width direction of the substrate 102 in plan view.

A thickness of the pad second conductive film 114 is substantially equal to a thickness of the second conductive film 113. The second pad conductive film 114 may include at least one of Cu, Al, AlSi, or AlCu.

A second via hole 116 selectively exposing the first connecting region 110a of the first conductive film 110 is formed in the dielectric film 112. The second pad conductive film 114 is connected to the first connecting region 110a of the first conductive film 110 through the second via hole 116.

Referring to FIG. 19, a capacitor region C100 having a predetermined capacity is formed on the first main surface 103 of the substrate 102. The capacitor region C100 is formed by a laminated film including the first conductive film 110, the dielectric film 112, and the second conductive film 113.

Hereinafter, a width S of the slit 119 is explained specifically referring to FIGS. 19 to 21. The width S of the slit 119 is set to be equal to or greater than a thickness W of the dielectric film 112 and equal to or smaller than twice the thickness W of the dielectric film 112 (W≤S≤2×W). The width S of the slit 119 is defined as a width along the facing direction where the first external electrode 107 and the second external electrode 108 face each other in the slit 119.

A case where the width S of the slit 119 is greater than twice the thickness of the dielectric film 112 (S>2×W) shall now be considered. In this case, the dielectric film 112 enters the slit 119 from on the first conductive film 110 and the first pad conductive film 111. A hollow recessed toward the substrate 102 side is therefore formed in the surface of the dielectric film 112 since the dielectric film 112 is formed in a film shape inside the slit 119 as well.

A thin film portion having a thickness smaller than a thickness of the other portion is formed in a portion along the slit 119 in the dielectric film 112. The thin film portion of the dielectric film 112 is typically formed along a corner portion connecting a surface of the first conductive film 110 and the inner wall surface of the slit 119, and/or, a corner portion connecting a surface of the first pad conductive film 111 and the inner wall surface of the slit 119.

The second conductive film 113 faces to the first conductive film 110 thus across the thin film portion of the dielectric film 112. The electric field therefore tends to concentrate locally to the thin film portion of the dielectric film 112. Such electric field concentration causes a decrease in the electric dielectric strength of the chip capacitor. A breakdown voltage and an ESD (Electro Static Discharge) damage resistance, for example, are included in the electric dielectric strength which decreases due to the electric field concentration.

According to the chip capacitor 101, the width S of the slit 119 is therefore set to be equal to or greater than the thickness W of the dielectric film 112 and equal to or smaller than twice the thickness W of the dielectric film 112 (W≤S≤2×W).

In this manner, the dielectric film 112 formed along the lateral surface of the first conductive film 110, and the dielectric film 112 formed along the lateral surface of the first pad conductive film 111 can be integrated each other inside the slit 119.

The formation of the hollow in a region along the slit 119 in the dielectric film 112 can thus be suppressed. The reduction of the electric dielectric strength due to the electric field concentration can thereby be suppressed.

The width S of the slit 119 is preferably set to a value at which the surface of the dielectric film 112 is to be flat. In this case, the second conductive film 113 having a flat surface can be formed on the dielectric film 112. The local electric field concentration to the dielectric film 112 can thereby be effectively suppressed.

Referring to FIG. 19, a first passivation film 120 and a resin film 121 are formed in this order on the dielectric film 112. The first passivation film 120 covers the second conductive film 113 and the second pad conductive film 114. The resin film 121 covers the first passivation film 120. The first passivation film 120 may include $SiO_2$ or SiN. The resin film 121 may include a polyimide.

A first pad opening 123 and a second pad opening 125 are formed in the first passivation film 120 and the resin film 121.

The first pad opening 123 selectively exposes a region excluding an edge portion of the second pad conductive film 114 as a first pad region 122. The second pad opening 125 exposes a region excluding an edge portion of the second connecting region 113a of the second conductive film 113 as a second pad region 124.

The first external electrode 107 is formed in the first pad opening 123. The first external electrode 107 protrudes from the resin film 121. The first external electrode 107 covers the resin film 121. The first external electrode 107 has a covering portion 107a covering the resin film 121.

The first external electrode 107 is electrically connected to the first pad region 122 inside the first pad opening 123. The first external electrode 107 is thus electrically connected to the first conductive film 110. The first external electrode 107 may include a Ni/Pd/Au laminated film including a Ni film, a Pd film and an Au film laminated in this order from the second pad conductive film 114 side.

The second external electrode 108 is formed in the second pad opening 125. The second external electrode 108 protrudes from the resin film 121. The second external electrode 108 has a covering portion 108a covering the resin film 121.

The second external electrode 108 is electrically connected to the second pad region 124 inside the second pad opening 125. The second external electrode 108 is thus electrically connected to the second conductive film 113. The second external electrode 108 may include a Ni/Pd/Au laminated film including a Ni film, a Pd film and an Au film laminated in this order from the second conductive film 113 side.

Referring to FIGS. 18 to 21, a second passivation film 126 is formed on the lateral surface 105 of the substrate 102. The second passivation film 126 covers a substantially whole region of the lateral surface 105 of the substrate 102. The second passivation film 126 may include $SiO_2$ or SiN.

As described above, according to the chip capacitor 101, the slit 119 is formed in the region between the first conductive film 110 and the first pad conductive film 111. The width S of the slit 119 is set to be equal to or greater than the thickness W of the dielectric film 112 and equal to or smaller than twice the thickness W of the dielectric film 112 ($W \leq S \leq 2 \times W$).

The formation of the hollow in the region above the slit 119 in the dielectric film 112 can thus be suppressed. Also, the dielectric film 112 having the flat surface can thereby be formed on the first conductive film 110 and the first pad conductive film 111. As a result, the electric field concentration to the region above the slit 119 in the dielectric film 112 can be suppressed. The chip capacitor 101 enabling improvement of the electric dielectric strength can thereby be provided.

Figure 22:
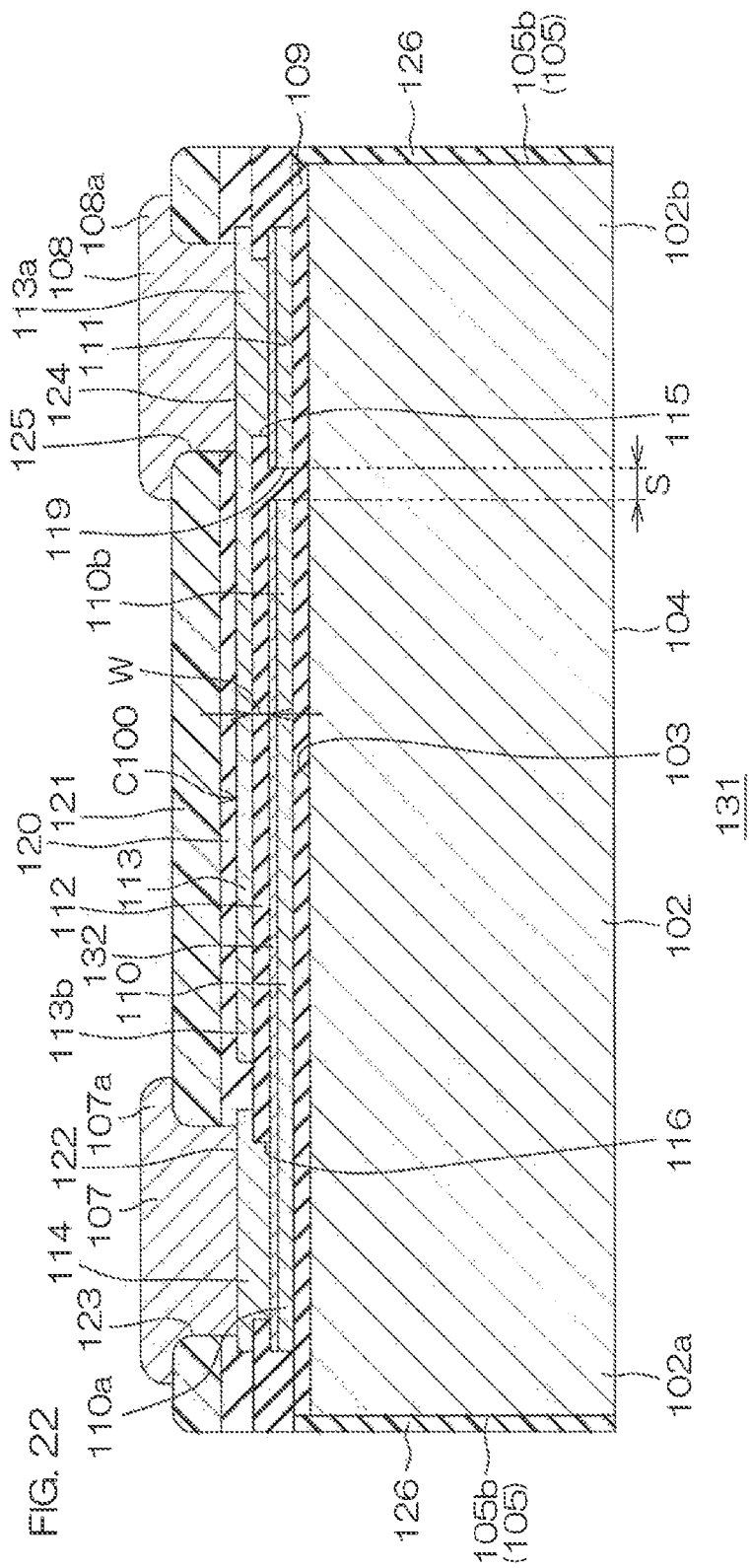
FIG. 22 is a sectional view of a chip capacitor according to a seventh preferred embodiment of the present invention.

FIG. 22 is a sectional view of a chip capacitor 131 according to a seventh preferred embodiment of the present invention. In this preferred embodiment, the same reference numerals are applied to the same structures as those described in the sixth preferred embodiment, and the description thereof is omitted.

The chip capacitor 131 further includes, a barrier conductive film 132 interposed in a region between the first conductive film 110 and the dielectric film 112.

The barrier conductive film 132 covers a substantially whole region of the first conductive film 110. The barrier conductive film 132 has a shape matching a shape of the first conductive film 110 in plan view. The film 132 may include at least one of Ti, TiN, W or TiW.

A thickness of the barrier conductive film 132 is smaller than a thickness of the first conductive film 110. The thickness of the barrier conductive film 132 is, for example, equal to or greater than 0.01 times and equal to or smaller than 0.1 times of the thickness of the first conductive film 110. The thickness of the barrier conductive film 132 is, for example, equal to or greater than 100 Å and equal to or smaller than 3000 Å. The thickness of the first conductive film 110 is, for example, equal to or greater than 1000 Å and equal to or smaller than 30000 Å.

The barrier conductive film 132 covers a substantially whole region of the first pad conductive film 111 in this preferred embodiment. The barrier conductive film 132 has a shape matching a shape of the first pad conductive film 111 in plan view. The barrier conductive film 132 having a structure not covering the first pad conductive film 111 may be adopted.

A fine convexoconcave called hillock can be formed at the surface of the first conductive film 110. The barrier conductive film 132 is formed on the first conductive film 10 so as to enter the hillock. In this case, a hollow recessed toward the first conductive film 110 side is formed in a region above the hillock at the surface of the dielectric film 112.

The second conductive film 113 is formed on the dielectric film 112 so as to enter the hollow of the dielectric film 112. The second conductive film 113 is thus faced to the first conductive film 110 across the dielectric film 112 inside the hollow formed in the first conductive film 110.

The electric field tends to concentrate locally to a portion where the hollow is formed in the first conductive film 110. Such electric field concentration causes a decrease in the electric dielectric strength of the chip capacitor. A breakdown voltage and an ESD (Electro Static Discharge) damage resistance, for example, are included in the electric dielectric strength which decreases due to the electric field concentration.

According to the chip capacitor 131, the barrier conductive film 132 is therefore formed covering the surface of the first conductive film 110. The barrier conductive film 132 fills the hillock and covers the surface of the first conductive film 110.

The entering of the dielectric film 112 into the hillock formed in the first conductive film 110 can thus be suppressed. The electric field concentration due to the hillock formed in the first conductive film 110 can thereby be suppressed.

Also, the barrier conductive film 132 having a flat surface can be formed on the first conductive film 110. The flatness of structures formed on the barrier conductive film 132, such as the second conductive film 113, can thus be enhanced. The undesirable electric field concentration to a region between the first conductive film 110 and the second conductive film 113, etc., can thereby be suppressed.

As described above, according to the preferred embodiment, the chip capacitor 131 capable of further improvement of the electric dielectric strength can be provided.

Figure 23:
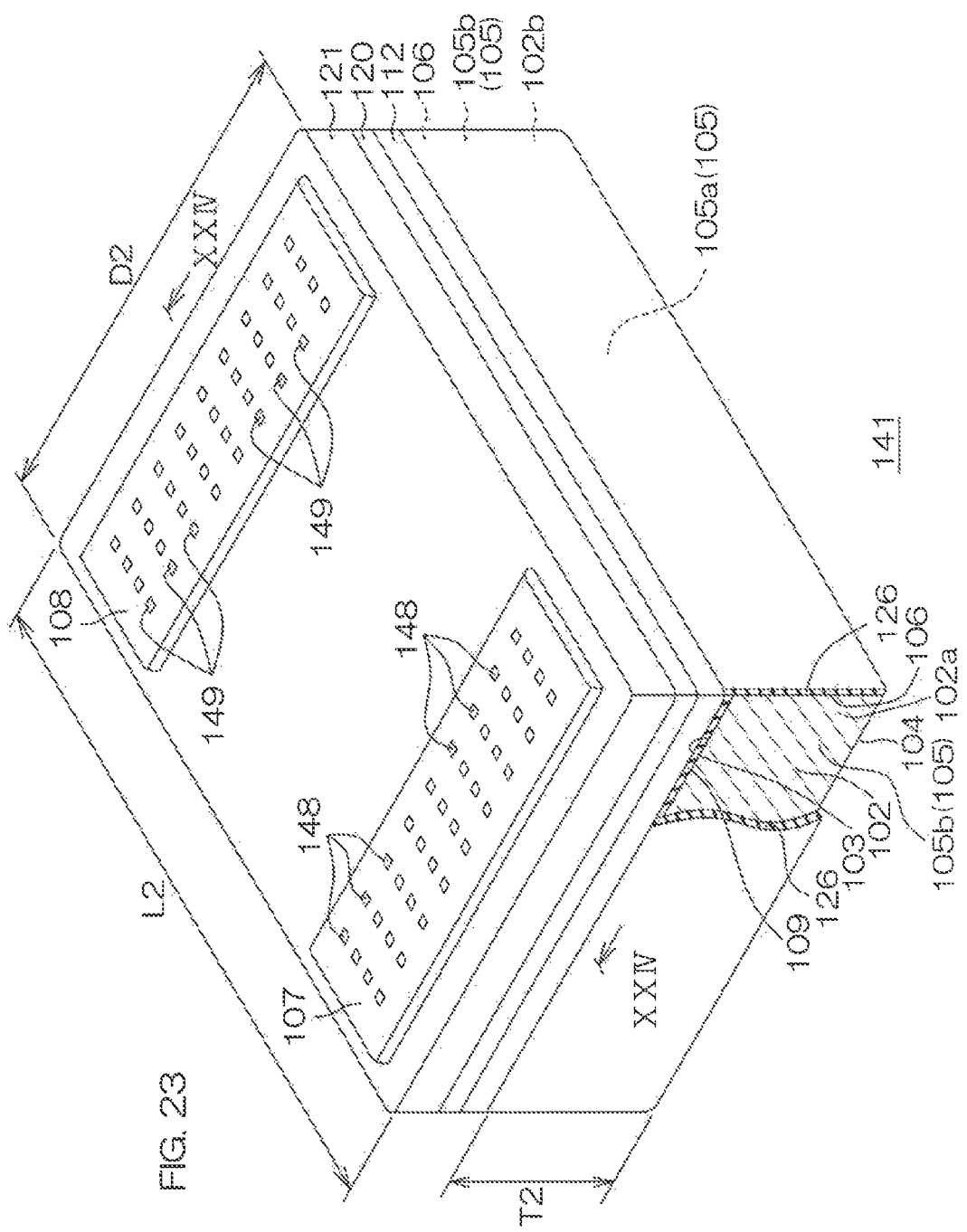
FIG. 23 is a partially cutaway perspective view of a chip capacitor according to an eighth preferred embodiment of the present invention.
Figure 24:
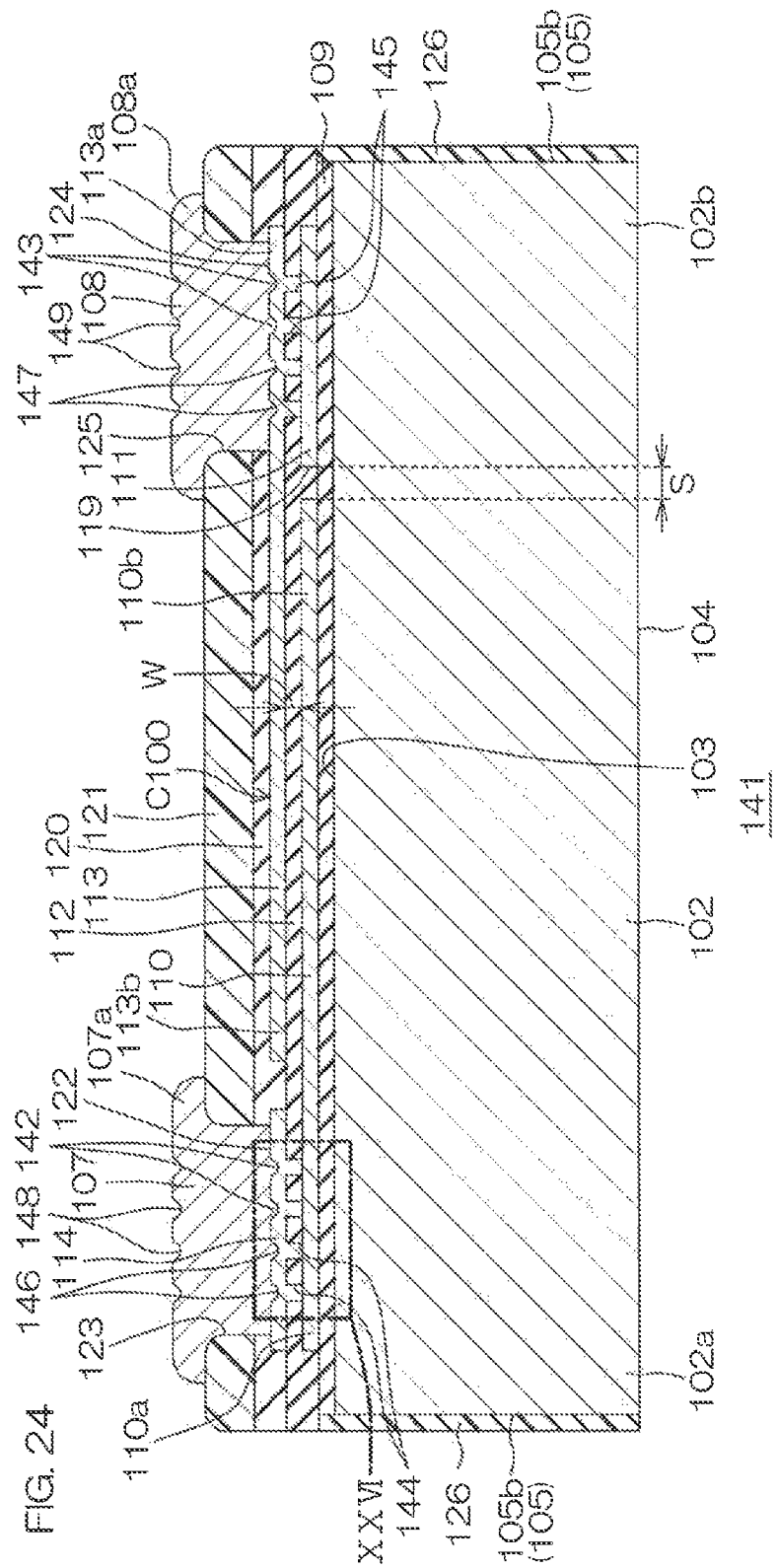
FIG. 24 is a sectional view taken along line XXIV-XXIV shown in FIG. 23.
Figure 25:
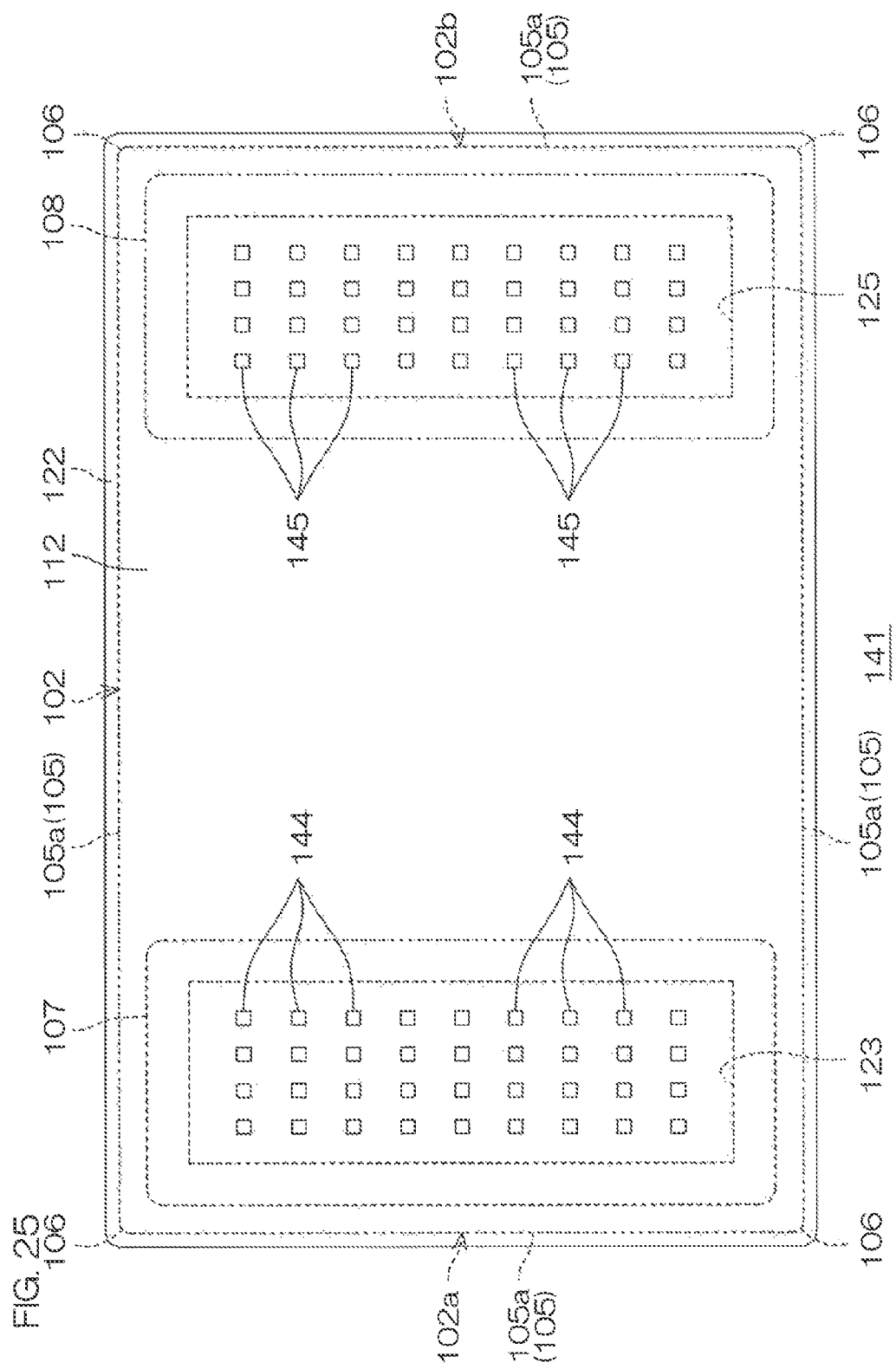
FIG. 25 is a plan view of the chip capacitor shown in FIG. 24, in which structures above a dielectric film are removed.

FIG. 23 is a partially cutaway perspective view of a chip capacitor 141 according to an eighth preferred embodiment of the present invention. FIG. 24 is a sectional view taken along line XXIV-XXIV shown in FIG. 23. FIG. 25 is a plan view of the chip capacitor 141 shown in FIG. 24, in which structures above the dielectric film 112 are removed.

In this preferred embodiment, the same reference numerals are applied to the same structures as those described in the sixth preferred embodiment, and the description thereof is omitted.

In the chip capacitor 141, the first external electrode 107 has a first anchor structure joined to the second pad conductive film 114. The first external electrode 107 has a convexoconcave structure including a first convex portion 142 on a lower surface thereof as one aspect of the first anchor structure. The connection strength of the first external electrode 107 with respect to the second pad conductive film 114 is thus enhanced by the first anchor structure.

Also, in the chip capacitor 141, the second external electrode 108 has a second anchor structure joined to the second connecting region 113a of the second conductive film 113. The first external electrode 107 has a convexoconcave structure including a second convex portion 143 on a lower surface thereof as one aspect of the second anchor structure. The connection strength of the second external electrode 108 with respect to the second connecting region 113a of the second conductive film 113 is thus enhanced by the second anchor structure.

Hereinafter, the first anchor structure of the first external electrode 107, the second anchor structure of the second external electrode 108, and periphery structures around them are explained specifically.

Referring to FIGS. 24 and 25, a plurality of first via holes 144 and a plurality of second via holes 145 are formed in the dielectric film 112.

The plurality of first via holes 144 is formed in the region immediately below the first external electrode 107 in the dielectric film 112. The plurality of first via holes 144 is arranged in a matrix pattern at intervals along the longitudinal direction and the width direction of the substrate 102.

Each of the first via holes 144 is formed in a rectangular shape in plan view. Each of the first via holes 144 may be formed in a circular shape in plan view. Referring to FIG. 24, each of the first via holes 144 selectively exposes the first pad conductive film 111.

The plurality of second via holes 145 is formed in the region immediately below the second external electrode 108 in the dielectric film 112. The plurality of second via holes 145 is arranged in a matrix pattern at intervals along the longitudinal direction and the width direction of the substrate 102.

Each of the second via holes 145 is formed in a rectangular shape in plan view. Each of the second via holes 145 may be formed in a circular shape in plan view. Referring to FIG. 24, Each of the second via holes 145 selectively exposes the first connecting region 110a of the first conductive film 110.

Figure 26A:
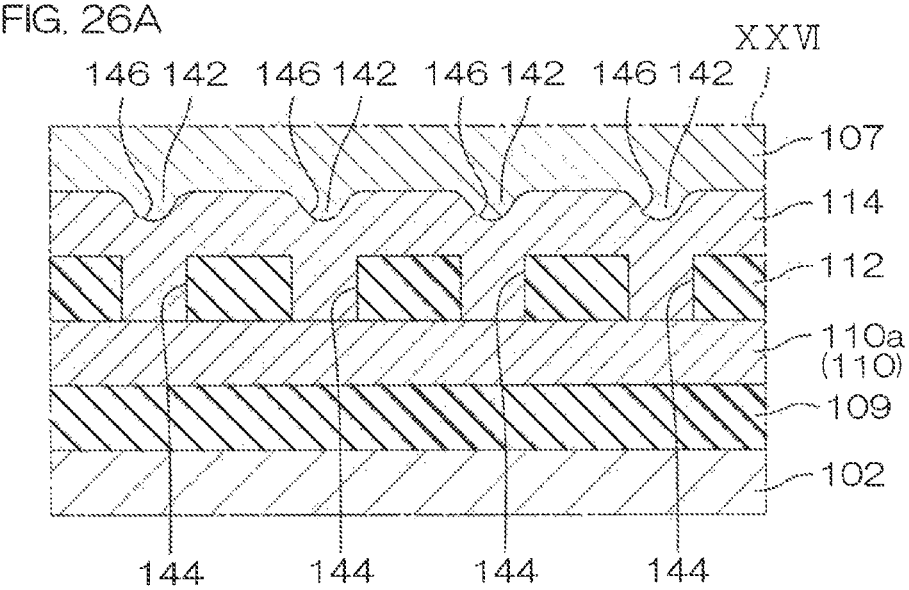
FIG. 26A is an enlarged view of a region XXVI shown in FIG. 24 and is a view for explaining a first form of via holes.
Figure 26B:
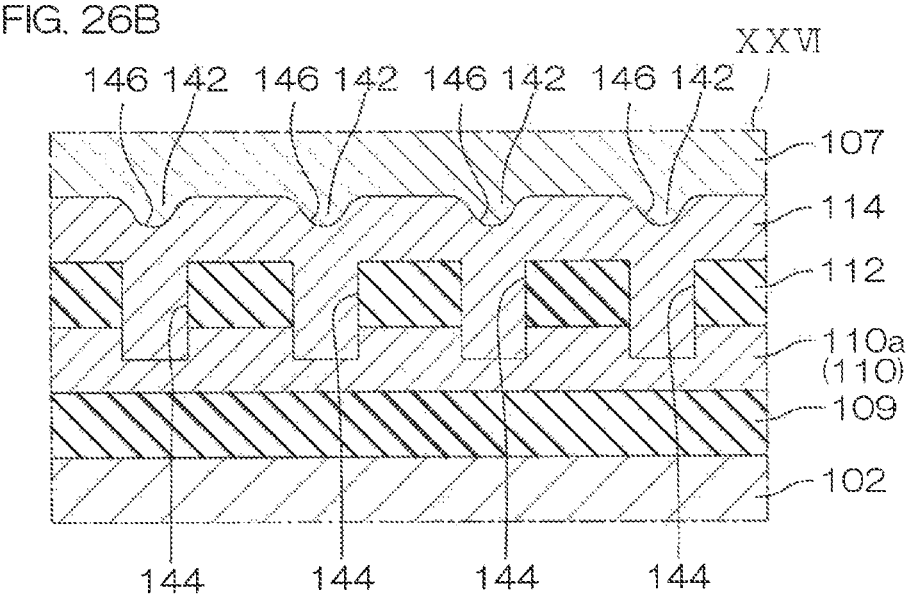
FIG. 26B is an enlarged view of the region XXVI shown in FIG. 24 and is a view for explaining a second form of via holes.

FIG. 26A is an enlarged view of the region XXVI shown in FIG. 24 and is a view for explaining a first form of the first via hole 144 and the second via hole 145. FIG. 26B is an enlarged view of the region XXVI shown in FIG. 24 and is a view for explaining a second form of the first via hole 144 and the second via hole 145.

Referring to FIG. 26A, each of the first via holes 144 may be formed at the depth substantially the same as the thickness of the dielectric film 112. Referring to FIG. 26B, a bottom of the respective first via holes 144 may be located inside the first conductive film 110.

Similarly, each of the second via holes 145 may be formed at the depth substantially the same as the thickness of the dielectric film 112. Also, a bottom of the respective second via holes 145 may be located inside the first pad conductive film 111.

Referring to FIGS. 25, 26A and 26B, the second pad conductive film 114 is formed such that one surface and the other surface are along the surface of the dielectric film 112 and an inner wall surface of the respective first via holes 144. The second pad conductive film 114 is connected to the first conductive film 110 inside the respective first via holes 144. A first concave portion 146 recessed toward the substrate 102 is formed in a region located above the respective first via holes 144 in the second pad conductive film 114.

Similarly, the second conductive film 113 is formed such that one surface and the other surface are along the surface of the dielectric film 112 and an inner wall surface of the respective second via holes 145. The second conductive film 113 is connected to the first pad conductive film 111 inside the respective second via holes 145. A second concave portion 147 recessed toward the substrate 102 is formed in a region located above the respective second via hole 145 in the second conductive film 113.

The first convex portion 142 of the first external electrode 107 is formed by the conductive material of the first external electrode 107 which is entered into the first concave portion 146 of the second pad conductive film 114. Each of the first convex portions 142 is located immediately above each of the first via holes 144.

The plurality of first convex portions 142 of the first external electrode 107 is therefore arranged in the same pattern as the plurality of first via holes 144 in the first external electrode 107. That is, the plurality of first convex portions 142 is arranged in a matrix pattern at intervals along the longitudinal direction and the width direction of the substrate 102.

Similarly, the second convex portion 143 of the second external electrode 108 is formed by the conductive material of the second external electrode 108 which is entered into the second concave portion 147 of the second conductive film 113. Each of the second convex portions 143 is located immediately above each of the second via holes 145.

The plurality of second convex portions 143 is arranged therefore in the same pattern as the plurality of second via holes 145 in the second external electrode 108. That is, the plurality of second convex portions 143 is arranged in a matrix pattern at intervals along the longitudinal direction and the width direction of the substrate 102.

Referring to FIGS. 23 and 24, a plurality of first surface concave portions 148 recessed toward the substrate 102 side is formed at a surface of the first external electrode 107. Each of the first surface concave portions 148 is formed due to the first via holes 144 and the first convex portions 142 of the first external electrode 107.

Each of the first surface concave portions 148 is therefore located immediately above each of the first via holes 144. Also, the plurality of first surface concave portions 148 is arranged in the same pattern as the plurality of first via holes 144. That is, the plurality of first surface concave portions 148 is arranged in a matrix pattern at intervals along the longitudinal direction and the width direction of the substrate 102.

Similarly, a plurality of second surface concave portions 149 recessed toward the substrate 102 side is formed at a surface of the second external electrode 108. Each of the second surface concave portions 149 is formed due to the second via holes 145 and the second convex portions 143 of the second external electrode 108.

Each of the second surface concave portions 149 is therefore located immediately above each of the second via holes 145. Also, the plurality of second surface concave portions 149 is arranged in the same pattern as the plurality of second via holes 145. That is, the plurality of second surface concave portions 149 is arranged in a matrix pattern at intervals along the longitudinal direction and the width direction of the substrate 102.

As described above, according to the chip capacitor 141, the substantially same effect as the chip capacitor 101 according to the sixth embodiment can be achieved. Also, according to the chip capacitor 141, the first external electrode 107 has the first anchor structure which digs into the second pad conductive film 114 formed as an internal electrode. Similarly, the second external electrode 108 has the second anchor structure which digs into the second connecting region 113a of the second conductive film 113 formed as an internal electrode. The connection strength of the first external electrode 107 with respect to the second pad conductive film 114 can thus be enhanced. Also, the connection strength of the second external electrode 108 with respect to the second conductive film 113 can thus be enhanced.

Also, the second pad conductive film 114 is embedded into the first via holes 144 formed in the dielectric film 112. Similarly, the second connecting region 113a of the second conductive film 113 is embedded into the second via holes 145 formed in the dielectric film 112. The connection strength of the second pad conductive film 114 with respect to the dielectric film 112 can thus be enhanced. Also, the connection strength of the second conductive film 113 with respect to the dielectric film 112 can thus be enhanced.

As a result, the first external electrode 107 and the first conductive film 110 can be connected satisfactorily. Also, the first external electrode 107 and the first conductive film 110 can be connected satisfactorily.

Also, according to the chip capacitor 141, a surface area of the first external electrode 107 is increased by the plurality of first surface concave portions 148. Similarly, a surface area of the second external electrode 108 is increased by the plurality of second surface concave portions 149.

An adhesive area of the first external electrode 107 with respect to a conductive bonding material (for example, solder) can thus be increased. Also, an adhesive area of the second external electrode 108 with respect to a conductive bonding material (for example, solder) can thus be increased. The connection strength of the chip capacitor 141 with respect to a connecting object can thereby be enhanced, in a case where the chip capacitor 141 is mounted onto the connecting object such as a mounting board, etc.

In the present preferred embodiment, the first convex portions 142, the first via holes 144, the first concave portions 146 and the first surface concave portions 148 may be formed in a staggered pattern in plan view.

In the present preferred embodiment, the first convex portions 142, the first via holes 144, the first concave portions 146 and the first surface concave portions 148 may be formed in a dot pattern in plan view.

In the present preferred embodiment, the first convex portions 142, the first via holes 144, the first concave portions 146 and the first surface concave portions 148 may be formed in a striped pattern extending along the longitudinal direction of the substrate 102 in plan view.

In the present preferred embodiment, the first convex portions 142, the first via holes 144, the first concave portions 146 and the first surface concave portions 148 may be formed in a striped pattern extending along the width direction of the substrate 102 in plan view.

In the present preferred embodiment, the first convex portions 142, the first via holes 144, the first concave portions 146 and the first surface concave portions 148 may be formed in a lattice pattern in plan view.

In the present preferred embodiment, the second convex portions 143, the second via holes 145, the second concave portions 147 and the second surface concave portions 149 may be formed in a staggered pattern in plan view.

In the present preferred embodiment, the second convex portions 143, the second via holes 145, the second concave portions 147 and the second surface concave portions 149 may be formed in a dot pattern in plan view.

In the present preferred embodiment, the second convex portions 143, the second via holes 145, the second concave portions 147 and the second surface concave portions 149 may be formed in a striped pattern extending along the longitudinal direction of the substrate 102 in plan view.

In the present preferred embodiment, the second convex portions 143, the second via holes 145, the second concave portions 147 and the second surface concave portions 149 may be formed in a striped pattern extending along the width direction of the substrate 102 in plan view.

In the present preferred embodiment, the second convex portions 143, the second via holes 145, the second concave portions 147 and the second surface concave portions 149 may be formed in a lattice pattern in plan view.

Figure 27A:
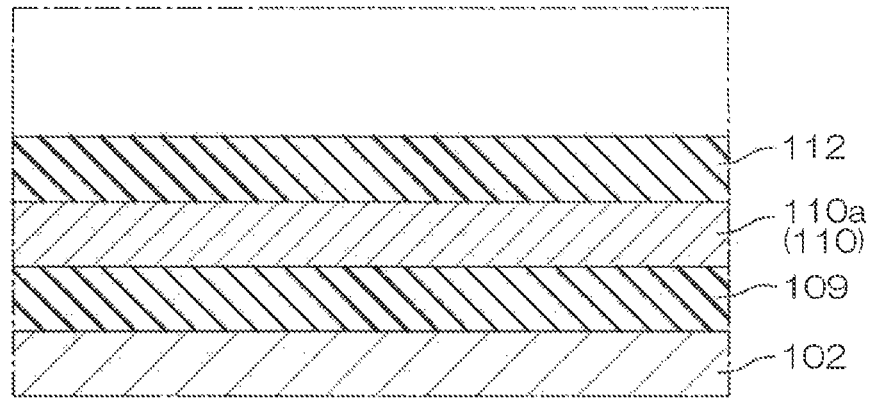
FIGS. 27A to 27C are sectional views of a region corresponding to FIG. 26A and are views for explaining the manufacturing method of the chip capacitor shown in FIG. 23.
Figure 27B:
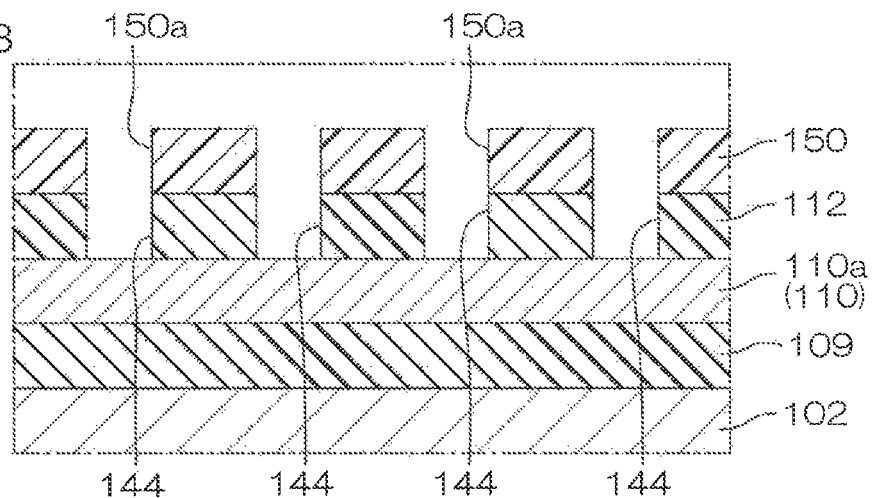
Figure 27C:
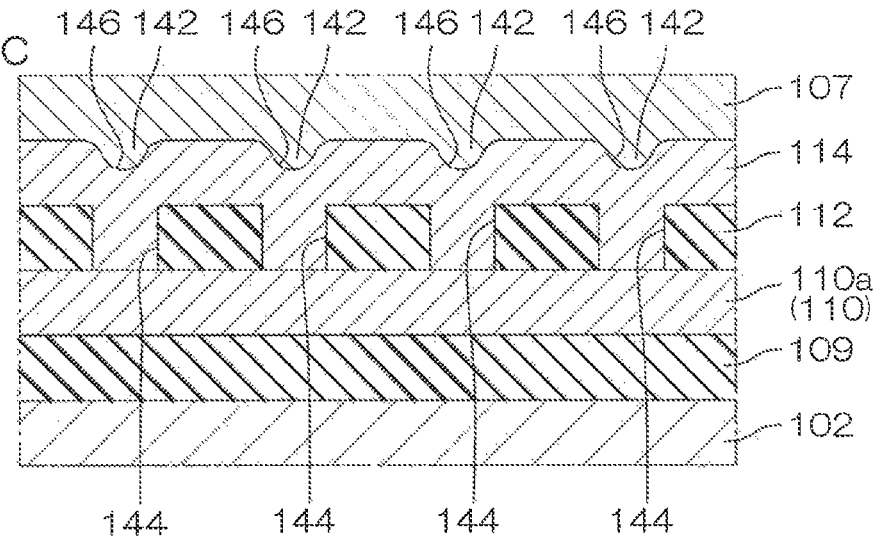

FIGS. 27A to 27C are sectional views of a region corresponding to FIG. 26A and are views for explaining the manufacturing method of the chip capacitor 141 shown in FIG. 23. Hereinafter, FIG. 24 is also referred to as necessary.

First, referring to FIG. 27A, a substrate 102, in a state before a plurality of the chip capacitors 141 are cut out, is prepared.

Next, the insulating film 109 is formed on the surface of the substrate 102. The insulating film 109 may be formed by oxidizing the surface of the substrate 102 through a thermal oxidation process. The insulating film 109 may be formed by depositing the insulating material on the surface of the substrate 102 through a CVD method.

Next, a conductive film serving as a base of the first conductive film 110 and the first pad conductive film 111 (see also FIG. 24) is formed on the insulating film 109. Next, the conductive film is patterned into a predetermined shape. The first conductive film 110 and the first pad conductive film 111 are thereby formed Next, the dielectric film 112 is formed on the first conductive film 110 and the first pad conductive film 111.

Next, referring to FIG. 27B, the resist mask 150 having a predetermined pattern is formed on the dielectric film 112. The resist mask 150 selectively has openings 150a at regions where the plurality of first via holes 144 and the plurality of second via holes 145 (see also FIG. 24) are to be formed.

Next, unnecessary portions of the dielectric film 112 are removed. The removal of the dielectric film 112 may be performed by a dry etching via the resist mask 150. The plurality of first via holes 144 and the plurality of second via holes 145 are thus formed in the dielectric film 112. The resist mask 150 is removed thereafter.

Next, a conductive film serving as a base of the second conductive film 113 and the second pad conductive film 114 (see also FIG. 24) is formed on the dielectric film 112. Next, the conductive film is patterned into a predetermined shape. The second conductive film 113 and the second pad conductive film 114 are thus formed.

In this step, the first concave portion 146 recessed toward the substrate 102 is formed in a region located immediately above each of the first via holes 144 in the second pad conductive film 114. Also, in this step, the second concave portion 147 recessed toward the substrate 102 is formed in a region located immediately above each of the second via holes 145 in the second conductive film 113.

Next, the first passivation film 120 and the resin film 121 (see also FIG. 24) are formed on the dielectric film 112. The first passivation film 120 and the resin film 121 cover the second conductive film 113 and the second pad conductive film 114.

Next, the first passivation film 120 and the resin film 121 are selectively patterned, and the first pad opening 123 and the second pad opening 125 (see also FIG. 24) are formed. The first pad opening 123 selectively exposes a part of the second pad conductive film 114 as the first pad region 122. The second pad opening 125 selectively exposes a part of the second conductive film 113 (the second connecting region 113a) as the second pad region 124.

Next, referring to FIG. 27C, the first external electrode 107 and the second external electrode 108 (see also FIG. 24) are formed. The first external electrode 107 is formed on the second pad conductive film 114 exposed from the first pad opening 123. The second external electrode 108 is formed on the second conductive film 113 exposed from the second pad opening 125.

The first external electrode 107 includes the Ni film, the Pd film and the Au film laminated in this order from the substrate 102 side. The Ni film, the Pd film and the Au film of the first external electrode 107 may be formed by electrolytic plating methods.

In this step, the electrode material of the first external electrode 107 enters the first concave portions 146 of the second pad conductive film 114. The plurality of first convex portions 142 is thus formed on the lower surface of the first external electrode 107. Also, the first surface concave portions 148 (see also FIG. 24) are formed in regions corresponding to the first convex portions 142 at the surface of the first external electrode 107.

Similarly, the second external electrode 108 includes the Ni film, the Pd film and the Au film laminated in this order from the substrate 102 side. The Ni film, the Pd film and the Au film of the second external electrode 108 may be formed by electrolytic plating methods.

In this step, the electrode material of the second external electrode 108 enters the second convex portions 143 of the second connecting region 113a of the second conductive film 113. The plurality of second convex portions 143 is thus formed on the lower surface of the second external electrode 108. Also, the second surface concave portions 149 (see also FIG. 24) are formed in regions corresponding to the second convex portions 143 at the surface of the second external electrode 108.

The substrate 102 is selectively diced thereafter, and the plurality of chip capacitors 141 is cut out. In this way, the chip capacitor 141 is manufactured.

Figure 28:
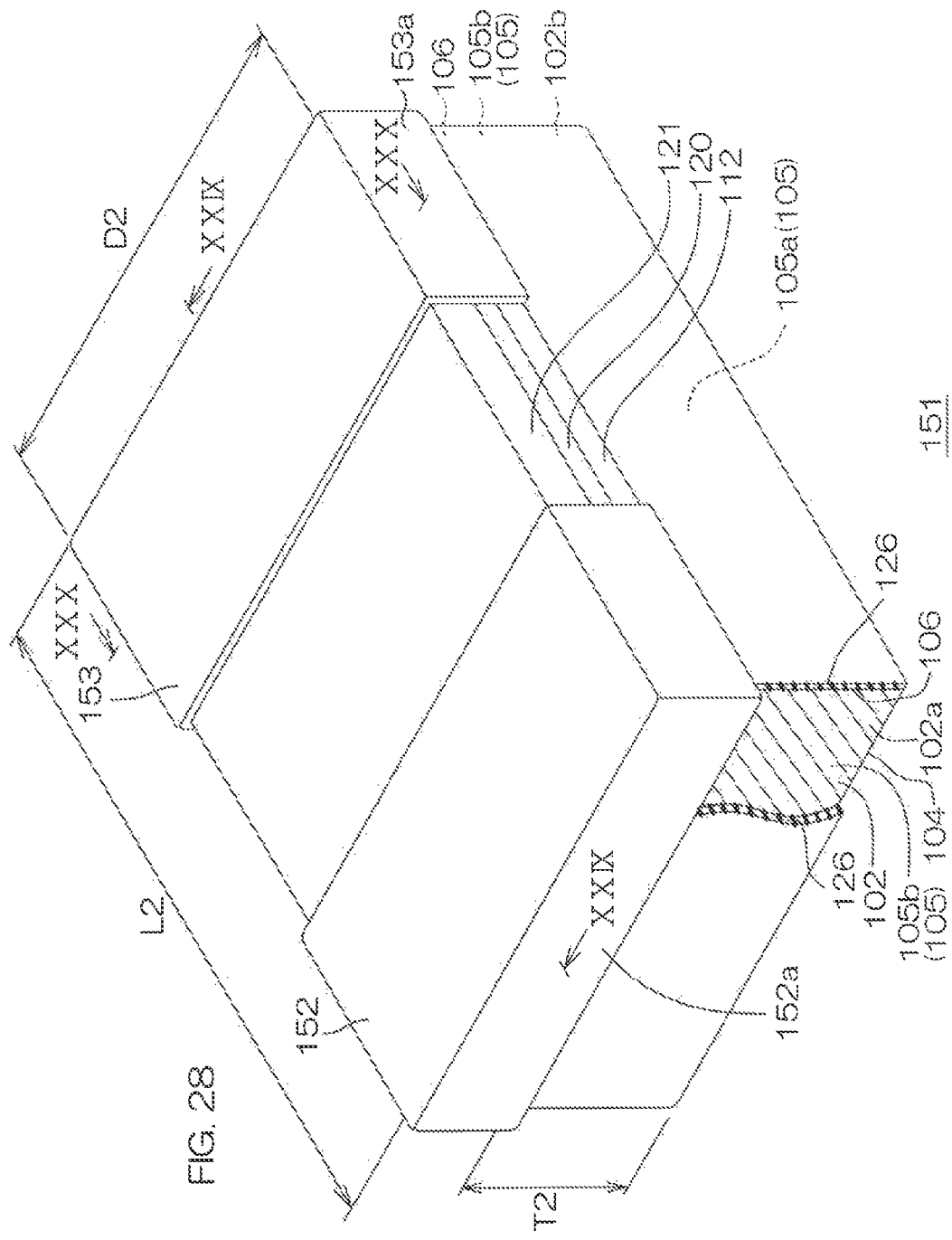
FIG. 28 is a partially cutaway perspective view of a chip capacitor according to a ninth preferred embodiment of the present invention.
Figure 29:
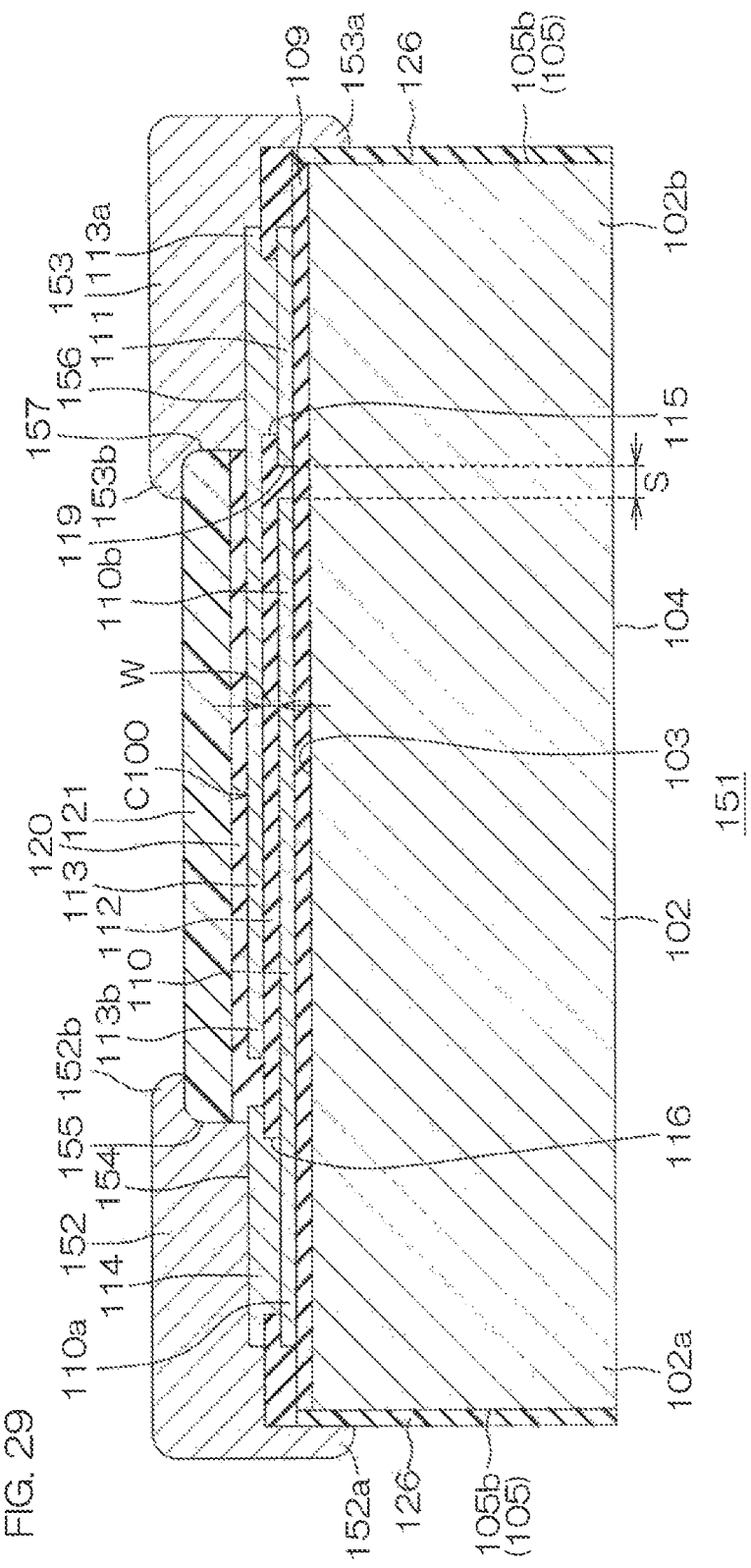
FIG. 29 is a sectional view taken along line XXIX-XXIX shown in FIG. 28.
Figure 30:
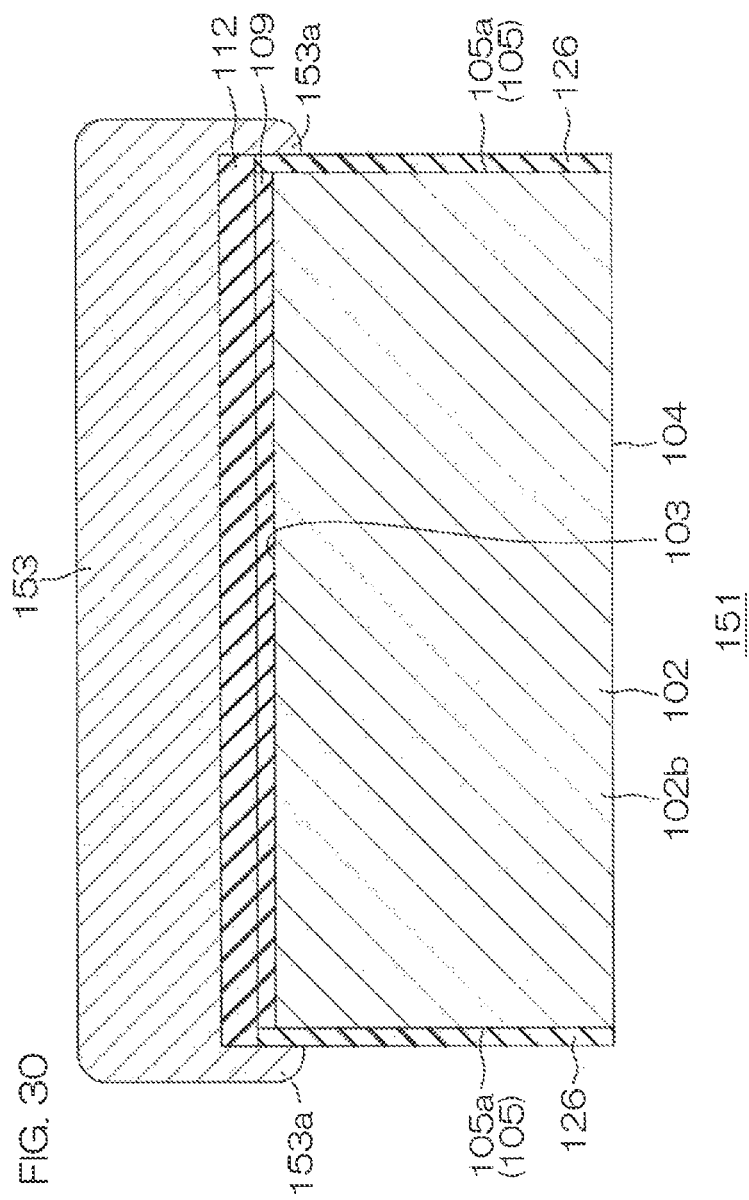
FIG. 30 is a sectional view taken along line XXX-XXX shown in FIG. 28.

FIG. 28 is a partially cutaway perspective view of a chip capacitor 151 according to a ninth preferred embodiment of the present invention. FIG. 29 is a sectional view taken along line XXIX-XXIX shown in FIG. 28. FIG. 30 is a sectional view taken along line XXX-XXX shown in FIG. 28. In this preferred embodiment, the same reference numerals are applied to the same structures as those described in the sixth preferred embodiment, and the description thereof is omitted.

Referring to FIG. 28, a first external electrode 152 and a second external electrode 153 are formed, instead of the first external electrode 107 and the second external electrode 108, in the chip capacitor 151.

The first external electrode 152 is formed in a rectangular shape extending along the width direction of the substrate 102 in plan view. The first external electrode 152 is formed so as to wrap around from the first main surface 103 of the substrate 102 to the lateral surface 105 of the substrate 102. The first external electrode 152 has a side covering portion 152a covering the lengthwise lateral surface 105a and the widthwise lateral surface 105b from three directions.

The second external electrode 153 is formed in a rectangular shape extending along the width direction of the substrate 102 in plan view. The second external electrode 153 is formed so as to wrap around from the first main surface 103 of the substrate 102 to the lateral surface 105 of the substrate 102. The second external electrode 153 has a side covering portion 153a covering the lengthwise lateral surface 105a and the widthwise lateral surface 105b from three directions.

Referring to FIG. 2, a first notched portion 155 and a second notched portion 157 are formed, instead of the first pad opening 123 and the second pad opening 125, in the first passivation film 120 and the resin film 121.

The first notched portion 155 selectively exposes the second pad conductive film 114 as a first pad region 154. The first notched portion 155 selectively exposes a region excluding an edge portion of the first external electrode 152 side in the second pad conductive film 114, in the present preferred embodiment.

The second notched portion 157 selectively exposes the second connecting region 113a of the second conductive film 113 as the second pad region 156.

The first external electrode 152 is formed on the first pad region 154 exposed from the first notched portion 155. The first external electrode 152 is connected to the first pad region 154 at the first notched portion 155. The first external electrode 152 is thus electrically connected to the first conductive film 110.

The first external electrode 152 protrudes from the resin film 121. The first external electrode 152 has the covering portion 152b covering the resin film 121. The first external electrode 152 may include a Ni/Pd/Au laminated film including a Ni film, a Pd film and an Au film laminated in this order from the second pad conductive film 114 side.

The second external electrode 153 is formed on the second pad region 156 exposed from the second notched portion 157. The second external electrode 153 is connected to the second pad region 156 at the second notched portion 157. The second external electrode 153 is thus electrically connected to the second conductive film 113.

The second external electrode 153 protrudes from the resin film 121. The second external electrode 153 has the covering portion 153b covering the resin film 121. The second external electrode 153 may include a Ni/Pd/Au laminated film including a Ni film, a Pd film and an Au film laminated in this order from the second conductive film 113 side.

As described above, according to the chip capacitor 151, the substantially same effect as the chip capacitor 101 according to the sixth embodiment can be achieved. Also, according to the chip capacitor 151, the first external electrode 152 is formed so as to wrap around the lateral surface 105 of the substrate 102. Also, the second external electrode 153 is formed so as to wrap around the lateral surface 105 of the substrate 102.

An adhesive area of the first external electrode 152 with respect to a conductive bonding material (for example, solder) can thereby be increased. Similarly, an adhesive area of the second external electrode 153 with respect to a conductive bonding material (for example, solder) can thereby be increased.

The connection strength of the chip capacitor 151 with respect to a connecting object can thereby be enhanced, in a case where the chip capacitor 151 is mounted onto the connecting object such as a mounting board, etc.

Specifically, according to the chip capacitor 151, the first external electrode 152 covers the lateral surface 105 of the substrate 102 from three directions at the one end portion 102a side of the substrate 102. Similarly, the second external electrode 153 covers the lateral surface 105 of the substrate 102 from three directions at the other end portion 102b side of the substrate 102. The connection strength of the chip capacitor 151 with respect to the connecting object can thus be further enhanced.

Figure 31:
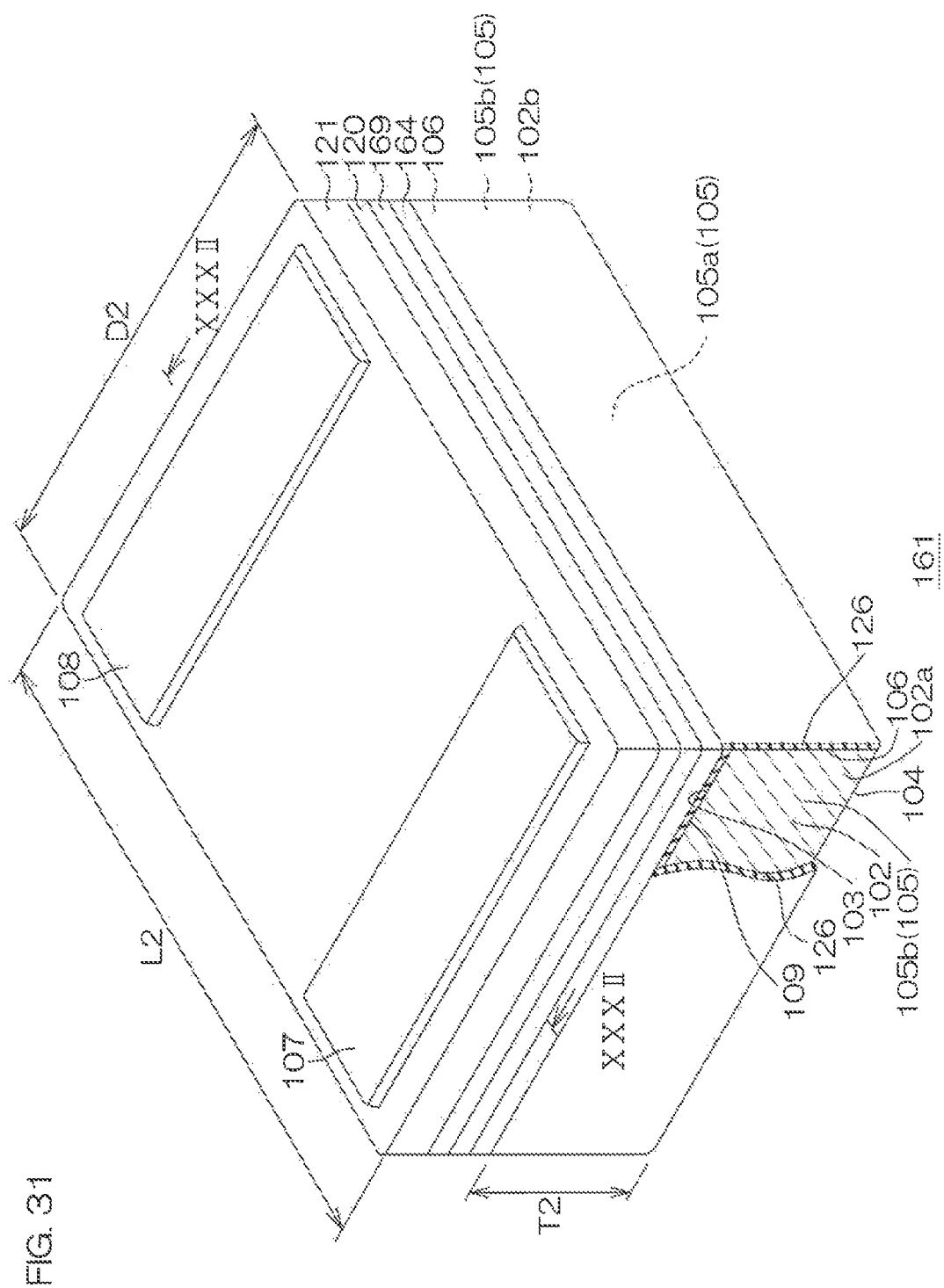
FIG. 31 is a partially cutaway perspective view of a chip capacitor according to a tenth preferred embodiment of the present invention.
Figure 32:
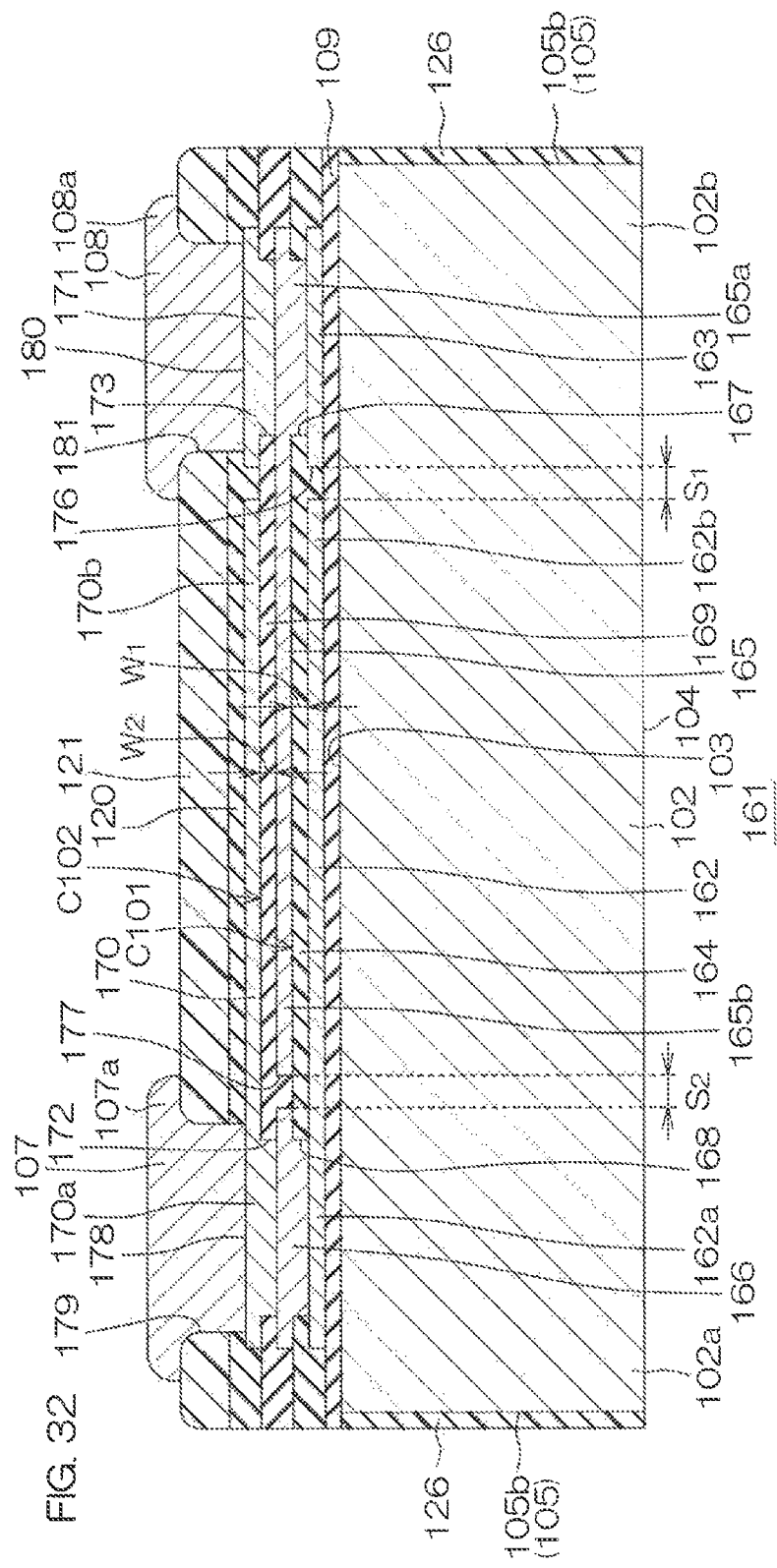
FIG. 32 is a sectional view taken along line XXXII-XXXII shown in FIG. 31.

FIG. 31 is a partially cutaway perspective view of a chip capacitor 161 according to a tenth preferred embodiment of the present invention. FIG. 32 is a sectional view taken along line XXXII-XXXII shown in FIG. 31.

Figure 33:
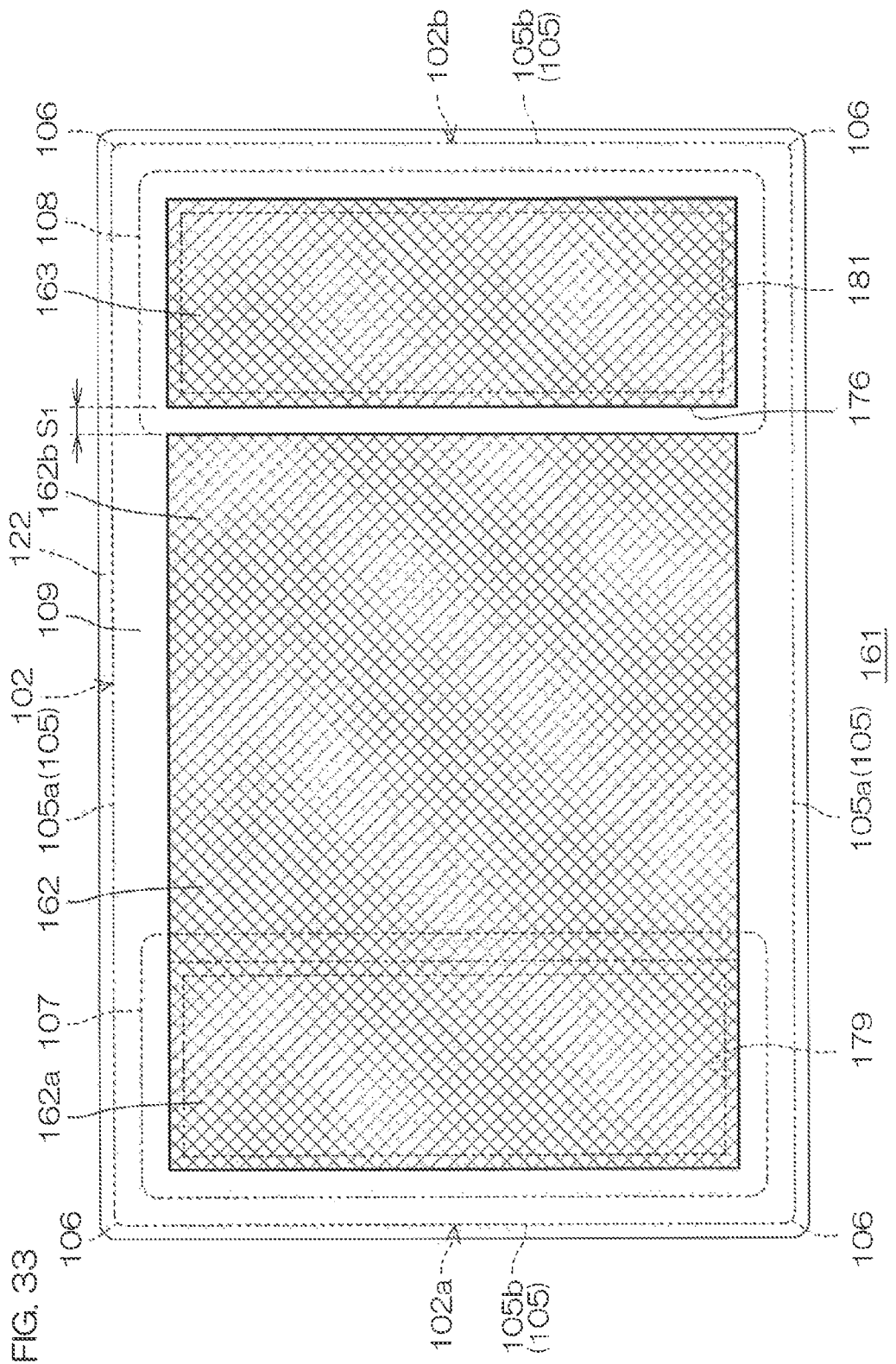
FIG. 33 is a plan view of the chip capacitor shown in FIG. 31, in which structures above a first conductive film are removed.

FIG. 33 is a plan view of the chip capacitor 161 shown in FIG. 31, in which structures above a first conductive film 162 (to be described below) are removed.

Figure 34:
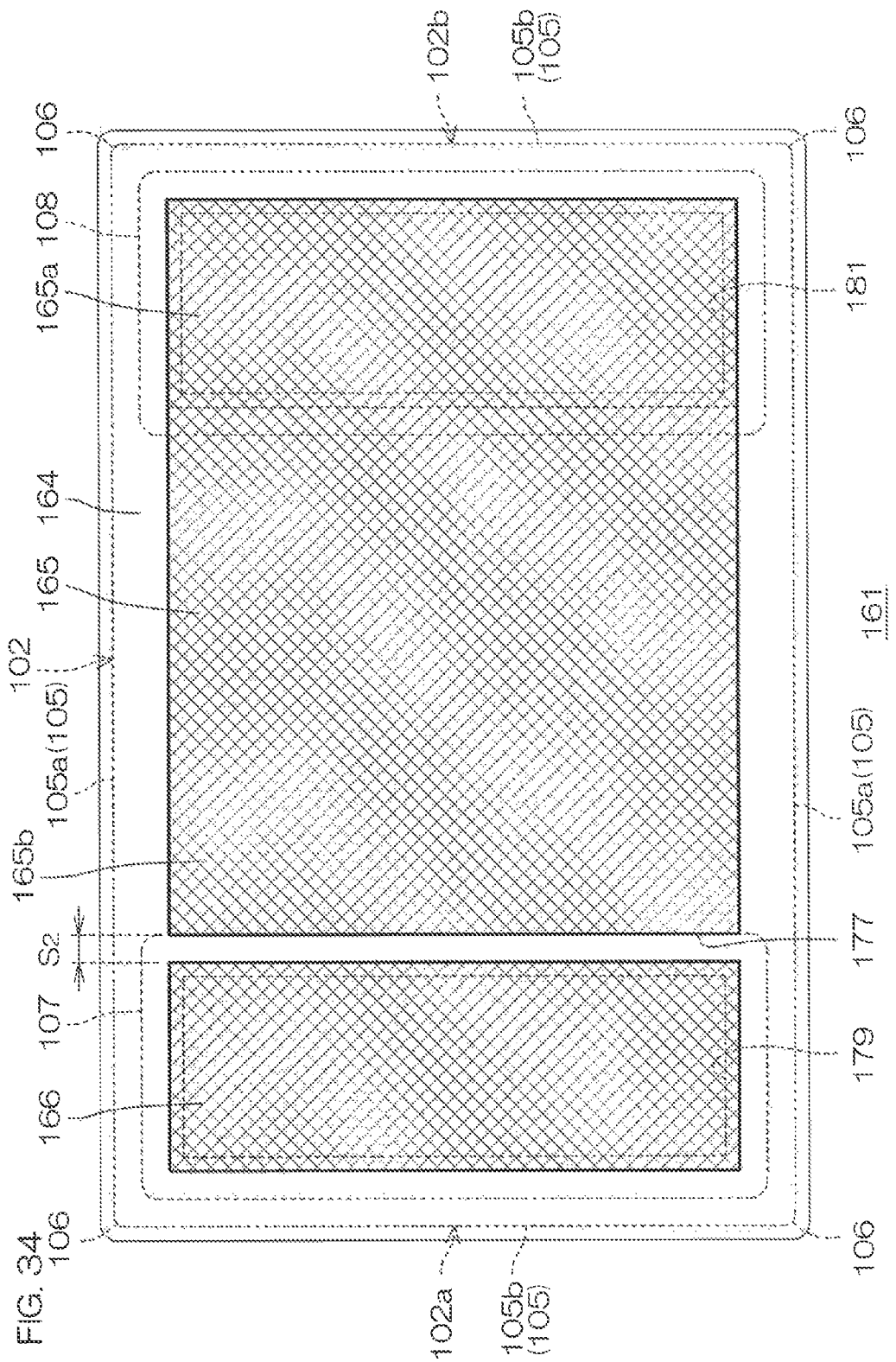
FIG. 34 is a plan view of the chip capacitor shown in FIG. 31, in which structures above a second conductive film are removed.
Figure 35:
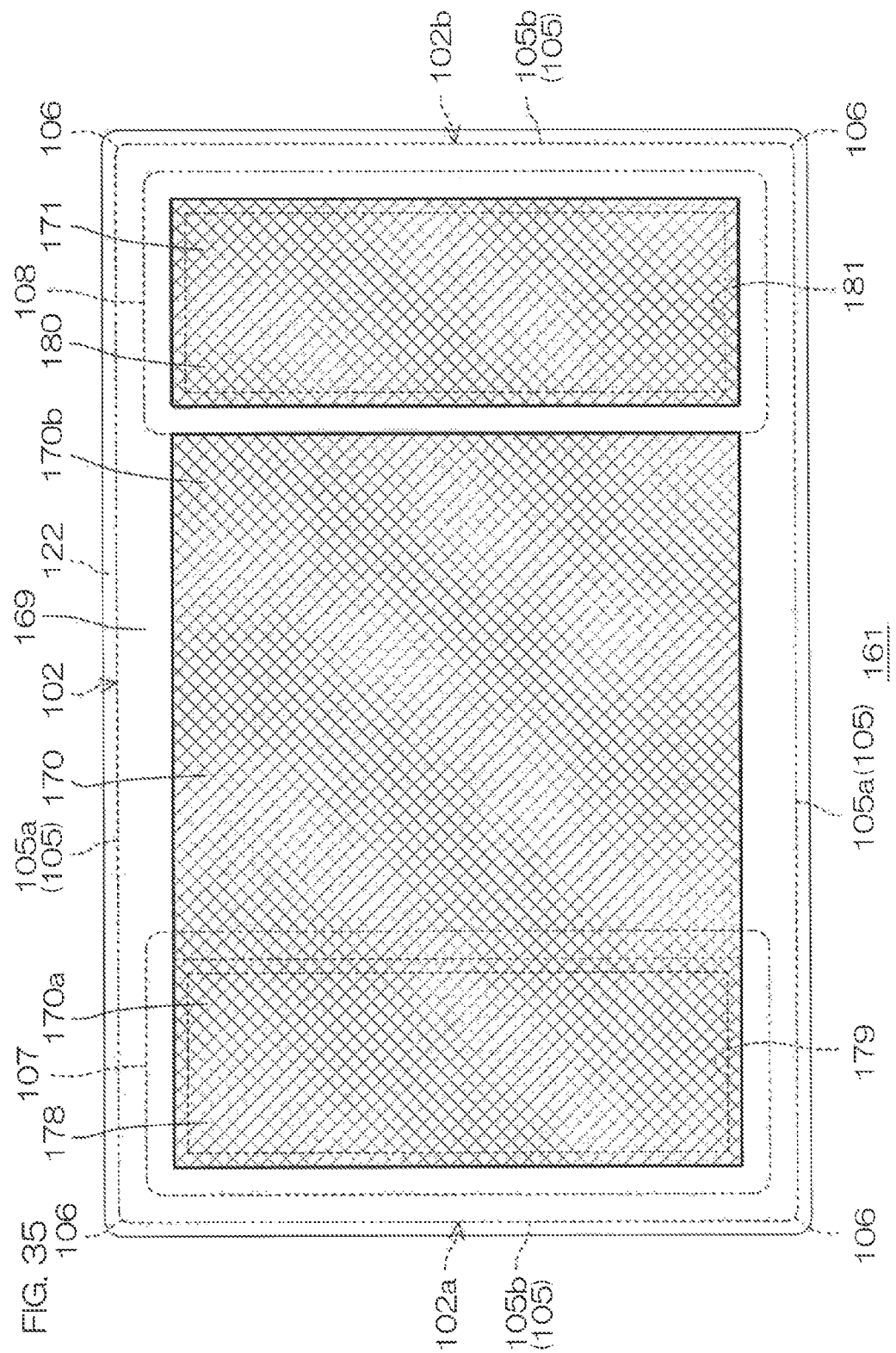
FIG. 35 is a plan view of the chip capacitor shown in FIG. 31, in which structures above a third conductive film are removed.

FIG. 34 is a plan view of the chip capacitor 161 shown in FIG. 31, in which structures above a second conductive film 165 (to be described below) are removed. FIG. 35 is a plan view of the chip capacitor 161 shown in FIG. 31, in which structures above a third conductive film 170 (to be described below) are removed.

In this preferred embodiment, the same reference numerals are applied to the same structures as those described in the sixth preferred embodiment, and the description thereof is omitted.

Referring to FIGS. 31 and 32, the chip capacitor 161 has a multilayer laminated structure where a plurality of conductor films and a plurality of dielectric films are alternately laminated along the normal direction of the first main surface 103 of the substrate 102.

Referring to FIGS. 32 and 33, a first conductive film 162 and a first pad conductive film 163 are formed on the insulating film 109. The first conductive film 162 and the first pad conductive film 163 are shown by crosshatching for the sake of clarity in FIG. 33.

The first conductive film 162 is formed in a rectangular shape extending from the one end portion 102a side to the other end portion 102b side of the substrate 102 in plan view. The first conductive film 162 may include at least one of Cu, Al, AlSi or AlCu. The first conductive film 162 integrally includes a first connecting region 162a and a first capacitor forming region 162b.

The first connecting region 162a is formed at the one end portion 102a side of the substrate 102. The first connecting region 162a is formed in the region immediately below the first external electrode 107. The first connecting region 162a is formed in a rectangular shape extending along the width direction of the substrate 102 in plan view.

The first capacitor forming region 162b is formed at the other end portion 102b side of the substrate 102 with respect to the first connecting region 162a. The first capacitor forming region 162b is led out from the first connecting region 162a toward the other end portion 102b side of the substrate 102. The first capacitor forming region 162b covers a region between the first external electrode 107 and the second external electrode 108. The first capacitor forming region 162b exposes the region immediately below the second external electrode 108 in the insulating film 109.

An end portion located at the other end portion 102b side of the substrate 102 in the first capacitor forming region 162b may be formed in a region where the insulating film 109 does not face to the second external electrode 108. The end portion located at the other end portion 102b side of the substrate 102 in the first capacitor forming region 162b may be formed in a region where the insulating film 109 faces to the second external electrode 108.

The first pad conductive film 163 is formed at the other end portion 102b side of the substrate 102 with respect to the first conductive film 162. The first pad conductive film 163 is formed apart from the second conductive film 165 along the facing direction where the first external electrode 107 and the second external electrode 108 face each other. The first pad conductive film 163 is formed in the region immediately below the second external electrode 108. The first pad conductive film 163 is formed in a rectangular shape extending along the width direction of the substrate 102 in plan view.

A thickness of the first pad conductive film 163 is substantially equal to a thickness of the first conductive film 162. The first pad conductive film 163 may include at least one of Cu, Al, AlSi, or AlCu.

A first slit 176 is formed in a region between the first conductive film 162 and the first pad conductive film 163. An inner wall surface of the first slit 176 is formed by the insulating film 109, a lateral surface of the first conductive film 162, and a lateral surface of the first pad conductive film 163.

Referring to FIG. 32, a first dielectric film 164 is formed on the insulating film 109. The first dielectric film 164 enters the first slit 176 and collectively covers the first conductive film 162 and the first pad conductive film 163.

The first dielectric film 164 may include an $SiO_2$ film or an SiN film. The first dielectric film 164 may include an ONO film including an oxide film ($SiO_2$ film)/a nitride film (SiN film)/an oxide film ($SiO_2$ film) formed in this order from the substrate 102 side.

Referring to FIGS. 32 and 34, a second conductive film 165 and a second pad conductive film 166 are formed on the first dielectric film 164. The second conductive film 113 and the second pad conductive film 114 are shown by crosshatching for the sake of clarity in FIG. 34.

The second conductive film 165 is formed in a rectangular shape extending from the other end portion 102b side to the one end portion 102a side of the substrate 102 in plan view. The second conductive film 165 may include at least one of Cu, Al, AlSi, or AlCu. The second conductive film 165 integrally includes a second connecting region 165a and a second capacitor forming region 165b.

The second connecting region 165a is formed at the other end portion 102b side of the substrate 102. The second connecting region 165a is formed in the region immediately below the second external electrode 108. The second connecting region 165a is formed in a rectangular shape extending along the width direction of the substrate 102 in plan view.

A first via hole 167 selectively exposing the first pad conductive film 163 is formed in the first dielectric film 164. The second connecting region 165a is connected to the first pad conductive film 163 through the first via hole 167.

The first dielectric film 164 without the first via hole 167 may be adopted. In this case, the second connecting region 165a faces to the first pad conductive film 163 across the first dielectric film 164.

The second capacitor forming region 165b is formed at the one end portion 102a side of the substrate 102 with respect to the second connecting region 165a. The second capacitor forming region 165b is led out from the second connecting region 165a toward the one end portion 102a side of the substrate 102. The second capacitor forming region 165b covers a region between the first external electrode 107 and the second external electrode 108. The second capacitor forming region 165b faces to the first capacitor forming region 162b across the first dielectric film 164. The second capacitor forming region 165b exposes the region immediately below the first external electrode 107 in the first dielectric film 164.

An end portion of the one end portion 102a side of the substrate 102 in the second capacitor forming region 165b may be formed in a region where the first dielectric film 164 does not face to the first external electrode 107. The end portion of the one end portion 102a side of the substrate 102 in the second capacitor forming region 165b may be formed in a region where the first dielectric film 164 faces to the first external electrode 107.

The second pad conductive film 166 is formed at the one end portion 102a side of the substrate 102 with respect to the second conductive film 165. The second pad conductive film 166 is formed apart from the second conductive film 165 along the facing direction where the first external electrode 107 and the second external electrode 108 face each other. The second pad conductive film 166 is formed in the region immediately below the first external electrode 107. The second pad conductive film 166 is formed in a rectangular shape extending along the width direction of the substrate 102 in plan view.

A thickness of the second pad conductive film 166 is substantially equal to a thickness of the second conductive film 165. The second pad conductive film 166 may include at least one of Cu, Al, AlSi, or AlCu.

A second via hole 168 selectively exposing the first connecting region 162a of the first conductive film 162 is formed in the first dielectric film 164. The second pad conductive film 166 is connected to the first connecting region 162a of the first conductive film 162 through the second via hole 168.

A second slit 177 is formed in a region between the second conductive film 165 and the second pad conductive film 166. An inner wall surface of the second slit 177 is formed by the first dielectric film 164, a lateral surface of the second conductive film 165, and a lateral surface of the second pad conductive film 166.

Referring to FIG. 32, a second dielectric film 169 is formed on the first dielectric film 164. The second dielectric film 169 enters the second slit 177 and collectively covers the second conductive film 165 and the second pad conductive film 166.

The second dielectric film 169 may include an $SiO_2$ film or an SiN film. The second dielectric film 169 may include an ONO film including an oxide film ($SiO_2$ film)/a nitride film (SiN film)/an oxide film ($SiO_2$ film) formed in this order from the substrate 102 side.

Referring to FIGS. 32 and 35, a third conductive film 170 and a third pad conductive film 171 are formed on the second dielectric film 169. The third conductive film 170 and the third pad conductive film 171 are shown by cross-hatching for the sake of clarity in FIG. 35.

The third conductive film 170 is formed in a rectangular shape extending from the one end portion 102a side to the other end portion 102b side of the substrate 102 in plan view. The third conductive film 170 may include at least one of Cu, Al, AlSi, or AlCu. The third conductive film 170 integrally includes a third connecting region 170a and a third capacitor forming region 170b.

The third connecting region 170a is formed at the one end portion 102a side of the substrate 102. The third connecting region 170a is formed in the region immediately below the first external electrode 107. The third connecting region 170a is formed in a rectangular shape extending along the width direction of the substrate 102 in plan view.

A third via hole 172 selectively exposing the second pad conductive film 166 is formed in the second dielectric film 169. The third connecting region 170a is connected to the second pad conductive film 166 through the third via hole 172.

The third capacitor forming region 170b is formed at the other end portion 102b side of the substrate 102 with respect to the third connecting region 170a. The third capacitor forming region 170b is led out from the third connecting region 170a toward the other end portion 102b side of the substrate 102. The third capacitor forming region 170b covers a region between the first external electrode 107 and the second external electrode 108. The third capacitor forming region 170b faces to the second capacitor forming region 165b across the second dielectric film 169. The third capacitor forming region 170b exposes the region immediately below the second external electrode 108 in the second dielectric film 169.

An end portion of the other end portion 102b side of the substrate 102 in the third capacitor forming region 170b may be formed in a region where the second dielectric film 169 does not face to the second external electrode 108. The end portion of the other end portion 102b side of the substrate 102 in the third capacitor forming region 170b may be formed in a region where the second dielectric film 169 faces to the second external electrode 108.

The third pad conductive film 171 is formed at the other end portion 102b side of the substrate 102 with respect to the third conductive film 170. The third pad conductive film 171 is formed apart from the third conductive film 170 along the facing direction where the first external electrode 107 and the second external electrode 108 face each other. The third pad conductive film 171 is formed in the region immediately below the second external electrode 108. The third pad conductive film 171 is formed in a rectangular shape extending along the width direction of the substrate 102 in plan view.

A thickness of the third pad conductive film 171 is substantially equal to a thickness of the third conductive film 170. The third pad conductive film 171 may include at least one of Cu, Al, AlSi, or AlCu.

A fourth via hole 173 selectively exposing the second connecting region 165a of the second conductive film 165 is formed in the second dielectric film 169. The third pad conductive film 171 is electrically connected to the second connecting region 165a through the fourth via hole 173.

Referring to FIG. 32, a first capacitor region C101 having a predetermined capacity and a second capacitor region C102 having a predetermined capacity are formed on the first main surface 103 of the substrate 102. The first capacitor region C101 and the second capacitor region C102 are laminated along the normal direction of the first main surface 103 of the substrate 102.

The first capacitor region C101 is formed by a laminated film including the first conductive film 162, the first dielectric film 164 and the second conductive film 165. The second capacitor region C102 is formed by a laminated film including the second conductive film 165, the second dielectric film 169 and the third conductive film 170.

Hereinafter, a width S1 of the first slit 176 is explained specifically referring to FIGS. 32 to 34. The width S1 of the first slit 176 is set to be equal to or greater than a thickness W1 of the first dielectric film 164 and equal to or smaller than twice the thickness W1 of the first dielectric film 164 ($W1 \le S1 \le 2 \times W1$). The width S1 of the first slit 176 is defined as a width along the facing direction where the first external electrode 107 and the second external electrode 108 face each other in the first slit 176.

The first dielectric film 164 formed along the lateral surface of the first conductive film 162, and the first dielectric film 164 formed along the lateral surface of the first pad conductive film 163 can thus be integrated each other inside the first slit 176.

The formation of the hollow in a region along the first slit 176 in the first dielectric film 164 can thus be suppressed. The reduction of the electric dielectric strength due to the electric field concentration can thereby be suppressed.

The width S1 of the first slit 176 is preferably set to a value at which the surface of the first dielectric film 164 is to be flat. In this case, the second conductive film 165 having a flat surface can be formed on the first dielectric film 164. The local electric field concentration to the first dielectric film 164 can thereby be effectively suppressed.

Hereinafter, a width S2 of the second slit 177 is explained specifically referring to FIGS. 32 to 34. The width S2 of the second slit 177 is set to be equal to or greater than a thickness W2 of the second dielectric film 169 and equal to or smaller than twice the thickness W2 of the second dielectric film 169 (W2≤S2≤2×W2). The width S2 of the second slit 177 is defined as a width along the facing direction where the first external electrode 107 and the second external electrode 108 face each other in the second slit 177.

The second dielectric film 169 formed along the lateral surface of the second conductive film 165 and the second dielectric film 169 formed along the lateral surface of the second pad conductive film 166 can thus be integrated each other inside the second slit 177.

The formation of the hollow in a region along the second slit 177 in the second dielectric film 169 can thus be suppressed. The reduction of the electric dielectric strength due to the electric field concentration can thereby be suppressed.

The width S2 of the second slit 177 is preferably set to a value at which the surface of the second dielectric film 169 is to be flat. In this case, the third conductive film 170 having a flat surface can be formed on the second dielectric film 169. The local electric field concentration to the second dielectric film 169 can thereby be effectively suppressed.

Referring to FIG. 32, a first pad opening 179 and a second pad opening 181 are formed, instead of the first pad opening 123 and the second pad opening 125, in the first passivation film 120 and the resin film 121.

The first pad opening 179 selectively exposes a region excluding an edge portion of the third connecting region 170a of the third conductive film 170 as a first pad region 178. The second pad opening 181 exposes a region excluding an edge portion of the third pad conductive film 171 as a second pad region 180.

The first external electrode 107 is formed in the first pad opening 179. The first external electrode 107 is connected to the first pad region 178 inside the first pad opening 179. The first external electrode 107 is thus electrically connected to the first conductive film 162 and the third conductive film 170.

The second external electrode 108 is formed in the second pad opening 181. The second external electrode 108 is connected to the second pad region 180 inside the second pad opening 181. The second external electrode 108 is thus electrically connected to the second conductive film 165.

As described above, according to the chip capacitor 161, the first slit 176 is formed in the region between the first conductive film 162 and the first pad conductive film 163. The width S1 of the first slit 176 is set to be equal to or greater than the thickness W1 of the first dielectric film 164 and equal to or smaller than twice the thickness W1 of the first dielectric film 164 (W1≤S1≤2×W1).

The formation of the hollow in the region above the first slit 176 in the first dielectric film 164 can thus be suppressed. Also, the first dielectric film 164 having the flat surface can thereby be formed on the first conductive film 162 and the first pad conductive film 163. As a result, the electric field concentration to the region above the first slit 176 in the first dielectric film 164 can be suppressed. The chip capacitor 161 enabling improvement of the electric dielectric strength can thereby be provided.

Also, according to the chip capacitor 161, the second slit 177 is formed in the region between the second conductive film 165 and the second pad conductive film 166. The width S2 of the second slit 177 is set to be equal to or greater than the thickness W2 of the second dielectric film 169 and equal to or smaller than twice the thickness W2 of the second dielectric film 169 (W2≤S2≤2×W2).

The formation of the hollow in the region above the second slit 177 in the second dielectric film 169 can thus be suppressed. Also, the second dielectric film 169 having the flat surface can thereby be formed on the second conductive film 165 and the second pad conductive film 166. As a result, the electric field concentration to the region above the second slit 177 in the second dielectric film 169 can be suppressed. The chip capacitor 161 enabling improvement of the electric dielectric strength can thereby be provided.

Also, according to the chip capacitor 161, the multilayer laminated structure including the first conductive film 162, the first dielectric film 164, the second conductive film 165, the second dielectric film 169 and the third conductive film 170 is formed on the first main surface 103 of the substrate 102.

The first capacitor region C101 and the second capacitor region C102 are thereby be formed along the normal direction of the first main surface 103 of the substrate 102. The chip capacitor 161 capable of realizing enlargement of capacity and miniaturization can thus be provided.

Also, according to the chip capacitor 161, the first pad conductive film 163 is interposed in the region between the first main surface 103 of the substrate 102 and the second connecting region 165a of the second conductive film 165. Also, the second pad conductive film 166 is interposed in the region between the first connecting region 162a of the first connecting film 162 and the third connecting region 170a of the third conductive film 170. Further, the third pad conductive film 171 is interposed in the region between the second connecting region 165a of the second conductive film 165 and the second external electrode 108.

Each flatness of the first conductive film 162, the first dielectric film 164, the second conductive film 165, the second dielectric film 169 and the third conductive film 170 can thus be enhanced.

Additionally, the height variations occurring between the second external electrode 108 connected to the third pad conductive film 171 and the first external electrode 107 connected to the third connecting region 170a of the third conductive film 170 can be suppressed. The mounting failure caused by the height variations between the first external electrode 107 and the second external electrode 108 can thereby be reduced, in a case where the chip capacitor 161 is mounted onto a connecting object such as a mounting board, etc.

In the present preferred embodiment, from the view point of laminated number of the conductive films, the first conductive film 162 is formed in a first layer, the second conductive film 165 is formed in a second layer, and the third conductive film 170 is formed in a third layer. However, a structure where a plurality of the second conductive film 165 and a plurality of the third conductive film 170 are alternately laminated on the first conductive film 162 across the second dielectric film 169 interposed therebetween may be adopted.

In this case, the second conductive film 165 is formed in a 2n layer (n is a natural number), and the third conductive film 170 is formed in a 2n+1 layer. The second conductive film 165 may be formed in the 2n layer. The third conductive film 170 may be formed in the 2n+1 layer.

Figure 36:
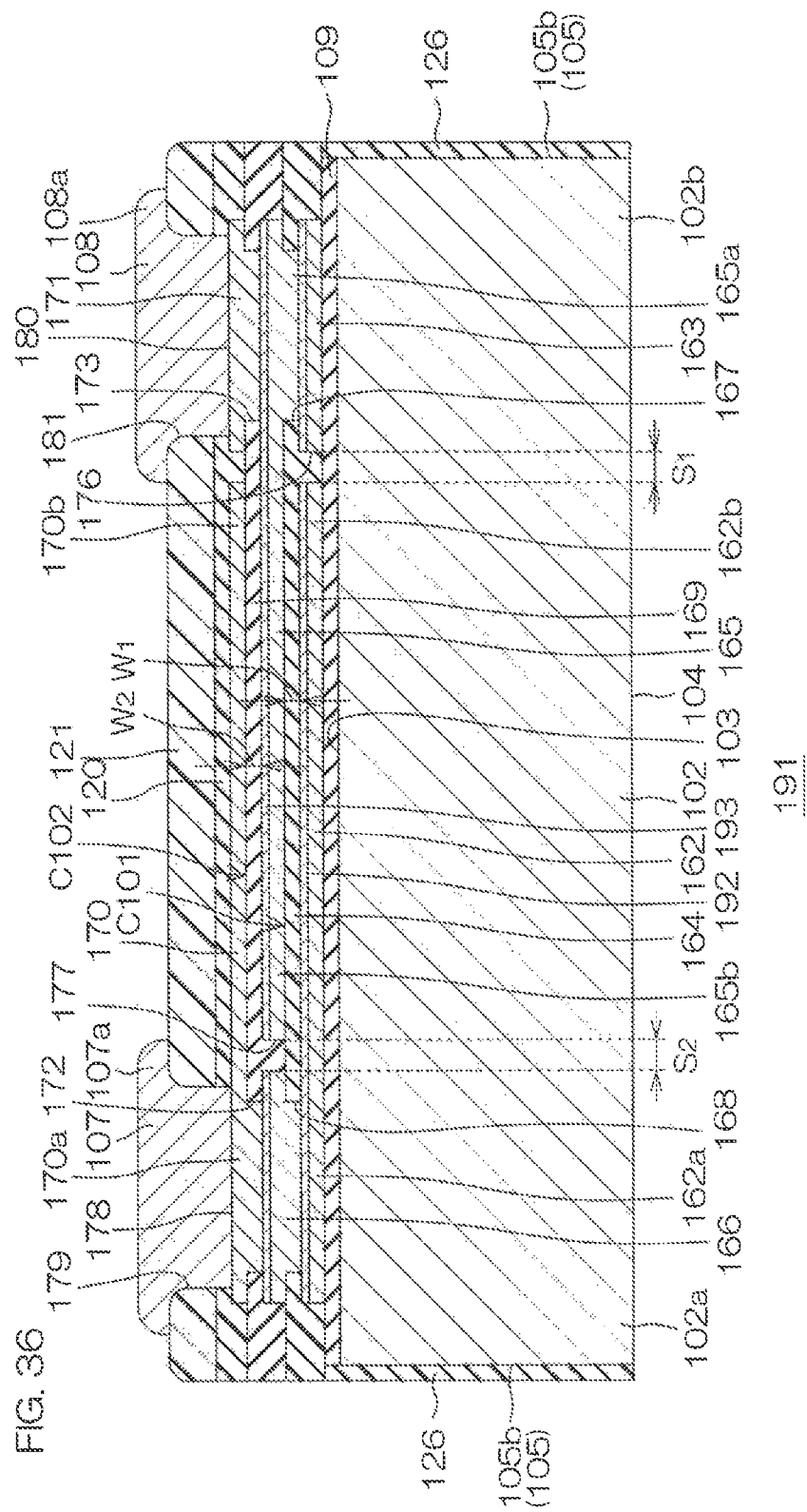
FIG. 36 is a sectional view of a chip capacitor according to an eleventh preferred embodiment of the present invention.

FIG. 36 is a sectional view of a chip capacitor 191 according to an eleventh preferred embodiment of the present invention. In this preferred embodiment, the same reference numerals are applied to the same structures as those described in the tenth preferred embodiment, and the description thereof is omitted.

The chip capacitor 191 further includes a first barrier conductive film 192 and a second barrier conductive film 193. The first barrier conductive film 192 is interposed in a region between the first conductive film 162 and the first dielectric film 164. The second barrier conductor film 193 is interposed in a region between the second conductive film 165 and the second dielectric film 169.

The first barrier conductive film 192 covers a substantially whole region of the first conductive film 162. The first barrier conductive film 192 has a shape matching a shape of the first conductive film 162 in plan view. The first barrier conductive film 192 may include at least one of Ti, TiN, W or TiW.

A thickness of the first barrier conductive film 192 is smaller than a thickness of the first conductive film 162. The thickness of the first barrier conductive film 192 is, for example, equal to or greater than 0.01 times and equal to or smaller than 0.1 times of the thickness of the first conductive film 162. The thickness of the first barrier conductive film 192 is, for example, equal to or greater than 100 Å and equal to or smaller than 3000 Å. The thickness of the first conductive film 162 is, for example, equal to or greater than 1000 Å and equal to or smaller than 30000 Å.

The first barrier conductive film 192 covers a substantially whole region of the first pad conductive film 163 in this preferred embodiment. The first barrier conductive film 192 has a shape matching a shape of the first pad conductive film 163 in plan view. The first barrier conductive film 192 having a structure not covering the first pad conductive film 163 may be adopted.

The second barrier conductive film 193 covers a substantially whole region of the second conductive film 165. The second barrier conductive film 193 has a shape matching a shape of the second conductive film 165 in plan view. The second barrier conductive film 193 may include at least one of Ti, TiN, W or TiW.

A thickness of the second barrier conductive film 193 is smaller than a thickness of the second conductive film 165. The thickness of the second barrier conductive film 193 is, for example, equal to or greater than 0.01 times and equal to or smaller than 0.1 times of the thickness of the second conductive film 165. The thickness of the second barrier conductive film 193 is, for example, equal to or greater than 100 Å and equal to or smaller than 3000 Å. The thickness of the second conductive film 165 is, for example, equal to or greater than 1000 Å and equal to or smaller than 30000 Å.

The second barrier conductive film 193 covers a substantially whole region of the second pad conductive film 166 in this preferred embodiment. The second barrier conductive film 193 has a shape matching a shape of the second pad conductive film 166 in plan view. The second barrier conductive film 193 having a structure not covering the second pad conductive film 166 may be adopted.

A fine convexoconcave called hillock can be formed at the surface of the first conductive film 162. The first dielectric film 164 is formed on the first conductive film 162 so as to enter the hillock. In this case, a hollow recessed toward the first conductive film 162 side is formed in a region above the hillock at the surface of the first dielectric film 164.

The second conductive film 165 is formed on the first dielectric film 164 so as to enter the hollow of the first dielectric film 164. The second conductive film 165 is thus faced to the first conductive film 162 across the first dielectric film 164 inside the hollow of the first dielectric film 164.

The electric field tends to concentrate locally to a portion where the hollow is formed in the first dielectric film 164. Such electric field concentration causes a decrease in the electric dielectric strength of the chip capacitor. A breakdown voltage and an ESD (Electro Static Discharge) damage resistance, for example, are included in the electric dielectric strength which decreases due to the electric field concentration.

According to the chip capacitor 191, the first barrier conductive film 192 is therefore formed covering the surface of the first conductive film 162. The first barrier conductive film 192 fills the hillock and covers the surface of the first conductive film 162.

The entering of the first dielectric film 164 into the hillock formed in the first conductive film 162 can thus be suppressed. The electric field concentration due to the hillock formed in the first dielectric film 164 can thereby be suppressed.

Also, the first barrier conductive film 192 having a flat surface can be formed on the first conductive film 162. The flatness of structures formed on the first barrier conductive film 192, such as the second conductive film 165, can thus be enhanced. The undesirable electric field concentration to a region between the first conductive film 162 and the second conductive film 165, etc., can thereby be suppressed.

Further, according to the chip capacitor 191, the second barrier conductive film 193 is formed covering the surface of the second conductive film 165. The second barrier conductive film 193 fills the hillock and covers the surface of the second conductive film 165.

The entering of the second dielectric film 169 into the hillock formed at the second conductive film 165 can thus be suppressed. The electric field concentration due to the hillock formed at the second conductive film 165 can thereby be suppressed.

Also, the second barrier conductive film 193 having a flat surface can be formed on the second conductive film 165. The flatness of structures formed on the second barrier conductive film 193, such as the third conductive film 170, can thus be enhanced. The undesirable electric field concentration to a region between the second conductive film 165 and the third conductive film 170, etc., can thereby be suppressed.

Figure 37:
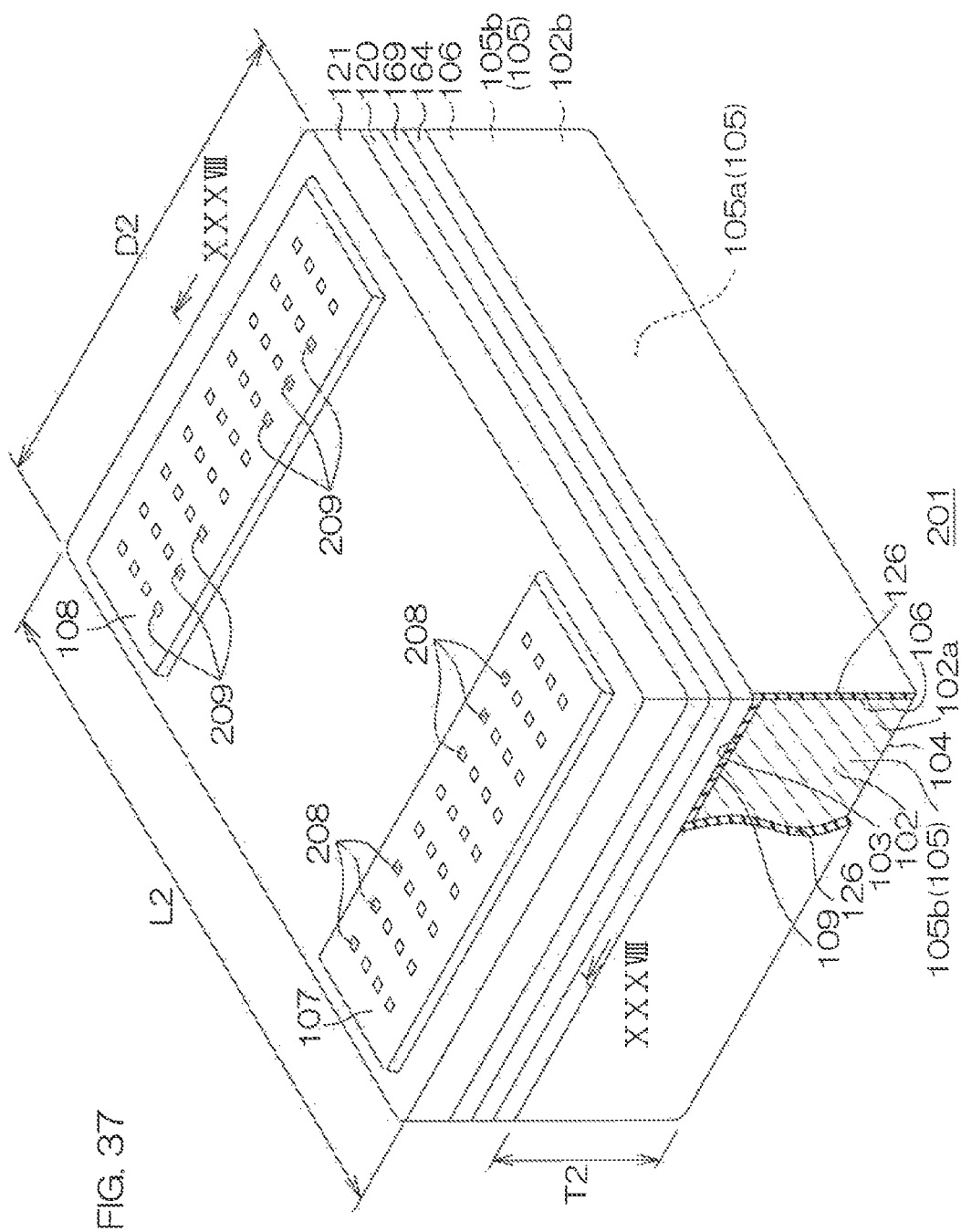
FIG. 37 is a partial cutaway perspective view of a chip capacitor according to a twelfth preferred embodiment of the present invention.

FIG. 37 is a partial cutaway perspective view of a chip capacitor 201 according to a twelfth preferred embodiment of the present invention. FIG. 38 is a sectional view taken along line XXXVIII-XXXVIII shown in FIG. 37. FIG. 39 is a plan view of the chip capacitor 201 shown in FIG. 38, in which structures above the second dielectric film 169 are removed.

In this preferred embodiment, the same reference numerals are applied to the same structures as those described in the tenth preferred embodiment, and the description thereof is omitted.

In the chip capacitor 201, the first external electrode 107 has a first anchor structure joined to the third connecting region 170a of the third conductive film 170. The first external electrode 107 has a convexoconcave structure including a first convex portion 202 on a lower surface thereof as one aspect of the first anchor structure. The connection strength of the first external electrode 107 with respect to the third conductive film 170 is thus enhanced by the first anchor structure.

Also, in the chip capacitor 201, the second external electrode 108 has a second anchor structure joined to the third pad conductive film 171. The second external electrode 108 has a convexoconcave structure including a second convex portion 203 on a lower surface thereof as one aspect of the second anchor structure. The connection strength of the second external electrode 108 with respect to the third pad conductive film 171 is thus enhanced by the first anchor structure.

Hereinafter, the first anchor structure of the first external electrode 107, the second anchor structure of the second external electrode 108, and periphery structures around them are explained specifically.

Referring to FIGS. 38 and 39, a plurality of first via holes 204 and a plurality of second via holes 205 are formed in the second dielectric film 169.

The plurality of first via holes 204 is formed in the region immediately below the first external electrode 107 in the second dielectric film 169. The plurality of first via holes 204 is arranged in a matrix pattern at intervals along the longitudinal direction and the width direction of the substrate 102.

Each of the first via holes 204 is formed in a rectangular shape in plan view. Each of the first via holes 204 may be formed in a circular shape in plan view. Referring to FIG. 38, each of the first via holes 204 selectively exposes the third connecting region 170a of the third conductive film 170.

The plurality of second via holes 205 is formed in the region immediately below the second external electrode 108 in the second dielectric film 169. The plurality of second via holes 205 is arranged in a matrix pattern at intervals along the longitudinal direction and the width direction of the substrate 102.

Each of the second via holes 205 is formed in a rectangular shape in plan view. Each of the second via holes 205 may be formed in a circular shape in plan view. Referring to FIG. 38, each of the second via holes 205 selectively exposes the third pad conductive film 171.

Figure 40A:
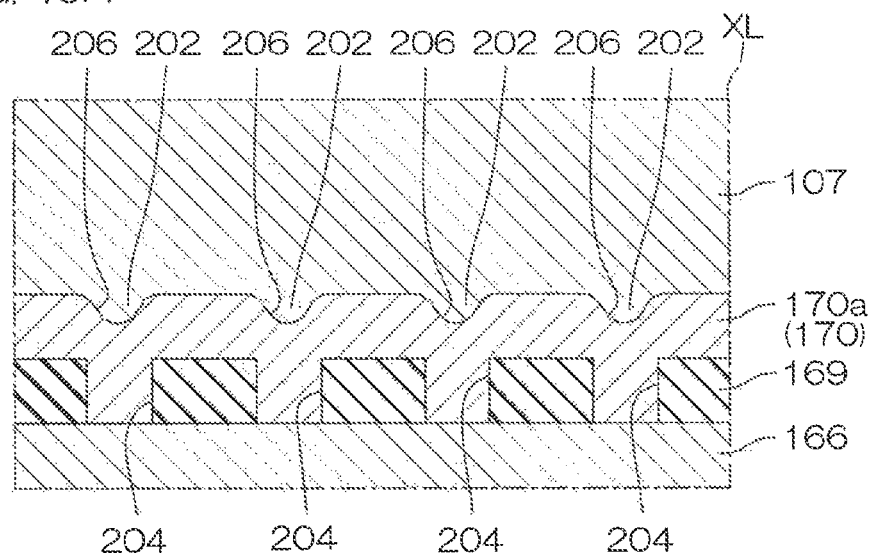
FIG. 40A is an enlarged view of a region XL shown in FIG. 38 and is a view for explaining a first form of via holes.
Figure 40B:
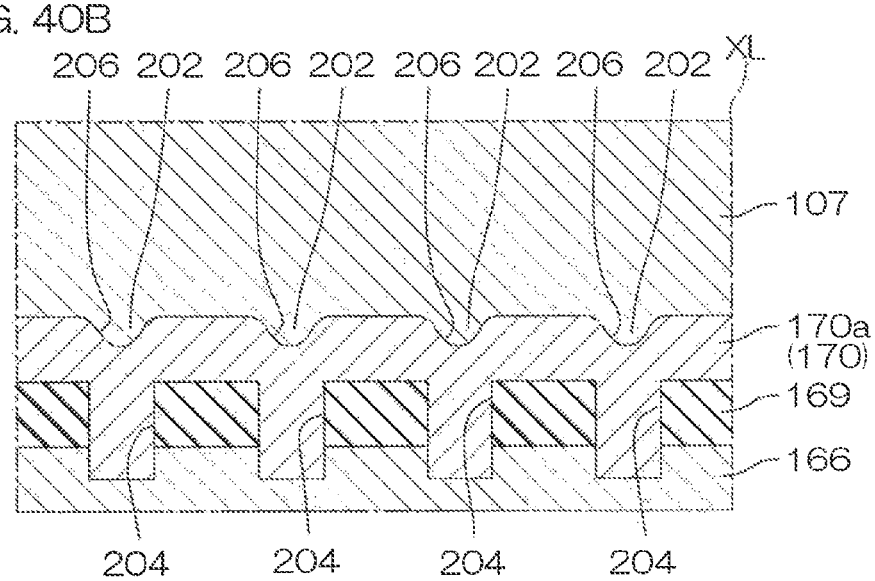
FIG. 40B is an enlarged view of the region XL shown in FIG. 38 and is a view for explaining a second form of via holes.

FIG. 40A is an enlarged view of the region XL shown in FIG. 38 and is a view for explaining a first form of the first via hole 204 and the second via hole 205. FIG. 40B is an enlarged view of the region XL shown in FIG. 38 and is a view for explaining a second form of the first via hole 204 and the second via hole 205.

Referring to FIG. 40A, each of the first via holes 204 may be formed at the depth substantially the same as the thickness of the second dielectric film 169. Referring to FIG. 40B, a bottom of the respective first via holes 204 may be located inside the second pad conductive film 166.

Similarly, each of the second via holes 205 may be formed at the depth substantially the same as the thickness of the second dielectric film 169. Also, a bottom of the respective second via holes 205 may be located inside the second conductive film 165.

Referring to FIGS. 38, 40A and 40B, the third conductive film 170 is formed such that one surface and the other surface is along the surface of the second dielectric film 169 and the inner wall surface of the respective first via holes 204. The third conductive film 170 is connected to the second pad conductive film 166 inside the respective first via holes 204. A first concave portion 206 recessed toward the substrate 102 is formed in a region located above the respective first via holes 204 in the third conductive film 170.

Similarly, the third pad conductive film 171 is formed such that one surface and the other surface are along the surface of the second dielectric film 169 and the inner wall surface of the respective second via holes 205. The third pad conductive film 171 is connected to the second conductive film 165 inside the respective second via holes 205. A second concave portion 207 recessed toward the substrate 102 is formed in a region located above the respective second via holes 205 in the third pad conductive film 171.

The first convex portion 202 of the first external electrode 107 is formed by the conductive material of the first external electrode 107 which is entered into the first concave portion 206 of the first conductive film 170. Each of the first convex portions 202 is located immediately above each of the first via holes 204.

The plurality of first convex portions 202 of the first external electrode 107 is therefore arranged in the same pattern as the plurality of first via holes 204 in the first external electrode 107. That is, the plurality of first convex portions 202 is arranged in a matrix pattern at intervals along the longitudinal direction and the width direction of the substrate 102.

Similarly, the second convex portion 203 of the second external electrode 108 is formed by the conductive material of the second external electrode 108 which is entered into the second concave portion 207 of the third pad conductive film 171. Each of the second convex portions 203 is located immediately above each of the second via holes 205.

The plurality of second convex portions 203 of the second external electrode 108 is therefore arranged in the same pattern as the plurality of second via holes 205 in the second external electrode 108. That is, the plurality of second convex portions 203 is arranged in a matrix pattern at intervals along the longitudinal direction and the width direction of the substrate 102.

Referring to FIGS. 37 and 38, a plurality of first surface concave portion 208 recessed toward the substrate 102 side is formed at a surface of the first external electrode 107. Each of the first surface concave portions 208 is formed due to the first via holes 204 and the first convex portions 202 of the first external electrode 107.

Each of the first surface concave portions 208 is therefore located immediately above each of the first via holes 204. Also, the plurality of first surface concave portions 208 is arranged in the same pattern as the plurality of first via holes 204. That is, the plurality of first surface concave portion 208 is arranged in a matrix pattern at intervals along the longitudinal direction and the width direction of the substrate 102.

Similarly, a plurality of second surface concave portions 209 recessed toward the substrate 102 side is formed at a surface of the second external electrode 108. Each of the second surface concave portions 209 is formed due to the second via holes 205 and the second convex portions 203 of the second external electrode 108.

Each of the second surface concave portions 209 is therefore located immediately above each of the second via holes 205. Also, the plurality of second surface concave portions 209 is arranged in the same pattern as the plurality of second via holes 205. That is, the plurality of second surface concave portions 209 is arranged in a matrix pattern at intervals along the longitudinal direction and the width direction of the substrate 102.

As described above, according to the chip capacitor 201, the substantially same effect as the chip capacitor 161 according to the tenth embodiment can be achieved. Also, according to the chip capacitor 201, the first external electrode 107 has the first anchor structure which digs into the third connecting region 170a of the third conductive film 170 formed as an internal electrode. Similarly, the second external electrode 108 has the second anchor structure which digs into the third pad conductive film 171 formed as an internal electrode. The connection strength of the first external electrode 107 with respect to the third connecting region 170a of the third conductive film 170 can thus be enhanced. Also, the connection strength of the second external electrode 108 with respect to the third pad conductive film 171 can thus be enhanced.

Also, the third connecting region 170a of the third conductive film 170 is embedded into the first via holes 204 formed in the second dielectric film 169. Similarly, the third pad conductive film 171 is embedded into the second via holes 205 formed in the second dielectric film 169. The connection strength of the third connecting region 170a of the third conductive film 170 with respect to the second dielectric film 169 can thus be enhanced. Also, the connection strength of the third pad conductive film 171 with respect to the second dielectric film 169 can thus be enhanced.

As a result, the first external electrode 107 and the third conductive film 170 can be connected satisfactorily. Also, the second external electrode 108 and the third pad conductive film 171 can be connected satisfactorily.

Also, according to the chip capacitor 201, a surface area of the first external electrode 107 is increased by the plurality of first surface concave portions 208. Similarly, a surface area of the second external electrode 108 is increased by the plurality of second surface concave portions 209.

An adhesive area of the first external electrode 107 with respect to a conductive bonding material (for example, solder) can thus be increased. Also, an adhesive area of the second external electrode 108 with respect to a conductive bonding material (for example, solder) can thus be increased. The connection strength of the chip capacitor 201 with respect to a connecting object can thereby be enhanced, in a case where the chip capacitor 201 is mounted onto the connecting object such as a mounting board, etc.

In the present preferred embodiment, the first convex portions 202, the first via holes 204, the first concave portions 206 and the first surface concave portions 208 may be formed in a staggered pattern in plan view.

In the present preferred embodiment, the first convex portions 202, the first via holes 204, the first concave portions 206 and the first surface concave portions 208 may be formed in a dot pattern in plan view.

In the present preferred embodiment, the first convex portions 202, the first via holes 204, the first concave portions 206 and the first surface concave portions 208 may be formed in a striped pattern extending along the longitudinal direction of the substrate 102 in plan view.

In the present preferred embodiment, the first convex portions 202, the first via holes 204, the first concave portions 206 and the first surface concave portions 208 may be formed in a striped pattern extending along the width direction of the substrate 102 in plan view.

In the present preferred embodiment, the first convex portions 202, the first via holes 204, the first concave portions 206 and the first surface concave portions 208 may be formed in a lattice pattern in plan view.

In the present preferred embodiment, the second convex portions 203, the second via holes 205, the second concave portions 207 and the second surface concave portions 209 may be formed in a staggered pattern in plan view.

In the present preferred embodiment, the second convex portions 203, the second via holes 205, the second concave portions 207 and the second surface concave portions 209 may be formed in a dot pattern in plan view.

In the present preferred embodiment, the second convex portions 203, the second via holes 205, the second concave portions 207 and the second surface concave portions 209 may be formed in a striped pattern extending along the longitudinal direction of the substrate 102 in plan view.

In the present preferred embodiment, the second convex portions 203, the second via holes 205, the second concave portions 207 and the second surface concave portions 209 may be formed in a striped pattern extending along the width direction of the substrate 102 in plan view.

In the present preferred embodiment, the second convex portions 203, the second via holes 205, the second concave portions 207 and the second surface concave portions 209 may be formed in a lattice pattern in plan view.

Figure 41:
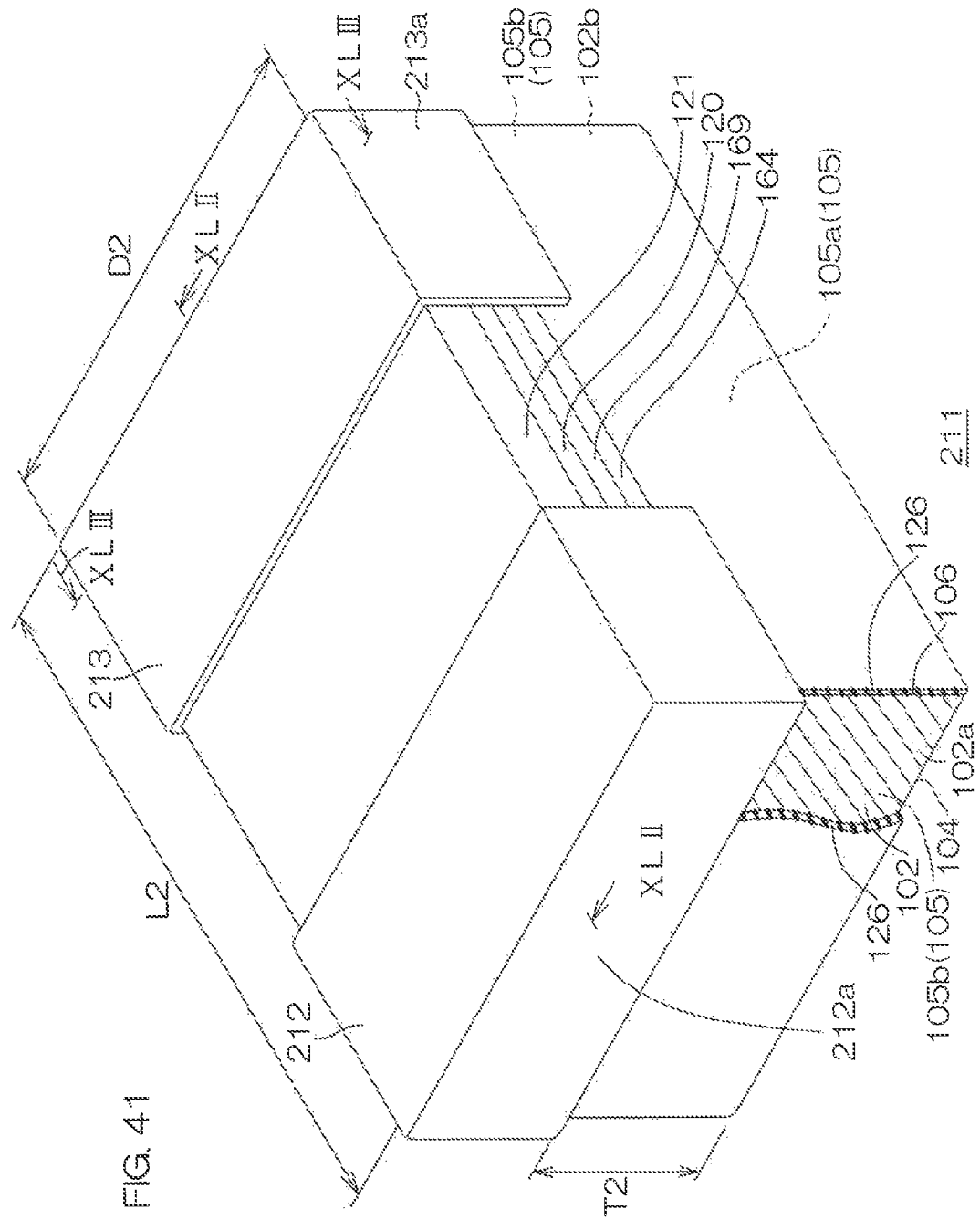
FIG. 41 is a partially cutaway perspective view of a chip capacitor according to a thirteenth preferred embodiment of the present invention.
Figure 42:
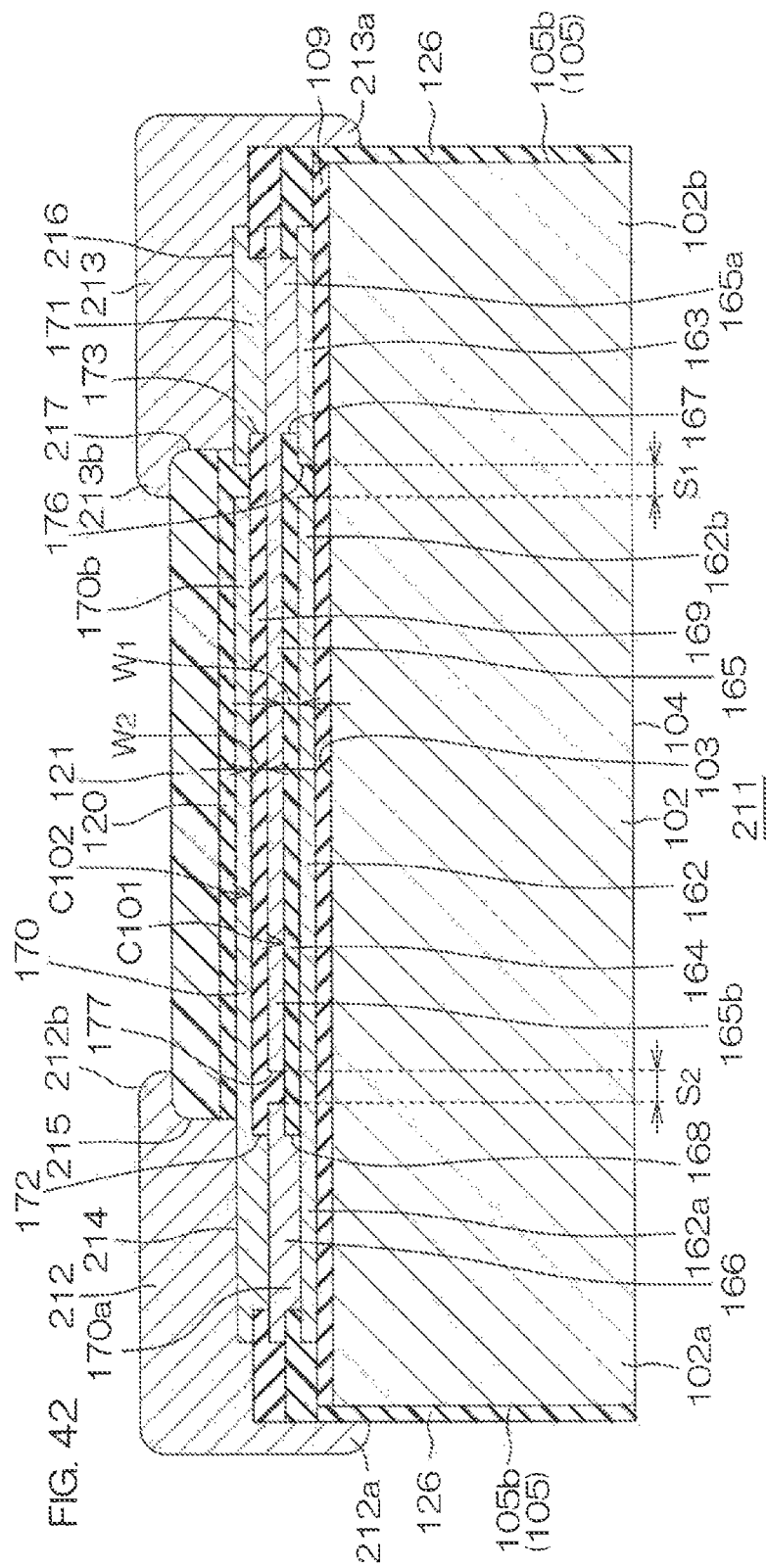
FIG. 42 is a sectional view taken along line XLII-XLII shown in FIG. 41.
Figure 43:
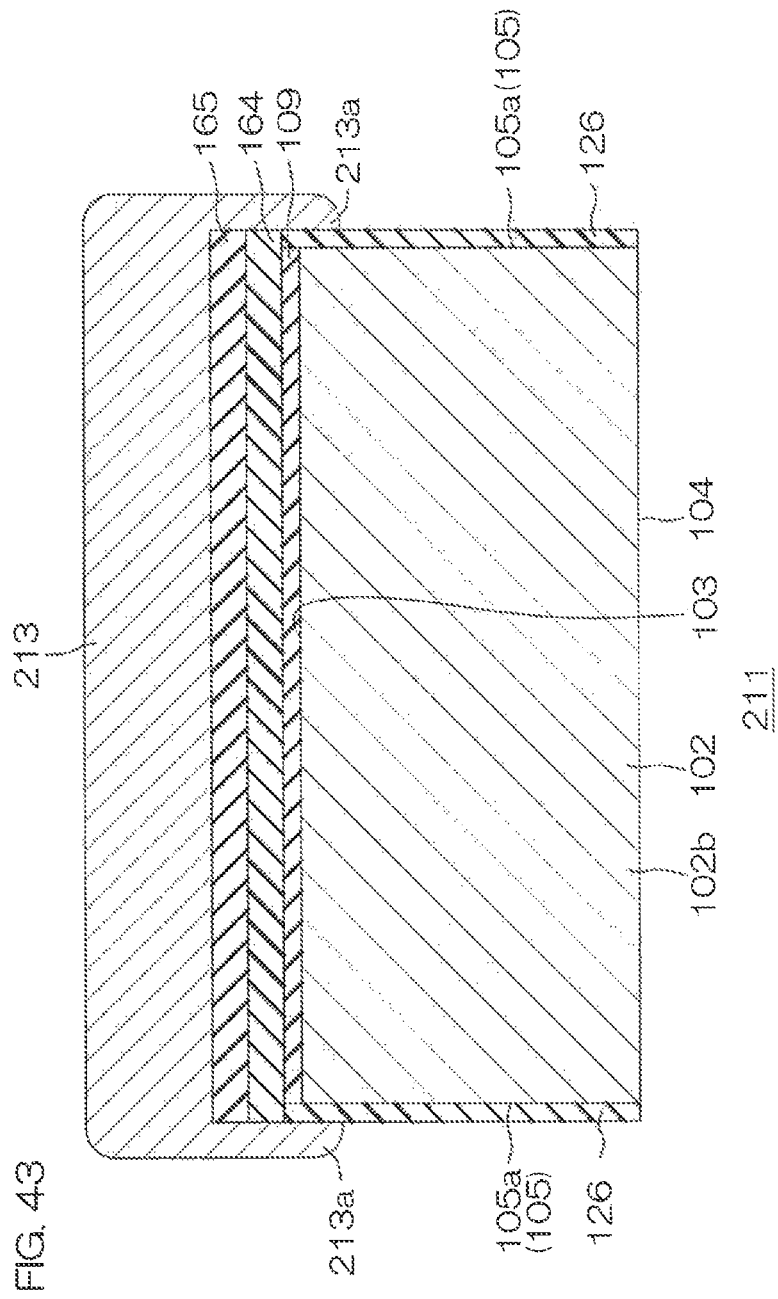
FIG. 43 is a sectional view taken along line XLIII-XLIII shown in FIG. 41.

FIG. 41 is a partially cutaway perspective view of a chip capacitor 211 according to a thirteenth preferred embodiment of the present invention. FIG. 42 is a sectional view taken along line XLII-XLII shown in FIG. 41. FIG. 43 is a sectional view taken along line XLIII-XLIII shown in FIG. 41.

In this preferred embodiment, the same reference numerals are applied to the same structures as those described in the tenth preferred embodiment, and the description thereof is omitted.

Referring to FIGS. 41 to 43, a first external electrode 212 and a second external electrode 213 are formed, instead of the first external electrode 107 and the second external electrode 108, in the chip capacitor 211.

The first external electrode 212 is formed in a rectangular shape extending along the width direction of the substrate 102 in plan view. The first external electrode 212 is formed so as to wrap around from the first main surface 103 of the substrate 102 to the lateral surface 105 of the substrate 102. The first external electrode 212 has a side covering portion 212a covering the lengthwise lateral surface 105a and the widthwise lateral surface 105b from three directions.

The second external electrode 213 is formed in a rectangular shape extending along the width direction of the substrate 102 in plan view. The second external electrode 213 is formed so as to wrap around from the first main surface 103 of the substrate 102 to the lateral surface 105 of the substrate 102. The second external electrode 213 has a side covering portion 213a covering the lengthwise lateral surface 105a and the widthwise lateral surface 105b from three directions.

Referring to FIG. 42, a first notched portion 215 and a second notched portion 217 are formed, instead of the first pad opening 179 and the second pad opening 181, in the first passivation film 120 and the resin film 121.

The first notched portion 215 selectively exposes the third connecting region 170a of the third conductive film 170 as a first pad region 214.

The second notched portion 217 selectively exposes the third pad conductive film 171 as a second pad region 216. The second notched portion 217 exposes a region excluding an edge portion of the first external electrode 212 side in the third pad conductive film 171, in the present preferred embodiment.

The first external electrode 212 is formed on the first pad region 214 exposed from the first notched portion 215. The first external electrode 212 is connected to the first pad region 214 at the first notched portion 215. The first external electrode 212 is thus electrically connected to the first conductive film 162 and the third conductive film 170.

The first external electrode 212 protrudes from the resin film 121. The first external electrode 212 has a covering portion 212b covering the resin film 121. The first external electrode 212 may include a Ni/Pd/Au laminated film including a Ni film, a Pd film and an Au film laminated in this order from the third conductive film 170 side.

The second external electrode 213 is formed on the second pad region 216 exposed from the second notched portion 217. The second external electrode 213 is connected to the second pad region 216 at the second notched portion 217. The second external electrode 213 is thus electrically connected to the second conductive film 165.

The second external electrode 213 protrudes from the resin film 121. The second external electrode 213 has a covering portion 213*b* covering the resin film 121. The second external electrode 213 may include a Ni/Pd/Au laminated film including a Ni film, a Pd film and an Au film laminated in this order from the third pad conductive film 171 side.

As described above, according to the chip capacitor 211, the substantially same effect as the chip capacitor 161 according to the tenth embodiment can be achieved. Also, according to the chip capacitor 211, the first external electrode 212 is formed so as to wrap around the lateral surface 105 of the substrate 102. Also, the second external electrode 213 is formed so as to wrap around the lateral surface 105 of the substrate 102.

An adhesive area of the first external electrode 212 with respect to a conductive bonding material (for example, solder) can thereby be increased. Similarly, an adhesive area of the second external electrode 213 with respect to a conductive bonding material (for example, solder) can thereby be increased.

The connection strength of the chip capacitor 211 with respect to a connecting object can thereby be enhanced, in a case where the chip capacitor 211 is mounted onto the connecting object such as a mounting board, etc.

Specifically, according to the chip capacitor 211, the first external electrode 212 covers the lateral surface 105 of the substrate 102 from three directions at the one end portion 102*a* side of the substrate 102. Similarly, the second external electrode 213 covers the lateral surface 105 of the substrate 102 from three directions at the other end portion 102*b* side of the substrate 102. The connection strength of the chip capacitor 211 with respect to the connecting object can thus be further enhanced.

Although preferred embodiments of the present invention have been described above, the present invention may also be implemented in yet other modes.

In each of the preferred embodiments, the substrate 102 may be a semiconductor substrate. The semiconductor substrate may be a silicon substrate.

In each of the preferred embodiments, the substrate 102 may be an insulating substrate. The insulating substrate may be a glass substrate or a resin substrate. The glass may include an SiO$_2$. The resin may include an epoxy resin.

Figure 44:
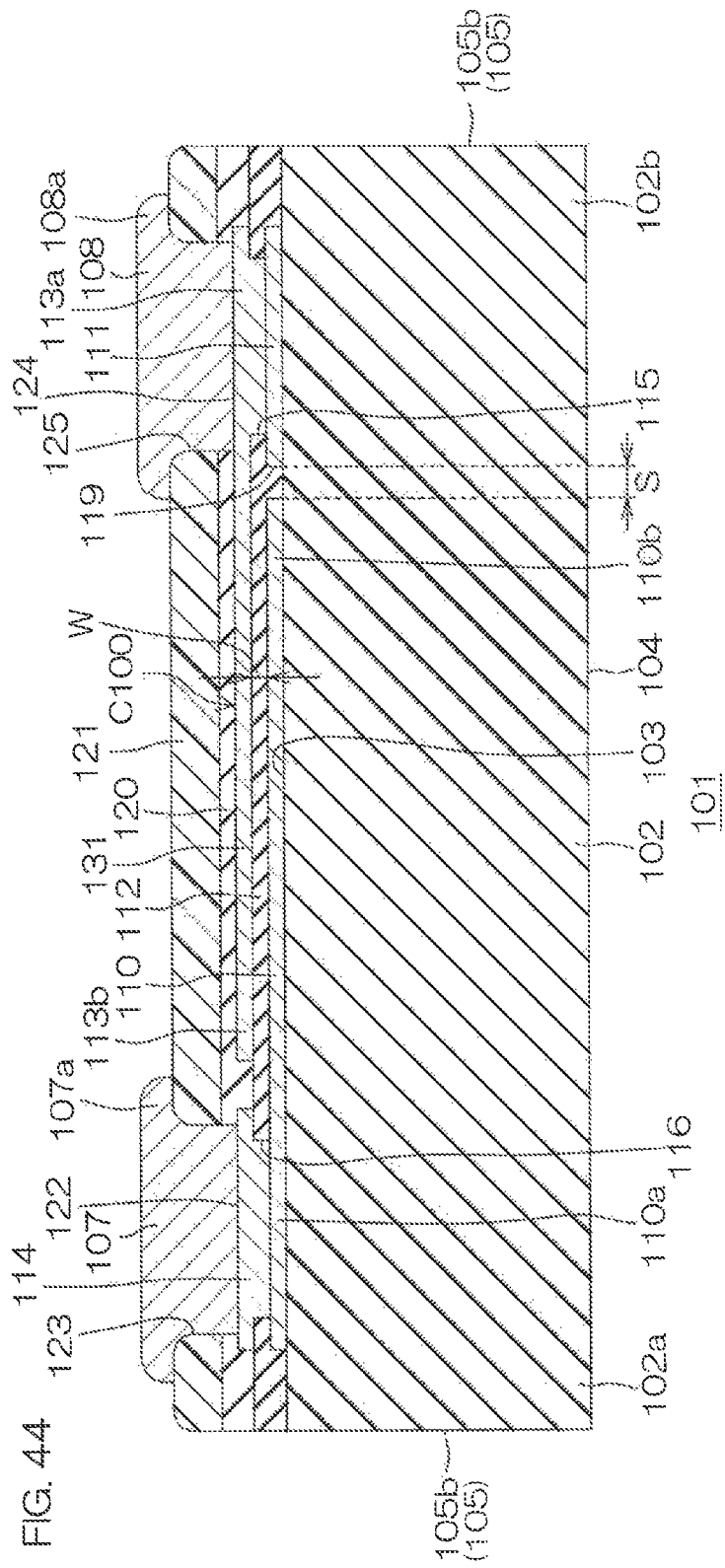
FIG. 44 is a sectional view showing a modified example of the chip capacitor shown in FIG. 18.

In a case where the substrate 102 includes the insulating substrate, the structure shown in FIG. 44 can be adopted. FIG. 44 is a sectional view showing a modified example of the chip capacitor 101 shown in FIG. 18. In FIG. 44, the same reference numerals are applied to the same structures as those described in the sixth preferred embodiment, and the description thereof is omitted.

As shown in FIG. 44, the first conductive film 110 may be in contact with the first main surface 103 of the substrate 102. This structure can also be applied to the seventh to thirteenth embodiments.

The respective configurations of the sixth to thirteenth preferred embodiments may be arbitrarily combined to the respective configurations of the first to fifth preferred embodiments therebetween. For example, the anchor structure of the first external electrode 107 and the anchor structure of the second external electrode 108 described in the sixth embodiment or the tenth embodiment may be combined to the respective configurations of the first to fifth preferred embodiments.

the chip capacitor 101, 131, 141, 151, 161, 191, 201, 211 according to the sixth to thirteenth embodiments can be incorporated into a mobile terminal such as a portable electronic device, etc., as a circuit element for a power supply circuit, a circuit element for a high frequency circuit, a circuit element for a digital circuit and the like.

Examples of features extracted from this specification and the drawings are shown below.

[Clause 1] A chip capacitor including, a substrate having a main surface, a first conductive film formed on the main surface of the substrate, a first pad conductive film formed on the main surface of the substrate apart from the first conductive film, a dielectric film covering the first conductive film and the first pad conductive film, and a second conductive film facing to the first conductive film across the dielectric film, wherein a width of a slit formed in a region between the first conductive film and the first pad conductive film is set to be equal to or greater than a thickness of the dielectric film and equal to or smaller than twice the thickness of the dielectric film.

According to the chip capacitor, the width of the slit formed in the region between the first conductive film and the first pad conductive film is set to be equal to or greater than the thickness of the dielectric film and equal to or smaller than twice the thickness of the dielectric film. The formation of a hollow in a region above the slit in the dielectric film can thus be suppressed. The electric field concentration to the dielectric film can be suppressed. The chip capacitor enabling improvement of the electric dielectric strength can thereby be provided.

[Clause 2] The chip capacitor according to Clause 1 further including, a first external electrode electrically connected to the first conductive film, and a second external electrode electrically connected to the second conductive film.

[Clause 3] The chip capacitor according to Clause 1 or 2, wherein the dielectric film fills the slit, and the second conductive film covers a region immediately above the slit in the dielectric film.

[Clause 4] The chip capacitor according to any one of Clauses 1 to 3, wherein a surface of the dielectric film is formed flat.

[Clause 5] The chip capacitor according to any one of Clauses 1 to 4, wherein a surface of the second conductive film is formed flat.

[Clause 6] The chip capacitor according to any one of Clauses 1 to 5 further including, a barrier conductive film interposed in a region between the first conductive film and the dielectric film.

[Clause 7] The chip capacitor according to Clause 6, the barrier conductive film covers a substantially whole region of the first conductive film.

[Clause 8] The chip capacitor according to any one of Clauses 1 to 7 further including, a second pad conductive film interposed in a region between the first conductive film and the first external electrode.

[Clause 9] A chip capacitor including, a substrate having a main surface, a first conductive film formed on the main surface of the substrate, a first pad conductive film formed on the main surface of the substrate apart from the first conductive film, a first dielectric film covering the first conductive film and the first pad conductive film, a second conductive film facing to the first conductive film across the first dielectric film, a second pad conductive film formed on the first dielectric film apart from the second conductive film, a second dielectric film covering the second conductive film and the second pad conductive film, and a third conductive film facing to the second conductive film across the second dielectric film, wherein a width of a first slit formed in a region between the first conductive film and the first pad conductive film is set to be equal to or greater than a thickness of the first dielectric film and equal to or smaller than twice the thickness of the first dielectric film.

According to the chip capacitor, the width of the first slit formed in the region between the first conductive film and the first pad conductive film is set to be equal to or greater than the thickness of the first dielectric film and equal to or smaller than twice the thickness of the first dielectric film. The formation of a hollow in a region above the first slit in the first dielectric film can thus be suppressed. The electric field concentration to the first dielectric film can thus be suppressed. The chip capacitor enabling improvement of the electric dielectric strength can thereby be provided.

Also, according to the chip capacitor, a multilayer laminated structure including the first conductive film, the first dielectric film, the second conductive film, the second dielectric film and the third conductive film is formed on the main surface of the substrate. A plurality of capacitor regions can thereby be formed along a normal direction of the first main surface of the substrate. The chip capacitor capable of realizing enlargement of capacity and miniaturization can thus be provided.

[Clause 10] The chip capacitor according to Clause 9, wherein the first dielectric film is fills the first slit, and the second conductive film covers a region immediately above the first slit in the first dielectric film.

[Clause 11] The chip capacitor according to Clause 9 or 10, wherein a surface of the first dielectric film is formed flat.

[Clause 12] The chip capacitor according to any one of Clauses 9 to 11, wherein a width of a second slit formed in a region between the second conductive film and the second pad conductive film is set to be equal to or greater than a thickness of the second dielectric film and equal to or smaller than twice the thickness of the second dielectric film.

[Clause 13] The chip capacitor according to Clause 12, wherein the second dielectric film is fills the second slit, and the third conductive film covers the region immediately above the second slit in the second dielectric film.

[Clause 14] The chip capacitor according to Clause 12 or 13, wherein a surface of the second dielectric film is formed flat.

[Clause 15] The chip capacitor according to any one of Clauses 9 to 14 further including, a first external electrode electrically connected to the third conductive film, and a second external electrode electrically connected to the second conductive film.

[Clause 16] The chip capacitor according to Clause 15, wherein the first external electrode is formed so as to wrap around from the main surface of the substrate to a lateral surface of the substrate, and the second external electrode is formed so as to wrap around from the main surface of the substrate to the lateral surface of the substrate.

[Clause 17] The chip capacitor according to Clause 16, wherein the substrate is formed in a parallelepiped shape having one end portion and the other end portion, the first external electrode covers the lateral surface from three directions at the one end portion side of the substrate, and the second external electrode covers the lateral surface from three directions at the other end portion side of the substrate.

[Clause 18] The chip capacitor according to any one of Clauses 15 to 17 further including, a third pad conductive film interposed in a region between the second conductive film and the second external electrode.

The present application corresponds to Japanese Patent Application No. 2016-85897 filed in the Japan Patent Office on Apr. 22, 2016 and Japanese Patent Application No. 2016-85899 filed in the Japan Patent Office on Apr. 22, 2016 and the entire disclosures of the applications are incorporated herein by reference.

Although the preferred embodiments of the present invention and have been described in detail as above, these are merely specific examples used to clarify the technical contents of the present invention, and the present invention should not be understood as being limited to these examples, and the scope of the present invention is to be determined solely by the appended claims.

What is claimed is:

1. A chip capacitor comprising:
    a substrate having a main surface;
    a first conductive film formed on the main surface of the substrate, and having a first connecting region and a first capacitor forming region;
    a lower pad conductive film formed on the main surface of the substrate spaced from the first conductive film;
    a dielectric film covering the first conductive film and the lower pad conductive film;
    a pad conductive film formed on the dielectric film, and electrically connected to the first connecting region of the first conductive film through the dielectric film;
    a second conductive film formed on the dielectric film, and having a second connecting region connected to the lower pad conductive film through the dielectric film and a second capacitor forming region facing the first capacitor forming region of the first conductive film across the dielectric film;
    a first external electrode formed on the pad conductive film, and having first convex portions biting into the pad conductive film as a first anchor structure; and
    a second external electrode formed on the second connecting region of the second conductive film, and having second convex portions biting into the second connecting region as a second anchor structure,
    wherein a width of a slit between the first conductive film and the lower pad conductive film is not less than a thickness of the dielectric film and not more than twice the thickness of the dielectric film.

2. The chip capacitor according to claim 1, wherein the first external electrode is formed so as to wrap around from the main surface of the substrate to a lateral surface of the substrate, and
    the second external electrode is formed so as to wrap around from the main surface of the substrate to the lateral surface of the substrate.

3. The chip capacitor according to claim 2, wherein the substrate is formed in a parallelepiped shape having one end portion and the other end portion,
    the first external electrode covers the lateral surface from three directions at the one end portion side of the substrate, and
    the second external electrode covers the lateral surface from three directions at the other end portion side of the substrate.

4. The chip capacitor according to claim 1 further comprising:
    an insulating film formed on the main surface of the substrate;

wherein the first conductive film is formed on the insulating film.

5. The chip capacitor according to claim 1 further comprising:
a resin film covering the second conductive film;
wherein the first external electrode is electrically connected to the pad conductive film through the resin film, and
the second external electrode is electrically connected to the second connecting region of the second conductive film through the resin film.

6. The chip capacitor according to claim 5, wherein the first external electrode has a portion protruding from the resin film, and
the second external electrode has a portion protruding from the resin film.

7. The chip capacitor according to claim 5, wherein the first external electrode has a covering portion covering the resin film,
the second external electrode has a covering portion covering the resin film.

8. The chip capacitor according to claim 5 further comprising:
a passivation film interposed between the second conductive film and the resin film;
wherein the first external electrode is electrically connected to the pad conductive film through the passivation film and the resin film, and
the second external electrode is electrically connected to the second connecting region of the second conductive film through the passivation film and the resin film.

9. The chip capacitor according to claim 1, wherein the pad conductive film has first concave portions recessed toward the substrate,
the second connecting region of the second conductive film has second concave portions recessed toward the substrate,
the first convex portions of the first external electrode are formed inside the first concave portions of the pad conductive film, and
the second convex portions of the second external electrode are formed inside the second concave portions of the second connecting region of the second conductive film.

10. The chip capacitor according to claim 1, wherein the second connecting region of the second conductive film is formed in a region outside the first conductive film as viewed in plan.

11. The chip capacitor according to claim 1, wherein the dielectric film has first contact holes exposing the first connecting region of the first conductive film and second contact holes exposing the lower pad conductive film,
the first convex portions of the first external electrode protrude toward the first contact holes, and
the second convex portions of the second external electrode protrude toward the second contact holes.

12. The chip capacitor according to claim 1, wherein the first external electrode has a surface having first surface concave portions recessed toward the pad conductive film, and
the second external electrode has a surface having second surface concave portions recessed toward the second connecting region of the second conductive film.

13. The chip capacitor according to claim 12, wherein the first surface concave portions of the first external electrode are formed immediately above the first convex portions of the first external electrode, and
the second surface concave portions of the second external electrode are formed immediately above the second convex portions of the second external electrode.

14. A chip capacitor comprising:
a substrate having a main surface;
a first conductive film formed on the main surface of the substrate, and having a first connecting region and a first capacitor forming region;
a first dielectric film covering the first conductive film;
a first pad conductive film formed on the first dielectric film, and electrically connected to the first connecting region of the first conductive film through the first dielectric film;
a second conductive film formed on the first dielectric film, and having a second connecting region and a second capacitor forming region facing the first capacitor forming region of the first conductive film across the first dielectric film;
a second dielectric film covering the first pad conductive film and the second conductive film;
a third conductive film formed on the second dielectric film, and having a third connecting region electrically connected to the first pad conductive film through the second dielectric film and a third capacitor forming region facing the second capacitor forming region of the second conductive film across the second dielectric film;
a second pad conductive film formed on the second dielectric film, and electrically connected to the second connecting region of the second conductive film through the second dielectric film;
a first external electrode formed on the third connecting region of the third conductive film, and having first convex portions biting into the third connecting region as a first anchor structure; and
a second external electrode formed on the second pad conductive film, and having second convex portions biting into the second pad conductive film as a second anchor structure; wherein
a width of a slit between the second conductive film and the first pad conductive film is not less than a thickness of the second dielectric film and not more than twice the thickness of the second dielectric film.

15. The chip capacitor according to claim 14, wherein the first external electrode is formed so as to wrap around from the main surface of the substrate to a lateral surface of the substrate, and
the second external electrode is formed so as to wrap around from the main surface of the substrate to the lateral surface of the substrate.

16. The chip capacitor according to claim 15, wherein the substrate is formed in a parallelepiped shape having one end portion and the other end portion,
the first external electrode covers the lateral surface from three directions at the one end portion side of the substrate, and
the second external electrode covers the lateral surface from three directions at the other end portion side of the substrate.

17. The chip capacitor according to claim 14 further comprising:
an insulating film formed on the main surface of the substrate;
wherein the first conductive film is formed on the insulating film.

18. The chip capacitor according to claim 14 further comprising:

a resin film covering the third conductive film;
wherein the first external electrode is electrically connected to the third connecting region of the third conductive film through the resin film, and
the second external electrode is electrically connected to the second pad conductive film through the resin film.

19. The chip capacitor according to claim 18, wherein the first external electrode has a portion protruding from the resin film, and
the second external electrode has a portion protruding from the resin film.

20. The chip capacitor according to claim 18, wherein the first external electrode has a covering portion covering the resin film,
the second external electrode has a covering portion covering the resin film.

21. The chip capacitor according to claim 18 further comprising:
a passivation film interposed between the third conductive film and the resin film;
wherein the first external electrode is electrically connected to the third connecting region of the third conductive film through the passivation film and the resin film, and
the second external electrode is electrically connected to the second pad conductive film through the passivation film and the resin film.

22. The chip capacitor according to claim 14, wherein the third connecting region of the third conductive film has first concave portions recessed toward the substrate,
the second pad conductive film has second concave portions recessed toward the substrate,
the first convex portions of the first external electrode are formed inside the first concave portions of the third connecting region, and
the second convex portions of the second external electrode are formed inside the second concave portions of the second pad conductive film.

23. The chip capacitor according to claim 14, wherein the second connecting region of the second conductive film is formed in a region outside the first conductive film as viewed in plan.

24. The chip capacitor according to claim 14 further comprising:
a lower pad conductive film formed on the main surface of the substrate spaced from the first conductive film;
wherein the first dielectric film covers the first conductive film and the lower pad conductive film, and
the second connecting region of the second conductive film is connected to the lower pad conductive film through the first dielectric film.

25. The chip capacitor according to claim 24, wherein the second dielectric film has first contact holes exposing the first pad conductive film and second contact holes exposing the second connecting region of the second conductive film,
the first convex portions of the first external electrode protrude toward the first contact holes of the second dielectric film, and
the second convex portions of the second external electrode protrude toward the second contact holes of the second dielectric film.

26. The chip capacitor according to claim 14, wherein the first external electrode has a surface having first surface concave portions recessed toward the third connecting region of the third conductive film, and
the second external electrode has a surface having second surface concave portions recessed toward the second pad conductive film.

27. The chip capacitor according to claim 26, wherein the first surface concave portions of the first external electrode is formed immediately above the first convex portions of the first external electrode, and
the second surface concave portions of the second external electrode is formed immediately above the second convex portions of the second external electrode.

28. A chip capacitor, comprising:
a substrate having a main surface;
a first conductive film formed on the main surface of the substrate, and having a first connecting region and a first capacitor forming region;
a lower pad conductive film formed on the main surface of the substrate spaced from the first conductive film;
a first dielectric film covering the first conductive film and the lower pad conductive film;
a first pad conductive film formed on the first dielectric film, and electrically connected to the first connecting region of the first conductive film through the first dielectric film;
a second conductive film formed on the first dielectric film, and having a second connecting region connected to the lower pad conductive film through the first dielectric film and a second capacitor forming region facing the first capacitor forming region of the first conductive film across the first dielectric film;
a second dielectric film covering the first pad conductive film and the second conductive film;
a third conductive film formed on the second dielectric film, and having a third connecting region electrically connected to the first pad conductive film through the second dielectric film and a third capacitor forming region facing the second capacitor forming region of the second conductive film across the second dielectric film;
a second pad conductive film formed on the second dielectric film, and electrically connected to the second connecting region of the second conductive film through the second dielectric film;
a first external electrode formed on the third connecting region of the third conductive film, and having first convex portions extending into the third connecting region as a first anchor structure; and
a second external electrode formed on the second pad conductive film, and having second convex portions extending into the second pad conductive film as a second anchor structure,
wherein a width of a slit between the first conductive film and the lower pad conductive film is not less than a thickness of the first dielectric film and not more than twice the thickness of the first dielectric film.

29. The chip capacitor according to claim 28, wherein a width of a slit between the second conductive film and the first pad conductive film is not less than a thickness of the second dielectric film and not more than twice the thickness of the second dielectric film.

* * * * *